Aug. 5, 1952 — L. S. MACDONALD — 2,605,484
LASTING MACHINE
Filed Feb. 28, 1948 — 21 Sheets-Sheet 1

Inventor
Lester S. Macdonald
By his Attorney

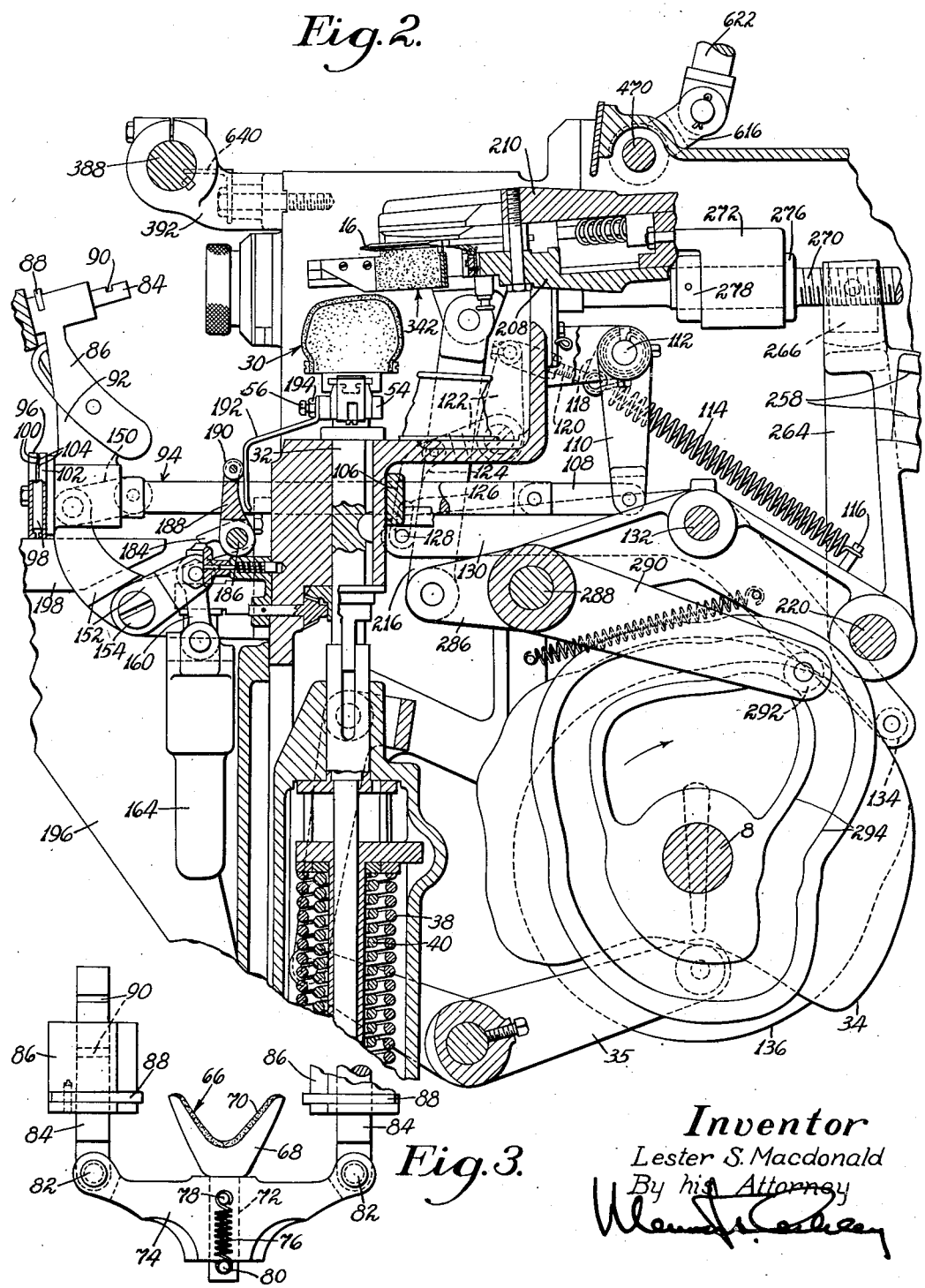

Aug. 5, 1952 — L. S. MACDONALD — 2,605,484
LASTING MACHINE
Filed Feb. 28, 1948 — 21 Sheets-Sheet 3

Inventor
Lester S. Macdonald
By his Attorney

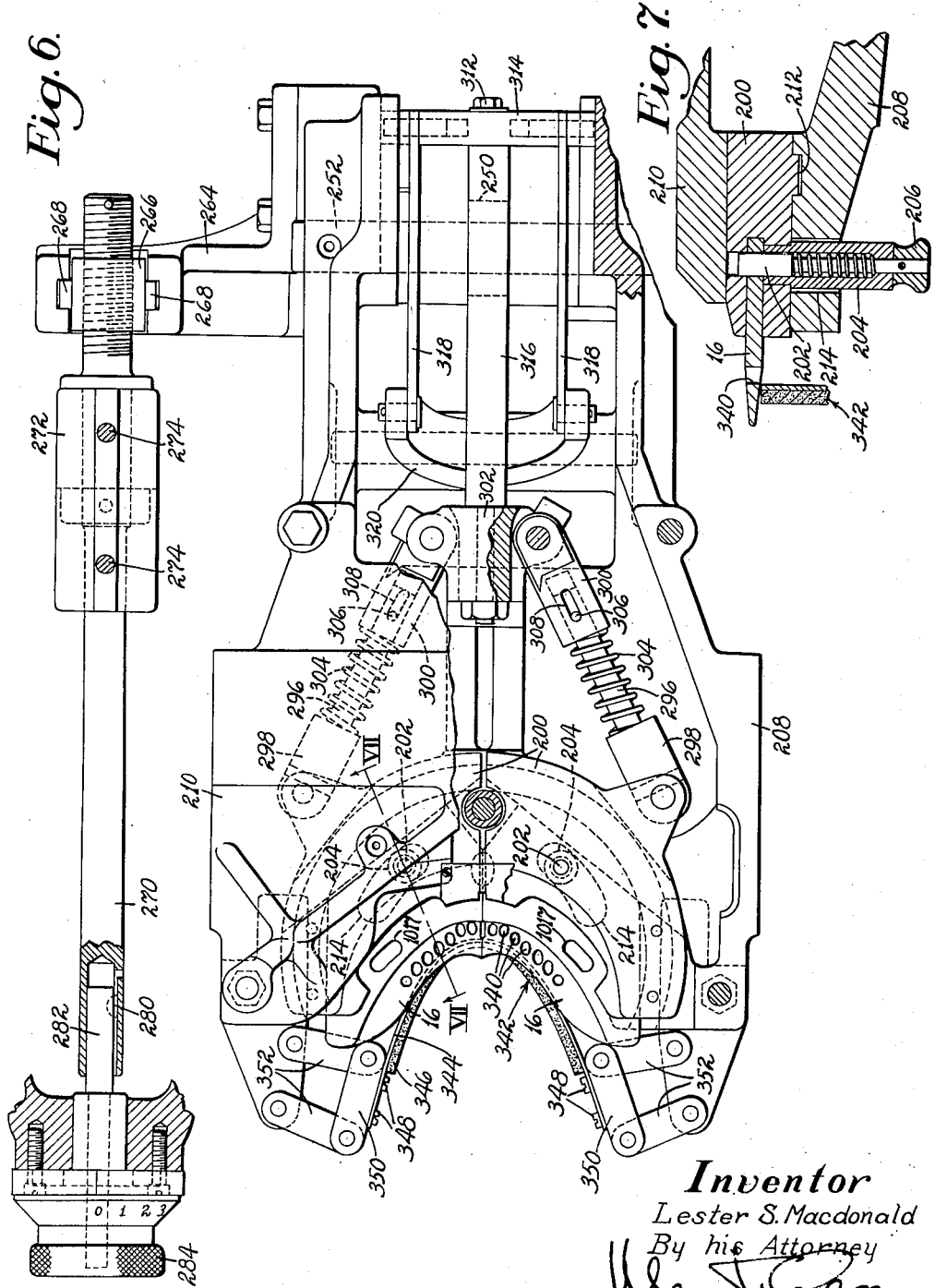

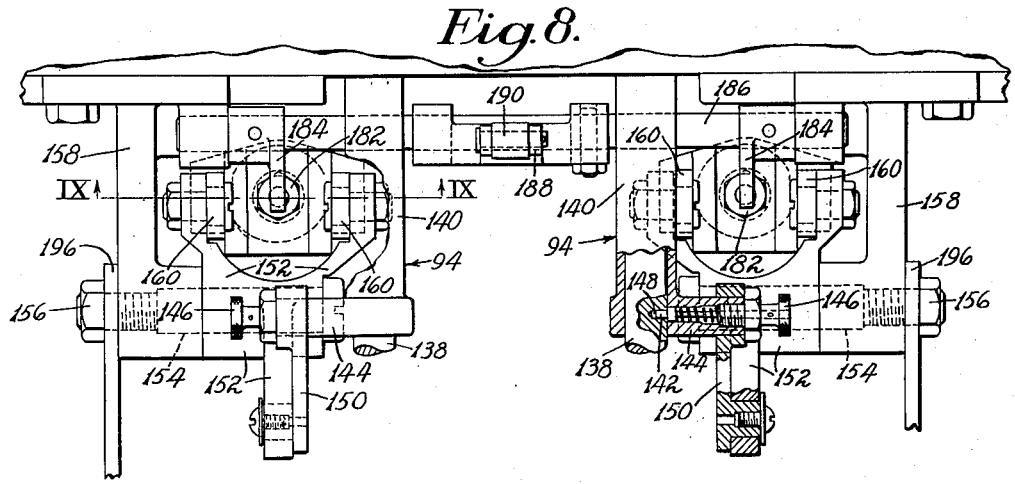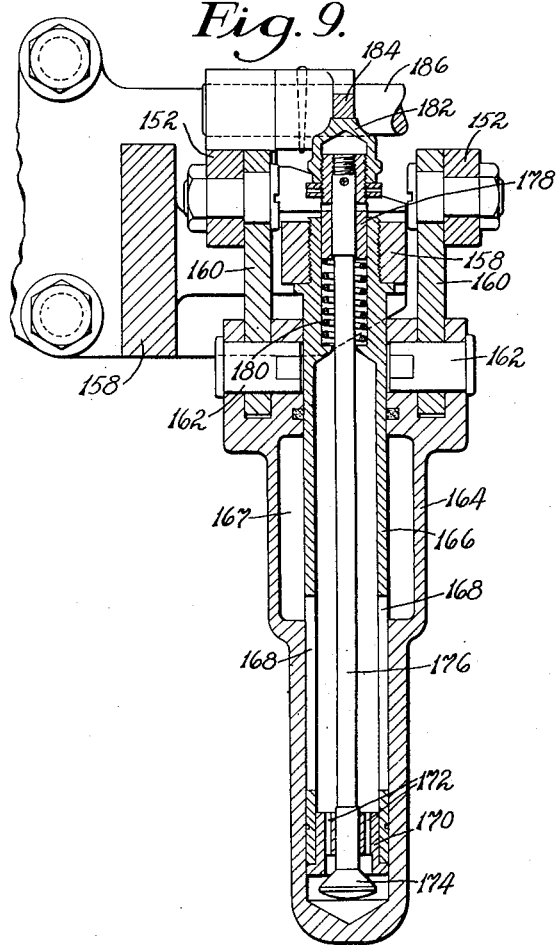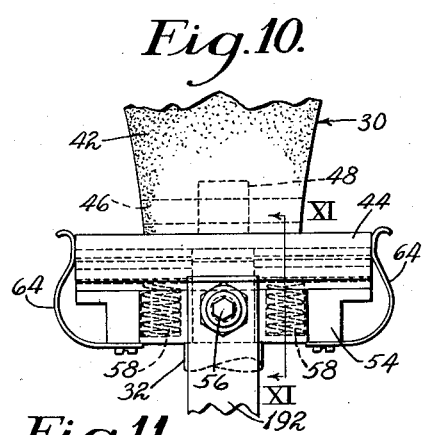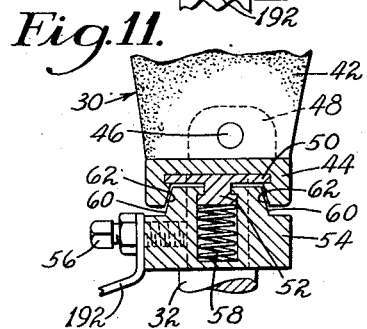

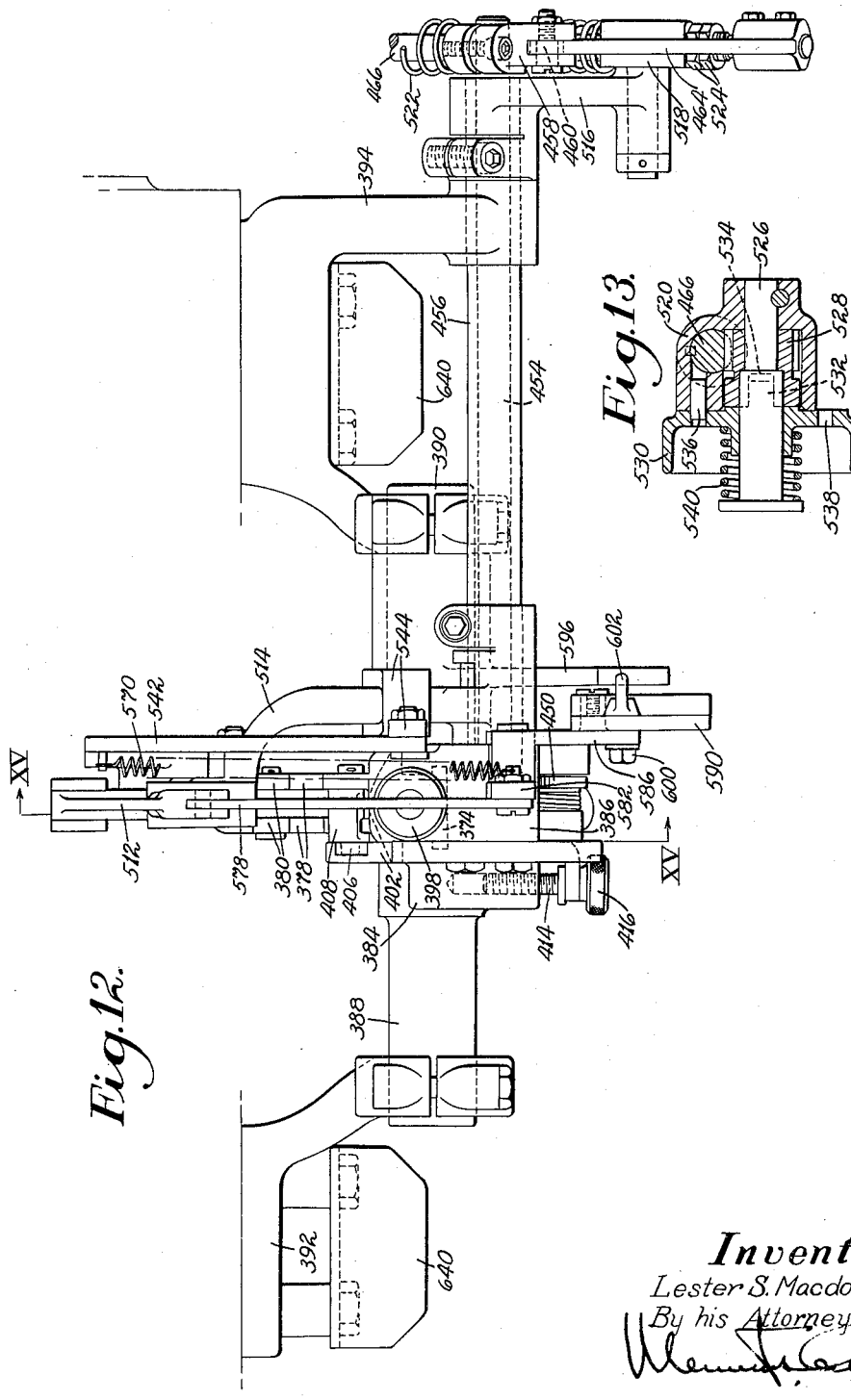

Aug. 5, 1952   L. S. MACDONALD   2,605,484
LASTING MACHINE
Filed Feb. 28, 1948   21 Sheets-Sheet 7

Inventor
Lester S. Macdonald
By his Attorney

Aug. 5, 1952     L. S. MACDONALD     2,605,484
LASTING MACHINE

Filed Feb. 28, 1948     21 Sheets—Sheet 8

*Inventor*
Lester S. Macdonald
By his Attorney

Aug. 5, 1952  L. S. MACDONALD  2,605,484
LASTING MACHINE
Filed Feb. 28, 1948  21 Sheets-Sheet 9

Inventor
Lester S. Macdonald
By his Attorney

Aug. 5, 1952  L. S. MACDONALD  2,605,484
LASTING MACHINE
Filed Feb. 28, 1948  21 Sheets-Sheet 10
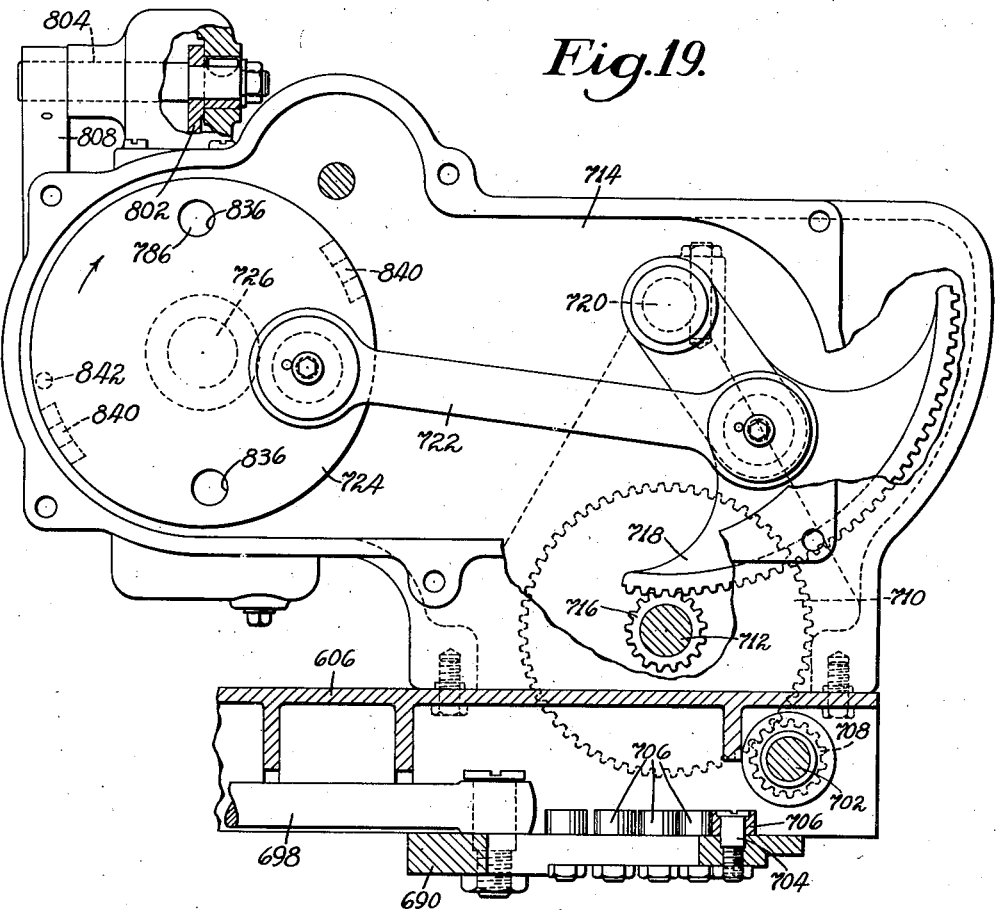
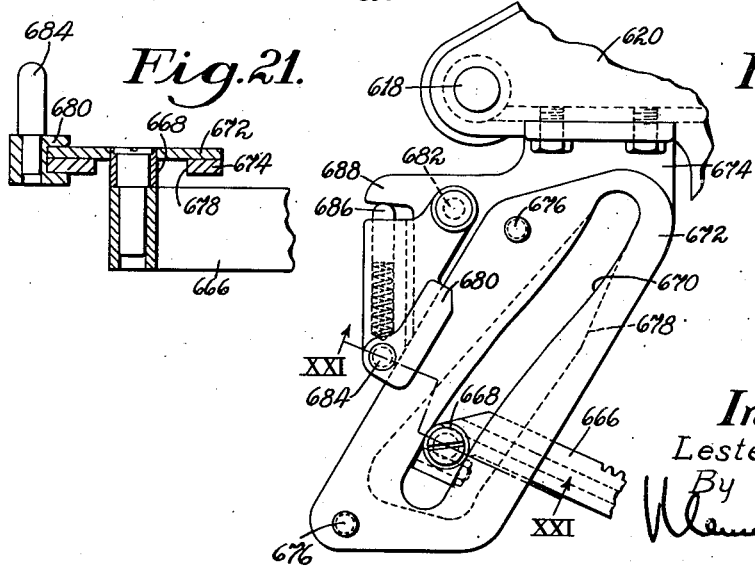
Inventor
Lester S. Macdonald
By his Attorney Aug. 5, 1952 L. S. MACDONALD 2,605,484
LASTING MACHINE
Filed Feb. 28, 1948 21 Sheets-Sheet 11

Inventor
Lester S. Macdonald
By his Attorney

Aug. 5, 1952 — L. S. MACDONALD — 2,605,484
LASTING MACHINE
Filed Feb. 28, 1948 — 21 Sheets-Sheet 12

*Inventor*
Lester S. Macdonald
By his Attorney

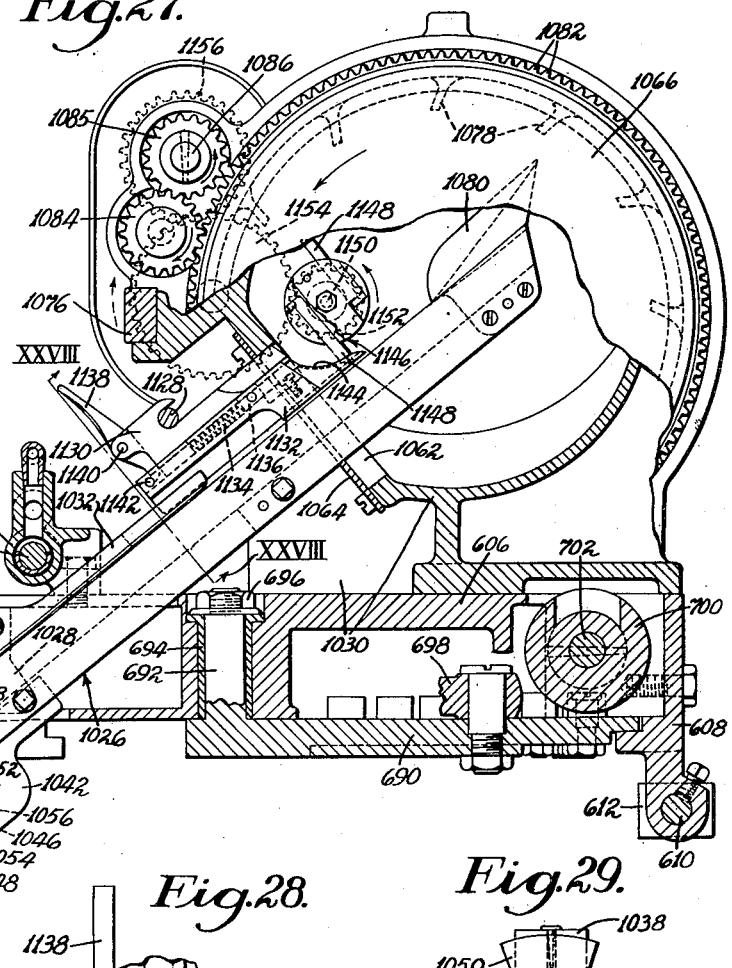
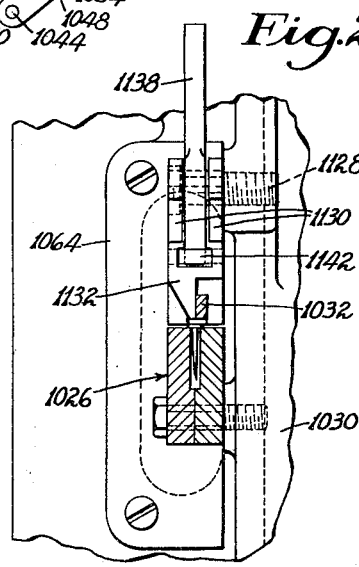
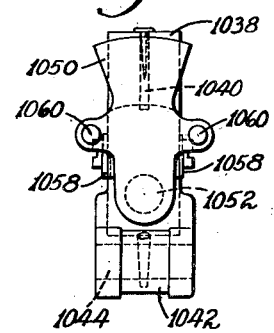

Inventor
Lester S. Macdonald
By his Attorney

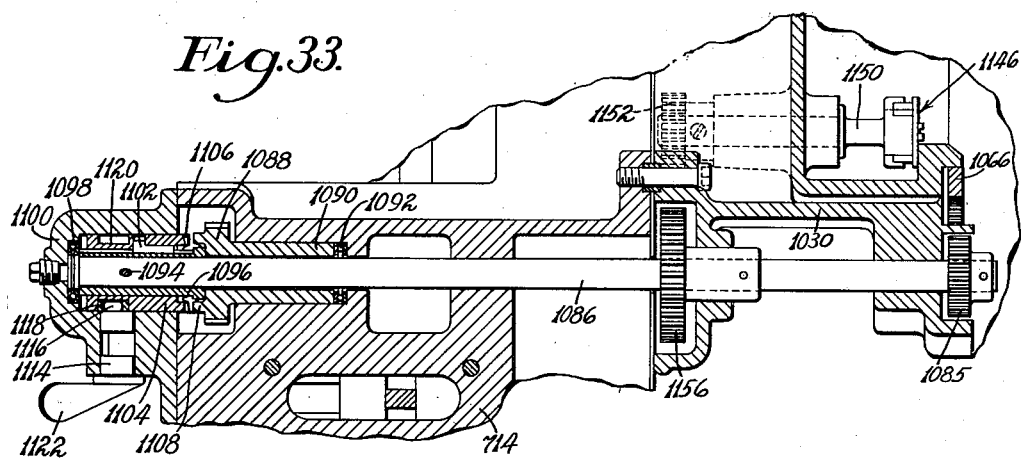
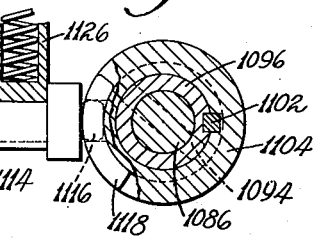
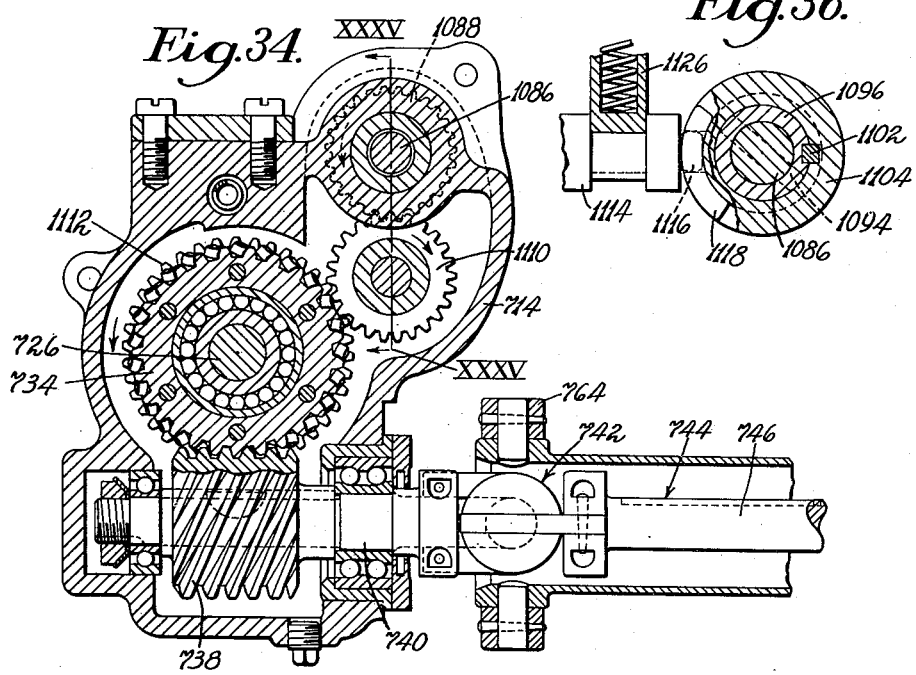
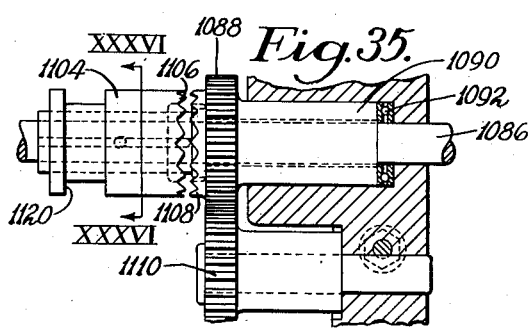

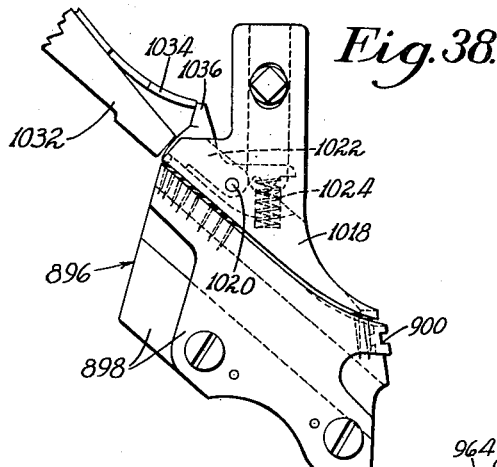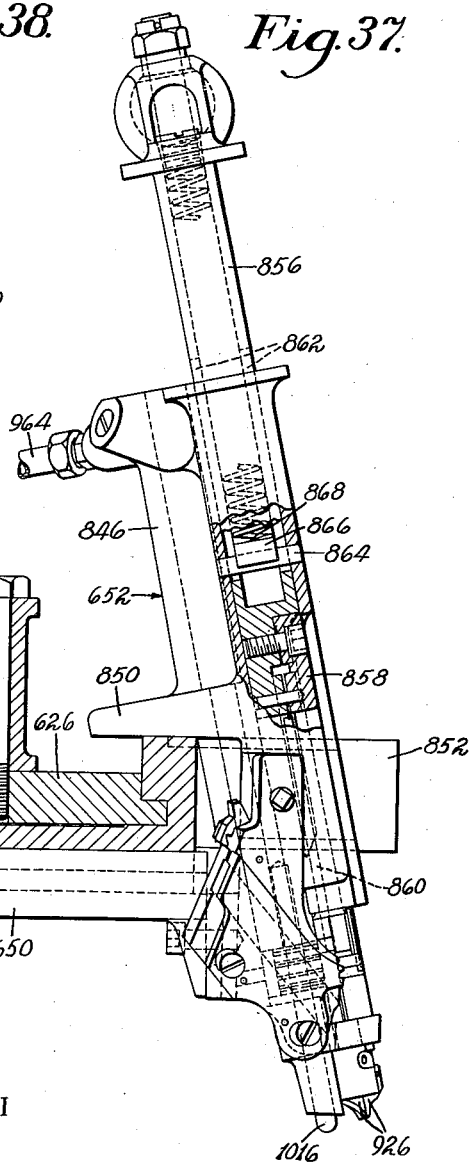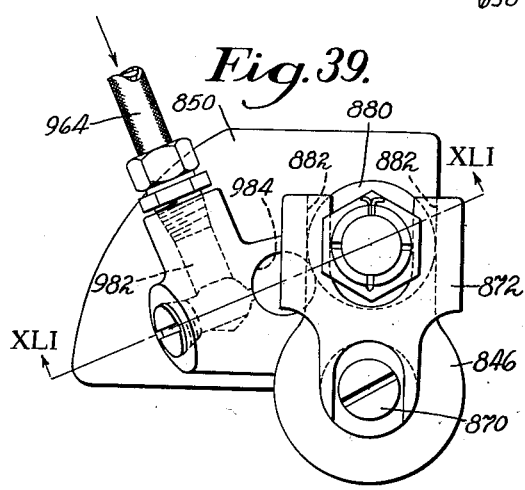

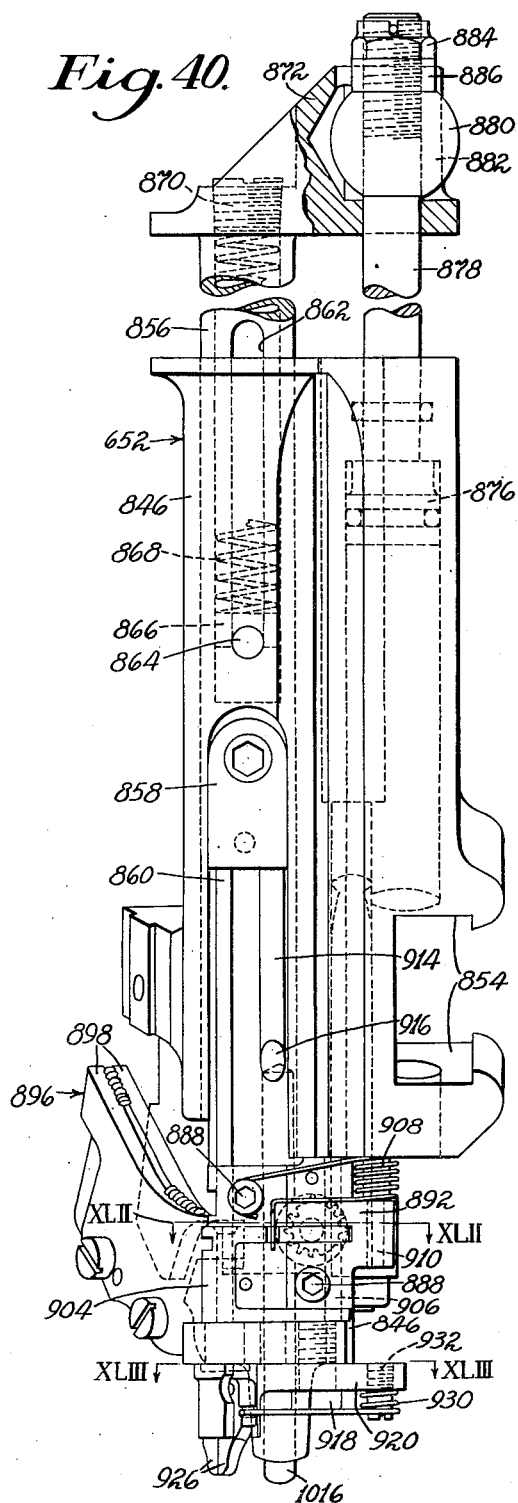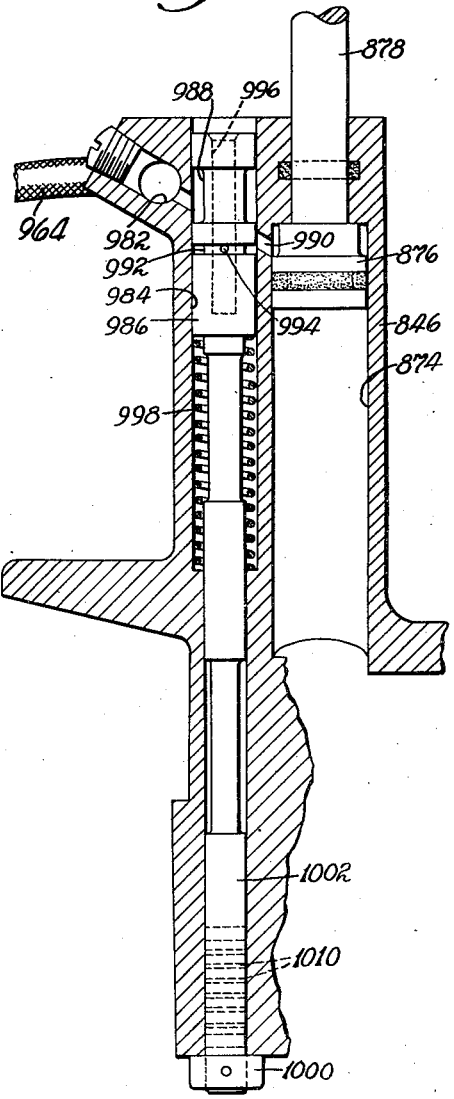

Aug. 5, 1952  L. S. MACDONALD  2,605,484
LASTING MACHINE
Filed Feb. 28, 1948  21 Sheets-Sheet 18

Inventor
Lester S. Macdonald
By his Attorney

Inventor
Lester S. Macdonald
By his Attorney

Inventor
Lester S. Macdonald
By his Attorney

Aug. 5, 1952 — L. S. MACDONALD — 2,605,484
LASTING MACHINE
Filed Feb. 28, 1948 — 21 Sheets-Sheet 21

Inventor
Lester S. Macdonald
By his Attorney

Patented Aug. 5, 1952

2,605,484

UNITED STATES PATENT OFFICE 2,605,484

LASTING MACHINE

Lester S. Macdonald, Beverly, Mass., assignor to United Shoe Machinery Corporation, Flemington, N. J., a corporation of New Jersey Application February 28, 1948, Serial No. 11,912

115 Claims. (Cl. 12—8.7)

This invention relates primarily to lasting machines, and is herein shown as embodied in a toe-lasting machine, although in some of its aspects it is also applicable, for example, to machines for lasting the heel ends of shoes.

The principal object of the invention is to provide an improved machine for lasting the toe ends of shoes of that type in which the marginal portion of the upper lasted inwardly over an insole on a last lies throughout its width in generally parallel relation to the bottom of the last, and more particularly a machine of the type which inserts fastenings to fasten the upper to the insole. To this and other ends, the invention, in one aspect, provides a novel organization of means, herein shown as toe-embracing wipers, for working the toe end of an upper into lasted relation to an insole and mechanism for inserting fastenings, herein shown as tacks, to fasten the upper. To provide room for parts which control the upper as the wipers operate thereon, the fastening-inserting mechanism is controlled by novel means whereby it is moved relatively to the wipers from an initial retracted position into position for the insertion of the fastenings. In the construction shown a support for the fastening-inserting mechanism is pivotally mounted for swinging movement heightwise of the shoe on carrier means rectilinearly movable lengthwise of the shoe, and crank arms connected to the support move it bodily lengthwise of the shoe with the carrier means and also cause it to swing to position the mechanism in proper relation to the wipers. This positioning movement of the fastening-inserting mechanism takes place at a predetermined time in a cycle of automatic operations of the machine prior to an interruption of the cycle, and in an ensuing pause in the cycle the mechanism is operated to insert the fastenings upon actuation of a clutch herein shown as carried by the above-mentioned support.

Novel features of the invention are also to be recognized in a lasting machine organization including means for inserting fastenings in succession along the margin of the shoe bottom. In the construction shown the fastening-inserting mechanism includes two fastening-inserting devices associated respectively with the different wipers and guided for positioning movements along the margin of the shoe bottom, and means for moving them simultaneously to different fastening-inserting positions, one of them being thus moved to positions successively farther from the extreme end of the toe and the other to positions successively nearer the extreme end in operating on a given shoe. In operating on the next shoe the directions in which the two devices are thus moved are reversed. For imparting the positioning movements to the two devices they are connected by links to a member mounted to swing about an axis extending heightwise of the shoe, this member having thereon a series of projections engaged successively by a rotatable groove cam so formed as to cause the devices to pause in their fastening-inserting positions until the fastenings are inserted. The cam is operated through the above-mentioned clutch, mechanism being provided for rotating it in one direction in operating on one shoe and in the opposite direction in operating on the next shoe. In order that the fastenings will be driven at the proper distances from the edge of the shoe bottom, the fastening-inserting devices are supported for inward or outward movements in directions transverse to the edge of the shoe bottom and they are controlled with respect to such movements as they are carried along the margin of the shoe bottom by cam members appropriate for the style and size of shoe being operated upon.

To secure the upper most effectively in lasted position the fastening-inserting mechanism herein shown is arranged to insert most of the fastenings through holes in the wipers, three of them, however, at the extreme end of the toe being inserted in a V-shaped opening between the wipers such as is common in toe-lasting machines when the wipers are at the limits of their closing movements. The fastening-inserting devices include fingers for guiding the fastenings, and it is desirable that when the fastenings are inserted these guide fingers shall be positioned as close as possible to the bottom of the shoe. To accomplish this, while permitting the devices also to be moved relatively to the wipers along the margin of the shoe bottom to their different fastening-inserting positions, the machine is provided with means for causing the devices to move toward the shoe heightwise thereof after each positioning movement along the margin of the shoe bottom, so that the guide fingers of each device will enter the appropriate hole in one of the wipers or, it may be, the V-shaped opening between them. For this purpose, in the construction shown, the swinging movement heightwise of the shoe of the previously mentioned support for the fastening-inserting mechanism to carry the mechanism toward the shoe prior to the beginning of the fastening-inserting operations is limited by a pair of spring-controlled plungers, the fastening-inserting devices being then in such relation to the wipers as to permit them to be moved along the margin of the shoe bottom. Thereafter, in proper time relation to the successive positioning movements of the devices, the plungers are retracted against the resistance of their springs by admitting compressed air to cylinders in which they are mounted, thus causing the support and the fastening-inserting devices thereon to be moved farther toward the bottom of the shoe by gravity, and after the insertion of the fastenings the compressed air is released from the cylinders to cause the springs to raise the support so that the devices may be moved to their next fastening-inserting positions. Air is thus admitted to and released from the cylinders by a valve which is operated by a cam rotatable with the previously mentioned cam by which the fastening-inserting devices are moved along the margin of the shoe bottom.

The invention further provides novel means for inserting the fastenings in response to the repeated movements of the fastening-inserting devices toward the shoe bottom. In the construction shown compressed air is utilized to insert or drive the fastenings, but it should be understood that the invention is not limited to the use of that particular operating fluid either for inserting the fastenings or for retracting the above-mentioned limiting plungers. As herein illustrated, each of the fastening-inserting devices includes a driver, a piston for operating the driver, a cylinder in which the piston is movable, and a valve controlled by the intermittent movements of the fastening-inserting mechanism heightwise of the shoe for admitting compressed air to the cylinder and for releasing it therefrom. For the purpose of such control there is movably mounted in each device a member arranged to be engaged by the corresponding wiper and in response to each movement of the fastening-inserting mechanism toward the shoe to cause the valve to admit the air for operating the driver. In response to each reverse movement of the mechanism away from the shoe the valve is returned and the driver is retracted. In case it is not desired to insert in shoes of any particular size or style the full number of fastenings which the machine is adapted to insert, the wipers used in operating on shoes of that size or style may have one or more recesses formed therein to receive the corresponding valve-controlling member or members and thus to prevent the insertion of one or more fastenings. It will be understood that such a recess in either wiper may be formed in any desired location to cause the omission of any particular fastening or fastenings which would otherwise be inserted.

Each of the fastening-inserting devices herein shown further includes a raceway for fastenings and means movable with the driver to deliver fastenings one by one from the raceway. Substantially at the end of the fastening-inserting operations on each shoe the raceway of that fastening-inserting device which in its positioning movements along the edge of the shoe bottom approaches the end of the toe is carried laterally into alinement with a supply raceway to receive a fresh supply of fastenings, a gate member at the lower end of the supply raceway and a tack retainer at the upper end of the movable raceway being displaced by the movement of the latter into alinement with the supply raceway. To avoid any possible damage if any misplaced fastening should interfere with the proper alinement of the raceways, the lower end portion of the supply raceway is made yieldable in a direction lengthwise of that raceway.

In the machine herein shown the toe-embracing wipers, before they wipe the marginal portion of the upper inwardly over the insole, are moved heightwise of the last in wiping engagement with the upper, and by pressure on the upper at the sides of the toe they serve properly to position the toe end of the shoe laterally if it is not already so positioned. The shoe is clamped at this time with comparatively light pressure between a shoe bottom rest engaging the forepart of the insole and a toe rest engaging the upper at the top of the forepart, and to facilitate the positioning of the shoe by the wipers the invention further provides a construction such that the toe rest may move with the shoe in directions widthwise of the shoe. When the wiping of the upper heightwise of the last is substantially completed the toe rest is pressed more forcibly against the shoe, and in response to the increased force thus applied the toe rest is locked frictionally against any further movement in directions widthwise of the shoe. Further to prevent any possible later displacement of the shoe by the closing of the wipers in wiping the upper inwardly over the insole, there is provided means movable lengthwise of the shoe with the wipers into holding engagement with the upper at the sides of the toe, the construction being such that the wipers may thereafter move farther lengthwise of the shoe relatively to the holding means.

Novel features of the invention are further to be recognized in means for operating and controlling the wipers. In wiping the marginal portion of the upper inwardly over the insole the two wipers, in the construction herein shown, are first advanced bodily lengthwise of the shoe without closing movements until they have wiped the upper partially inward at the end of the toe. They are next fully closed without further advancing movement, and thereafter they are further advanced to complete the wiping at the end of the toe without additional closing movements. In this manner they have been found to act most satisfactorily on the upper all around the toe. To insure that the holes in the wipers will be positioned in proper relation to the fastening-inserting means widthwise of the shoe, there are provided means for positively limiting the closing movements of the wipers and means for insuring that they will be closed to the positions thus determined.

Novel mechanism also is provided for variably determining the positions of the wipers lengthwise of the shoe in the wiping of the upper heightwise of the last. This mechanism, in the construction shown, includes a cam-operated lever and another lever connected to the wipers and supported by the cam-operated lever to be moved bodily thereby in advancing the wipers lengthwise of the shoe, together with a normally stationary cam for imparting to the other lever as it is thus moved bodily a variably determined amount of swinging movement relatively to the cam-operated lever further to advance the wipers. By adjusting the stationary cam the limit of the advancing movement of the wipers prior to the wiping of the upper heightwise of the last may thus be precisely predetermined. The construction is further such that the limit of movement of the wipers lengthwise of the shoe in wiping the upper inwardly over the insole is not affected by the adjustment of the stationary cam. In addition to the pair of wipers there is provided a small wiper arranged to bridge the V-shaped opening between the pair of wipers at the end of the toe at the completion of the wiping operation, but to extend less far inwardly over the upper than the locations where the fastenings are inserted in the V-shaped opening.

There is further provided a member for clamping the upper on the wipers about the end and along the sides of the toe to control the upper as it is wiped heightwise of the last, this member thus having the function of what is commonly known as a retarder and being herein so termed. For purposes of this invention the retarder is so positioned initially as to engage the toe end of the last when the shoe is presented to the machine and thus to position the last lengthwise, while also determining approximately the correct position of its toe end laterally, the retarder being so inclined as to clamp the upper on the wipers first at the end only of the toe. The retarder is lifted by the wipers as they move heightwise of the last in wiping engagement with the upper, and in the course of that movement of the retarder it is automatically tipped into position to clamp the upper on the wipers at the sides as well as at the end of the toe. The retarder is so controlled that it is thus tipped about an axis located substantially where it engages the upper at the end of the toe and accordingly without any displacement of its upper-engaging edge lengthwise of the last by its tipping movement. By suitable adjustment, however, of additional controlling means the retarder may at this time, if desired, be moved outwardly lengthwise of the last in wiping engagement with the upper over the wipers. Associated with the retarder is a holddown for pressing the margin of the insole on the bottom of the toe end of the last and means for controlling the holddown in such manner as to permit it to be moved yieldingly in a direction heightwise of the shoe by pressure of the shoe thereon to insure that the margin of the insole will be properly positioned on the last. In the construction shown the holddown is withdrawn from the insole at the proper time in a path inclined lengthwise and heightwise of the shoe by mechanism associated with the means provided for withdrawing the retarder from the wipers.

In order that the fastenings at the end of the toe will be positioned at the proper distances from the edge of the shoe bottom, it is important to prevent any lengthwise displacement of the shoe by the pressure of the wipers thereon. The machine is accordingly provided with a heel rest which is movable lengthwise of the shoe into engagement with its heel end and with hydraulic means for locking the heel rest against reverse movement after it has thus been applied to the shoe. More particularly, the heel rest is carried by a pair of rods which are movable lengthwise of the shoe to apply it to the shoe, and associated respectively with these rods are hydraulic locking devices each comprising a stationary hollow piston and a cylinder connected to the corresponding rod and movable thereby to draw oil from the hollow piston into one end of the cylinder as the heel rest is moved toward the shoe. Valves in the locking devices then prevent return of the oil to lock the heel rest positively against reverse movement. In the return of the parts of the machine to starting positions the valves are opened to release the heel rest for return movement.

The novel features of the invention, including various novel details of construction and combinations of parts, will now be more particularly described with reference to the accompanying drawings and thereafter pointed out in the claims.

In the drawings:

Fig. 2 is a view partly in right-hand side elevation and partly in central vertical section of a portion of the machine;

Fig. 3 is a plan view of the heel rest and of parts associated therewith;

Fig. 6 is a plan view of the wipers and of a portion of their operating and controlling mechanisms;

Fig. 7 is a section on the line VII—VII of Fig. 6;

Fig. 8 is a plan view of the means for locking the heel rest, with a portion of the structure broken away;

Fig. 9 is a section on the line IX—IX of Fig. 8;

Fig. 10 is a view in front elevation showing a portion of the toe rest and its supporting means;

Fig. 11 is a section on the line XI—XI of Fig. 10;

Fig. 12 is a plan view of mechanism provided for controlling the retarder and the insole edge holddown;

Fig. 13 is a section on the line XIII—XIII of Fig. 1;

Fig. 19 is a section on the line XIX—XIX of Fig. 18;

Fig. 20 is a plan view of a portion of the means provided for controlling the left-hand fastening-inserting device;

Fig. 21 is a section on the line XXI—XXI of Fig. 20;

Fig. 27 is a view partly in right-hand side elevation and partly in section on the line XXVII—XXVII of Fig. 18;

Fig. 28 is a section on the line XXVIII—XXVIII of Fig. 27;

Fig. 29 is a view in elevation of a device provided for controlling delivery of fastenings to the fastening-inserting devices;

Fig. 30 is a perspective view of a member shown in Fig. 27;

Fig. 33 is a section on the line XXXIII—XXXIII of Fig. 32;

Fig. 34 is a section on the line XXXIV—XXXIV of Fig. 18, on an enlarged scale;

Fig. 35 is a section on the line XXXV—XXXV Fig. 34;

Fig. 36 is a section on the line XXXVI—XXXVI of Fig. 35;

Fig. 37 shows in elevation the right-hand fastening-inserting device as viewed from the left-hand side of the machine with the device in the position farthest from the end of the toe, parts being broken away and others shown in vertical section;

Fig. 38 is an enlarged view in elevation of a portion of the structure shown in Fig. 37;

Fig. 39 is a view from above of the device shown in Fig. 37;

Fig. 40 shows the same device in front elevation;

Fig. 41 is a section on the line XLI—XLI of Fig. 39;

Figure 1:
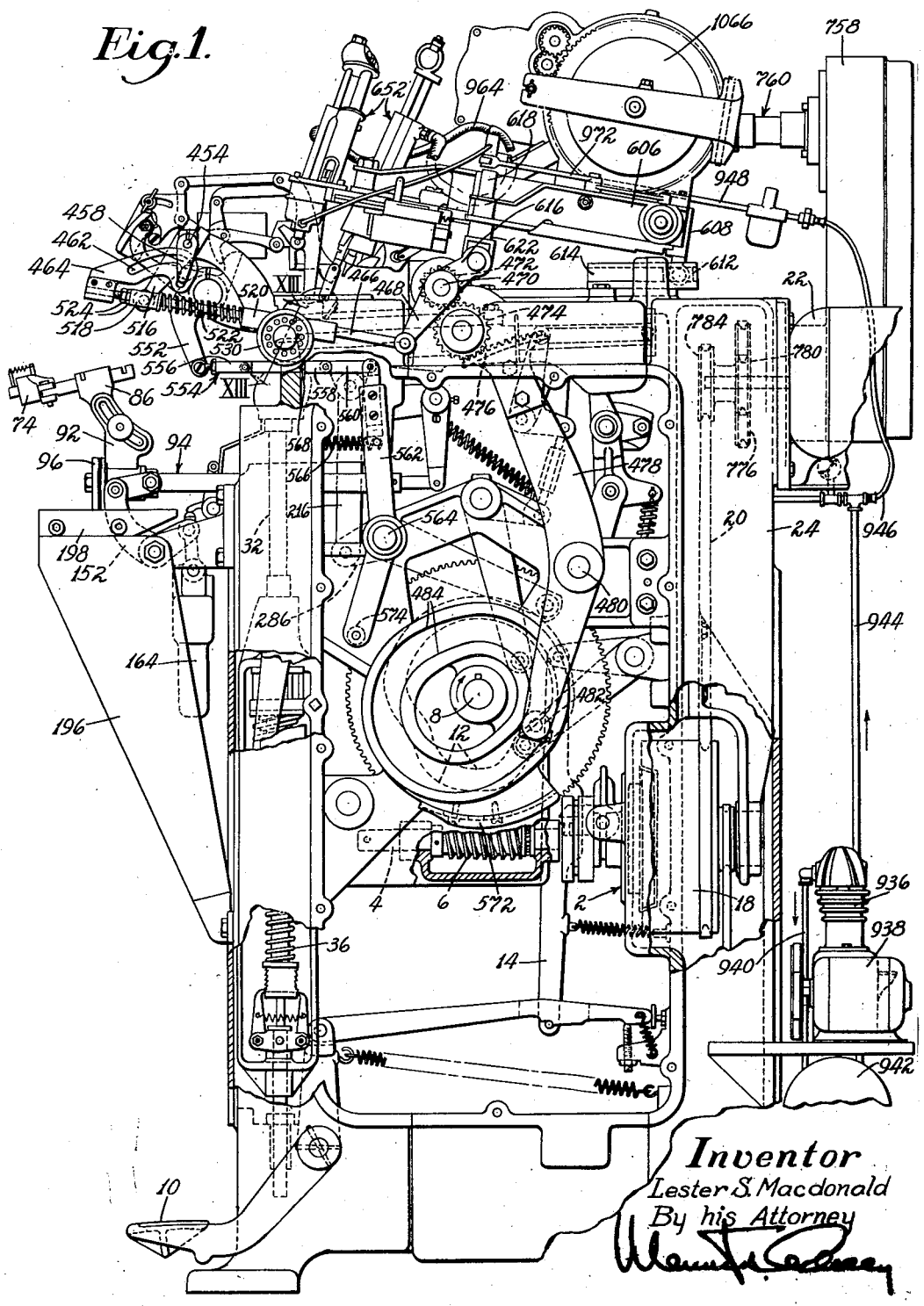
Fig. 1 is a view in right-hand side elevation of the machine in which the invention is herein shown as embodied, with parts broken away.

The machine in which the invention is herein shown as embodied is in many respects similar to a machine shown in United States Letters Patent No. 2,160,846, granted on June 6, 1939 on an application of F. C. Eastman's and A. F. Pym's. Like that machine it is provided with a clutch 2 for driving a shaft 4 which is connected by gearing 6 to a cam shaft 8, one complete rotation of this cam shaft corresponding to what is hereinafter referred to as a cycle of operations of the machine. The clutch is actuated to start the cycle of operations by depression of a treadle 10, after which it is automatically controlled by a stop cam 12 on the cam shaft 8 arranged to act on the clutch through a member 14 corresponding to the member 834 of the above-mentioned Letters Patent. In the construction herein shown this stop cam is so formed that there is only one pause between the beginning and the end of the cycle of operations, namely after the toe-embracing wipers 16 (Fig. 2) have wiped the margin of the upper inwardly over the insole and while they are holding it in lasted position, to allow time for the action of the independently operated fastening-inserting mechanism hereinafter described. After the fastening-inserting operation the operator again depresses the treadle to cause the machine to complete the cycle. In the construction herein shown one member 18 of the clutch is continuously rotated through a belt 20 by an electric motor 22 secured to the rear of the frame 24 of the machine near the top of the frame.

Figure 14:
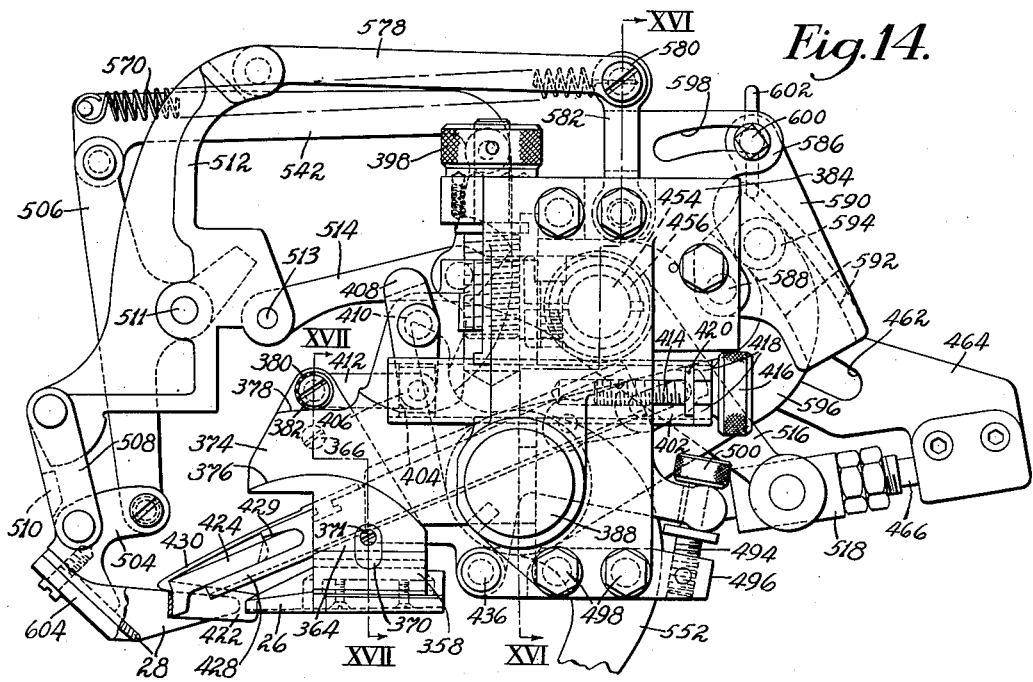
Fig. 14 is a view in left-hand side elevation of the mechanism shown in Fig. 12.

For positioning the shoe heightwise in the machine there is provided a shoe-bottom rest comprising a plate 26 (Fig. 14) supported as hereinafter described and against which the operator positions the bottom of the forepart of the insole when he presents the shoe to the machine, the position of the shoe lengthwise at this time being determined by engagement of the toe end of the last with a member 28, as also more fully hereinafter described. Substantially at the beginning of the cycle of operations the shoe is clamped against the plate 26 by upward movement of a toe rest 30 (Figs. 2 and 46) supported on a vertically movable rod 32. This rod is moved upwardly to apply the toe rest to the shoe and is thereafter controlled by a cam 34 (Fig. 2) on the cam shaft 8 through a lever 35 and other mechanism constructed substantially as disclosed in Letters Patent No. 2,224,146, granted on December 10, 1940, on an application of F. C. Eastman's. This mechanism includes a comparatively light spring 36 (Fig. 1) through which the toe rest is held against the shoe with comparatively light pressure during a portion of the lasting operation, and a pair of heavier springs 38 and 40 (Fig. 2) through one or the other or both of which it is thereafter held more firmly against the shoe, as more fully hereinafter explained.

The toe rest 30 includes a pad 42 (Figs. 10 and 11) supported on a block 44 and held on the block by a pin 46 extending through a hole formed in a lug 48 on the block. The block 44 is mounted on a plate 50 by which it is guided for movements in directions widthwise of the shoe, and this plate has a downwardly extending T-shaped rib 52 which lies in a complementally shaped slot formed in a block 54 mounted on a reduced upper end of the rod 32 and held thereon by a setscrew 56. The reduced upper end of the rod 32 extends into a recess in the rib 52 to hold the plate 50 against movement widthwise of the shoe. Mounted in the block 54 are two compression springs 58 which press upwardly against the rib 52. As shown in Fig. 11, there is normally a space between the plate 50 and the top of the block 54, and there are also spaces between downwardly inclined faces 60 on the block 54 and correspondingly inclined opposed faces 62 on downwardly extending portions of the block 44, these spaces being maintained by reason of the upward pressure of the springs 58 on the rib 52. It will be evident that with the parts thus positioned the block 44 may move with the toe rest 30 in directions widthwise of the shoe, the block sliding on the plate 50. Any such movement of the block 44 and the toe rest is yieldingly resisted by one or the other of two light leaf springs 64 which are fastened to the block 54 and bear against the opposite ends of the block 44. As more fully hereinafter explained, the wipers 16, before they wipe the margin of the upper inwardly over the insole, are advanced and closed about the toe end of the shoe below the edge of the shoe bottom and are moved upwardly to wipe the upper heightwise of the last. The provision for movement of the toe rest 30 and block 44 in directions widthwise of the shoe as above described permits the toe end of the shoe to be readily shifted laterally by engagement of one or the other of the wipers therewith in the wiping of the upper heightwise of the last, so that the toe end of the shoe is properly positioned widthwise by the wipers if not already so positioned, the shoe being thus shifted relatively to the plate 26 which engages the insole. At the time when any such shifting of the shoe takes place the rod 32 which supports the toe rest is under control of the comparatively light spring 36. When the rod is thereafter subjected to the force of one or both of the comparatively heavy springs 38, 40, the block 54 is moved upward by the rod against the resistance of the springs 58 until the opposed faces 60 and 62 on this block and the block 44 engage each other. This serves to lock the block 44 and the toe rest frictionally against any further movement widthwise of the shoe, thus affording better insurance that the toe end of the shoe will not be displaced laterally by the wipers when they wipe the margin of the upper inwardly over the insole.

Shortly after the beginning of the cycle of operations also a heel rest 66 (Fig. 3) is applied to the heel end of the shoe to assist in holding it against lengthwise movement. In the construction shown this heel rest comprises a V-shaped metal block 68 provided with a leather facing 70 and having thereon a stem 72 mounted to turn in a bearing formed in a crossbar 74. This permits the heel rest to adjust itself to the shoe by turning about an axis extending lengthwise of the shoe. A spring 76 connected to a pin 78 on the crossbar 74 and to a pin 80 on the front end of the stem 72 tends to centralize the heel rest with respect to such turning movement. The stem is confined in its bearing in the crossbar by engagement of the pin 80 with the front face of the crossbar. The opposite ends of the crossbar 74 are forked and are pivotally connected by studs 82 to the front ends of short rods 84 which extend rearwardly through bearings formed in the upper ends of holders 86. These rods are adjustable with the heel rest in directions lengthwise of the shoe relatively to the holders and are held in adjusted positions by latches 88 which are pivotally mounted in recesses in the holders and are arranged to enter slots 90 formed in the rods. The holders 86 are mounted on arms 92 and are adjustable relatively to these arms in the same manner as corresponding parts shown in Letters Patent No. 2,160,846, and similarly also to that disclosure the arms 92 are mounted for swinging movements widthwise of the shoe on diametrically reduced front end portions of rods 94 which are mounted for sliding movements lengthwise of the shoe in bearings in the frame of the machine, the arms being confined on the ends of the rods by caps 96. The provision for swinging movements of the arms 92 on the rods 94 permits the heel rest to adjust itself bodily to the shoe widthwise thereof upon engagement with the shoe. Confined by the caps 96 are springs 98 coiled about the axes of the rods 94, a portion of one of these springs being shown in Fig. 2. These springs correspond to the springs 144 shown in Letters Patent No. 2,160,846, and by their tendency to swing the arms 92 respectively in opposite directions maintain them normally in substantially upright positions. As disclosed in Letters Patent No. 2,245,580, granted on June 17, 1941 on an application of F. C. Eastman's, the arms 92 are so mounted as to permit slight relative movements of the arms and the rods 94 in directions lengthwise of the shoe, and the springs 98 serve additionally to hold the arms normally in their rearmost positions relatively to the rods. Formed on each cap 96 are a plurality of fine teeth 100, and formed on a plate 102 fast on the hub of the arm 92 are a plurality of teeth 104 opposite the teeth 100. Normally the teeth 104 are out of contact with the teeth 100 to permit the heel rest to adjust itself to the shoe laterally thereof when it first engages the shoe in response to rearward movements of the rods 94. Thereafter, by reason of the resistance of the shoe to further rearward movement of the heel rest, the teeth 100 on the caps 96 are carried into locking engagement with the teeth 104 to hold the arms 92 against swinging movements during the lasting operation. The arms are thus locked in substantially the same manner as disclosed in Letters Patent No. 2,245,580.

As more fully disclosed in Letters Patent No. 2,160,846, the two rods 94 are rigidly connected together by a yoke 106 shown in section in Fig. 2, and one of the rods is connected by a link 108 to an arm 110 loosely mounted on a shaft 112 which is supported in bearings on the frame. Between the shaft 112 and the hub of the arm 110 there is a pin-and-slot connection, not herein shown but like that disclosed in the last-mentioned Letters Patent, whereby the arm is swung to move the rods 94 in rearward directions to apply the heel rest to the shoe in response to turning movement of the shaft 112 in a counterclockwise direction with reference to Fig. 2. This movement of the shaft is effected by a spring 114 connected at one end to a pin 116 on the frame and at the other end to an arm 118 fast on the shaft. The arm 118 is connected by an adjustable link 120 to one arm of a bell-crank lever 122 on the frame, and in the construction herein shown the other arm of this bell-crank lever has pivotally connected to it a downwardly extending link 124. Near its lower end this link has therein a slot 126 into which extends a pin 128 mounted on one end of a lever 130 which is pivotally mounted between its ends on a rod 132 on the frame. The other end of this lever carries a roll 134 engaged by the periphery of a cam 136 on the cam shaft 8. Initially the pin 128 is at the lower end of the slot 126, as shown in Fig. 2, and it will therefore be evident that the spring 114 is permitted to act as above described to apply the heel rest to the shoe only by reason of a drop on the cam 136 which arrives in a position opposite the roll 134 shortly after the beginning of the cycle. It will be understood that the heel rest is withdrawn from the shoe near the end of the cycle by the action of the cam 136 on the lever 130, the pin 128 moving the link 124 downwardly and thereby, through the bell-crank lever 122, the link 120 and the arm 118, turning the shaft 112 in a clockwise direction. As the shaft is thus turned it acts yieldingly on the arm 110 through a spring (not shown), this spring corresponding to the spring 124 shown in Letters Patent No. 2,160,846.

In the machine herein shown the pawl-and-ratchet device disclosed in the last-mentioned Letters Patent for locking the heel rest in shoe-supporting position is omitted and there are provided instead two hydraulic locking mechanisms associated respectively with the two rods 94 to afford still better insurance against any displacement of the shoe in a heelward direction in the lasting operation. As indicated in Fig. 8, each of the rods 94 is actually made up of two telescopic parts, comprising a front part 138 of comparatively small diameter and a rear part 140 into which the front part extends. By relative movement of these parts the heel rest may be still further adjusted in directions lengthwise of the shoe for shoes of different sizes in the same manner as disclosed in Letters Patent No. 2,245,580. The two parts of each rod are held in adjusted relation by a spring-pressed pin 142 which is movably mounted in a projection 144 integral with the part 140 and is controlled by a knob 146 on its outer end, the pin being arranged to enter one or another of a plurality of recesses 148 in the part 138. The projection 144 has pivotally mounted on it one end of a link 150 the other end of which is pivotally connected in the manner shown in Fig. 8 to one arm of a bell-crank lever 152, this bell-crank lever being pivotally mounted on a stud 154 which is secured by a nut 156 to a bracket 158 fast on the front of the frame. As shown, there are two of these brackets, one for each hydraulic locking mechanism. A rearwardly extending arm of each bell-crank lever 152 is forked and is pivotally connected to the upper ends of two links 160 (Fig. 9) the lower ends of which are pivotally connected by studs 162 to the upper end of a cylinder 164. This cylinder is slidingly mounted on a hollow piston 166 the upper end of which is threaded in a portion of the corresponding bracket 158. The interior of the hollow piston 166 and an annular chamber 167 around the piston in the upper portion of the cylinder 164 are partly filled with oil, the piston having therein slots 168 through which its interior is in communication with the chamber 167. Fast in the lower end of the hollow piston is a member 170 which has openings 172 extending vertically through it and is formed at its lower end to provide a seat for a valve 174. Extending upwardly from this valve through the hollow piston is a stem 176 on the upper end of which is secured a sleeve 178 slidingly mounted in the upper end portion of the piston. Between this sleeve and a shoulder on the piston is a compression spring 180. Threaded on the sleeve is a cap 182 arranged to be engaged by an arm 184 which is fast on a shaft 186 mounted at its opposite ends in bearings in the two brackets 158. It will be understood that there are two such arms 184 on the shaft 186, as shown in Fig. 8, for controlling respectively the two valves 174. Fast on the shaft midway between its opposite ends is an arm 188 (Fig. 2) provided on its upper end with a roll 190 engaged by an angular bar 192 which is secured to the toe rest block 54 by a nut 194 threaded on the previously mentioned setscrew 56. When the parts of the machine are in their initial positions the bar 192 holds the arm 188 in such a position that the two valves 174 are held in open positions by the arms 184 on the shaft 186, as shown in Figs. 2 and 9. When the toe rest 30, however, is moved upwardly into clamping engagement with the shoe substantially at the beginning of the cycle of operations the bar 192 releases the arm 188, thus permitting the two valves 174 to be closed by their springs 180. When the rods 94 are thereafter moved rearwardly to apply the heel rest to the shoe they swing the bell-crank levers 152 in the directions to move the cylinders 164 downwardly along the fixed pistons 166. In response to such movement of the cylinders oil in the interior of the pistons 166 is drawn downwardly past the valves 174 into the lower ends of the cylinders, the valves opening by reason of the suction produced in these ends of the cylinders. As soon as the rods 94 come to a stop with the heel rest in engagement with the shoe the valves are immediately closed by their springs 180. Accordingly the heel rest is locked against any reverse movement, since the oil in the lower ends of the cylinders prevents any upward movement of the cylinders. When the toe rest is thereafter moved downwardly in the return of the parts to starting positions near the end of the cycle, a curved lower end of the bar 192 engages the roll 190 and the bar swings the arm 188 in the direction to open the valves 174. This permits the heel rest thereafter to be returned to its starting position by the cam 136, since the oil in the lower ends of the cylinders is permitted to flow upwardly past the open valves 174 in response to return movements of the rods 94.

In view of the importance of preventing any movement of the shoe in a heelward direction in the lasting operation, the machine is further provided with means for preventing any possible downward springing movement of the front portions of the rods 94. This means comprises two brackets 196 (Figs. 1 and 2), one for each of the rods 94, the lower end of each bracket being secured to the frame and the upper end thereof being secured to the nearest bracket 158 by means of the previously mentioned nut 156. Fast on the upper end of each bracket 196 is a block 198 the upper surface of which is in engagement with the lower surface of the cap 96 on the front end of the corresponding rod 94, the block extending far enough thus to engage the cap in all positions of the rod.

The toe-embracing wipers 16 are operated by mechanism which is in many respects like that disclosed in Letters Patent No. 2,160,846 but differs therefrom in other respects. As shown in Figs. 6 and 7, the wipers are detachably mounted on wiper holders 200 in slots formed in the holders and are held in place each by a spring-pressed pin 202 arranged to enter a hole in the wiper and mounted in a nipple 204 secured to the corresponding holder. By means of a knob 206 on the lower end of the pin the latter may be moved downward to release the wiper. The two wiper holders 200 are supported on a wiper carrier 208 under a cover plate 210 on the carrier and each holder is provided with a downwardly extending curved rib 212 (Fig. 7) extending into a correspondingly curved guideway in the wiper carrier to guide the wiper for closing movement widthwise of the shoe. Slots 214 are provided in the wiper carrier to receive the nipples 204 and thus to permit the wiper-closing movements of the wiper holders 200.

The wiper carrier 208 is supported near its front end for movements to advance and retract the wipers bodily lengthwise of the shoe on a pair of links 216 (Figs. 1 and 4) which are spaced apart widthwise of the shoe and are pivotally connected at their upper ends to lugs on the carrier. Near its rear end the wiper carrier is further supported by a lever 218 (Fig. 4) through which it is moved in directions lengthwise of the shoe, this lever being mounted to swing about a shaft 220 supported on the frame. At its lower end the lever 218 carries a roll 222 engaged by a groove cam 224 on the cam shaft 8. In the construction herein shown the upper end of the lever 218 is not connected directly to the wiper carrier 208, but is connected thereto through means which will now be described. Pivotally mounted on a stud 226 on the upper end of the lever is a bell-crank lever 228 having a rearwardly extending arm 230 pivotally connected to the upper end of a rod 232 which extends downward loosely through a bore 234 formed in a projection 236 on the lever 218. Between this projection and a head 238 on the rod is a compression spring 240, and threaded on the lower end of the rod are nuts 242 which hold the spring normally under compression. Pivotally mounted on a stud 244 on an upwardly extending arm 246 of the bell-crank lever 228 is another bell-crank lever 248 having an upwardly extending arm 250 pivotally connected by a rod 252 to the rear end portion of the wiper carrier 208 and supporting this portion of the carrier. A rearwardly extending arm 254 of the bell-crank lever 248 has thereon a roll 256 engaged by a groove cam 258 formed by two plates 260 and 262 (Fig. 5) secured on an arm 264. This arm is fast at its lower end on the shaft 220 which is mounted to turn in bearings in the frame. At its upper end the arm is forked as shown in Fig. 6 to receive a block 266 having trunnions 268 projecting from the opposite sides thereof into slots in the arm. Threaded in the block 266 is a forwardly extending rod 270 which is mounted to turn in a bearing formed in a bracket 272 (Fig. 2) secured to a portion of the frame by two screws 274 (Fig. 6). The rod 270 is held against lengthwise movement by a flange 276 (Fig. 2) formed thereon and engaging one face of the bracket 272 and by a collar 278 secured thereon and engaging another face on the bracket. Near its front end the rod 270 is connected by a key 280 and a keyway to another short rod 282 mounted to turn in a bearing in the front of the frame and having thereon a knob 284 for turning it. The arm 264 and the cam 258 thereon are accordingly held normally stationary by the rod 270 in a position determined adjustably by turning the rod. When the lever 218 is operated by its cam 224 to move the wiper carrier and the wipers forwardly, it carries the two bell-crank levers 228 and 248 bodily therewith and in this manner imparts the movement to the wiper carrier, the position of the bell-crank lever 248 with respect to turning movement about the stud 244 being determined by the cam 258. When the wipers are advanced and closed about the toe prior to the wiping of the upper heightwise of the last an inclined portion $a$ (Fig. 5) of the cam 258 engages the roll 256 and thereby swings the bell-crank lever 248 in a counterclockwise direction with reference to Fig. 4 about the stud 244, thus imparting to the wiper carrier and the wipers additional forward movement the extent of which is determined by the adjustment of the cam 258 through the rod 270 and the arm 264. That is, adjustment of the cam in a rearward direction serves to increase the amount of forward movement imparted to the wipers, since more of the inclined portion $a$ of the cam is effective to swing the bell-crank lever 248 about the stud 244 before the lever 218 comes to a stop, and conversely adjustment of the cam in a forward direction reduces the amount of swinging movement imparted to the bell-crank lever. This construction permits the positions of the wipers lengthwise of the last at the time when they wipe the upper heightwise of the last to be readily varied in accordance with the character of the upper materials. When the lever 218 is further operated by its cam, after the wiping of the upper heightwise of the last, to cause the wipers to wipe the marginal portion of the upper at the end of the toe inwardly over the insole, the bell-crank lever 248 may or may not be further swung about the stud 244 by the inclined portion $a$ of the cam 258, depending upon the adjustment of the cam. Before the wiping of the upper inwardly over the insole is completed the roll 256, whatever may be the adjustment of the cam, arrives in a position where it is engaged by a portion $b$ of the cam which is concentric with the axis of the shaft 220. Accordingly the limit of the forward movement of the wipers over the insole is invariable regardless of the adjustment of the cam. Normally the spring 240 does not yield, and accordingly the bell-crank lever 228 maintains a fixed relation to the lever 218 throughout the operation of the machine. In case, however, the wipers in their forward movement encounter abnormal resistance, the spring may yield to permit the wipers to stop while the lever 218 continues its movement, thus avoiding any danger of damage to the machine or to the shoe.

Figure 4:
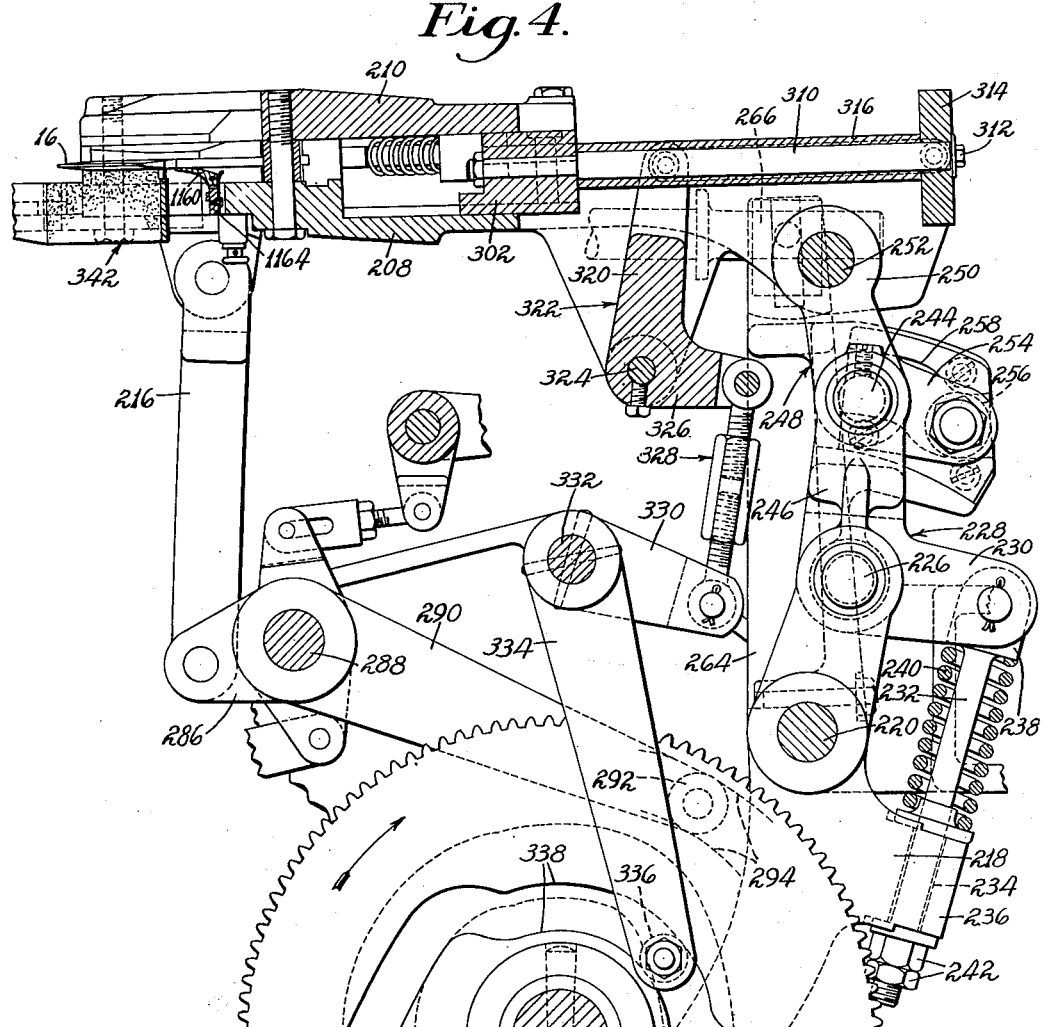
Fig. 4 is a view partly in right-hand side elevation and partly in central vertical section, showing the wipers and their operating mechanism.
Figure 5:
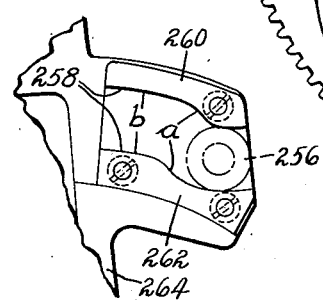
Fig. 5 is a view in right-hand side elevation of a portion of the structure shown in Fig. 4.

The previously mentioned links 216 which support the wiper carrier 208 near its front end are pivotally connected at their lower ends to short arms 286, one of which is shown in Fig. 1 and the other in Fig. 4, these arms being fast on a rockshaft 288 on which is also secured an arm 290 provided with a roll 292 engaged by a groove cam 294. It will be understood that by this mechanism the wiper carrier 208 is swung upwardly about the axis of the rod 252 to cause the wipers to wipe the upper heightwise of the last and is later swung downwardly to increase the pressure of the wipers on the marginal portion of the upper over the insole.

For imparting closing movements to the wipers widthwise of the shoe the machine is provided with links including rods 296 (Fig. 6) having at their front ends enlarged heads 298 pivotally connected to lugs on the wiper holders 200. At their rear ends the rods 296 are slidingly mounted in sockets formed in members 300 which are pivotally connected to a slide 302 guided for movements lengthwise of the shoe on the wiper carrier 208. Between the members 300 and the heads 298 of the rods 296 are light springs 304 which yield in response to pressure of the shoe on the wipers as the wipers are partially closed prior to the wiping of the upper heightwise of the last. The rods 296 are provided with pins 306 which extend into slots 308 in the members 300 and later limit the yield of the springs as hereinafter explained. Secured to the slide 302 is a rearwardly extending rod 310 (Fig. 4), and confined by a nut 312 on the rear end of this rod is a member 314. Between this member and the slide 302 in the construction shown there is a spacing sleeve 316 on the rod 310. Pivotally connected to opposite sides of the member 314 are forwardly extending links 318 (Fig. 6) which are pivotally connected at their front ends to the bifurcated upper end of an upwardly extending arm 320 of a bell-crank lever 322 pivotally mounted at 324 on lugs extending downwardly from the wiper carrier 208. A rearwardly extending arm 326 of this bell-crank lever is connected by an adjustable link 328 to an arm 330 fast on a rockshaft 332. Also fast on this rockshaft is an arm 334 provided at its lower end with a roll 336 engaged by a groove cam 338 on the cam shaft 8.

It will thus be seen that by the action of the cam 338 the bell-crank lever 322 is operated to impart forward wiper-closing movement positively to the slide 302. As hereinabove explained, the springs 304 included in the connections between this slide and the wiper holders 200 are arranged to yield as the wipers are closed about the toe preparatory to the wiping of the upper heightwise of the last and they hold the wipers yieldingly against the upper during that operation on the upper. In the wiping of the marginal portion of the upper inwardly over the insole, however, it is important that the positions of the wipers at the completion of their closing movements be definitely determined. This is for the reason that the wipers are provided with holes 340 through which the fastenings are driven as hereinafter described to fasten the upper in lasted position, and it is necessary that the wipers be positioned with these holes in proper relation to the fastening-inserting means. Accordingly, in the construction herein shown the limits of the closing movements of the wipers are determined by engagement of the nipples 204 with the wiper carrier 208 at the front ends of the slots 214 through which the nipples extend. To insure that the nipples will be carried to the positions thus determined regardless of the resistance of the upper to the movements of the wipers, the construction is further such that when the slide 302 is at the limit of its forward wiper-closing movement the pins 306 are at the rear ends of the slots 308 in the members 300, so that the slide 302 at this time acts positively on the wiper holders. Insurance that the holes 340 in the wipers will also be positioned lengthwise of the shoe in proper relation to the fastening-inserting means at the end of the wiping operation is afforded by the fact that the limit of movement of the wipers lengthwise of the shoe is invariably determined by the portion b of the cam 258 (Fig. 5), as hereinbefore explained. It will be evident that in the use of the machine on shoes of different sizes the distance widthwise of the shoe between the edges of the wipers at the completion of their movements inwardly over the insole must be different in operating on some shoes than on others. This requirement is met, not by any adjustment of the wiper-operating means, but by differently forming the detachable wipers themselves, different wipers being substituted in changing from one size of shoe to a shoe of substantially different size.

The cams for imparting to the wipers their advancing movement lengthwise of the shoe and their closing movements widthwise of the shoe respectively are so formed in relation to each other that in wiping the marginal portion of the upper inwardly over the insole the wipers are first advanced or moved bodily lengthwise of the shoe without any closing movements until they overlap the insole at the end of the toe about an eighth of an inch. Thereafter they are closed inwardly widthwise of the shoe the full distances required without any advancing movement, after which they are further advanced to complete the wiping operation at the end of the toe. These movements of the wipers are illustrated diagrammatically in Fig. 52. It has been found that by operating the wipers in this manner very satisfactory results are obtained in the use of the machine on shoes of the particular type for which it is intended. That is, no unduly prominent gathers or pleat are formed in the margin of the upper in any location and there is no undue deflection of the margin in a heelward direction at the sides of the toe.

In view of the importance of properly positioning the toe end of the shoe laterally when the fastenings are inserted, so that the fastenings along the sides of the toe will be located at the correct distances from the edge of the shoe bottom, the machine is further provided with means affording additional insurance against lateral displacement of the shoe by the wipers when they wipe the margin of the upper inwardly over the insole. This means includes a flexible band 342 (Fig. 6) arranged to extend around the toe end of the shoe and consisting of a resilient metal strip 344 provided with a leather facing 346. The ends of the strip beyond the leather facing are secured by screws 348 to blocks 350. Each of these blocks is pivotally connected to the inner ends of a pair of links 352 the outer ends of which are pivotally mounted on the wiper carrier 208. The links of each pair are arranged in non-parallel relation, as shown, and it will therefore be evident that any swinging of the links in a direction lengthwise of the shoe is yieldingly resisted by the resilient band 342, since any such swinging of the links necessarily results in angular movements of the blocks 350. Initially, therefore, the band and the links occupy positions substantially as shown in Fig. 6 with that portion of the band which is to be opposite the extreme end of the toe retracted rearwardly beyond the edges of the wipers. Since, moreover, the wipers are closed inwardly to some extent prior to the wiping of the upper heightwise of the last, the band at that time has no effective wiping action on the upper although moving upwardly with the wipers. When the wiper carrier is thereafter further advanced lengthwise of the shoe to cause the wipers first to wipe the margin of the upper over the insole at the end of the toe, the portions of the band at the sides of the toe press against the upper in those locations, and because of the stiffness of the band and the manner in which these portions of the band are controlled by the links 352 they act on the shoe with sufficient force to insure, in cooperation with the holding action of the toe rest 30, against any lateral displacement of the toe by one or the other of the wipers as they close thereafter inwardly over the insole. It will be understood that the non-parallel links 352, while prevented from swinging freely by the resilient band, may swing to permit such movement of the wiper carrier after the closing of the wipers as is required to wipe the margin of the upper at the end of the toe fully over the insole. The same band and links may be used in operating on shoes of different sizes or styles, but for wide variations in size or style different bands and links may be substituted.

Figure 15:
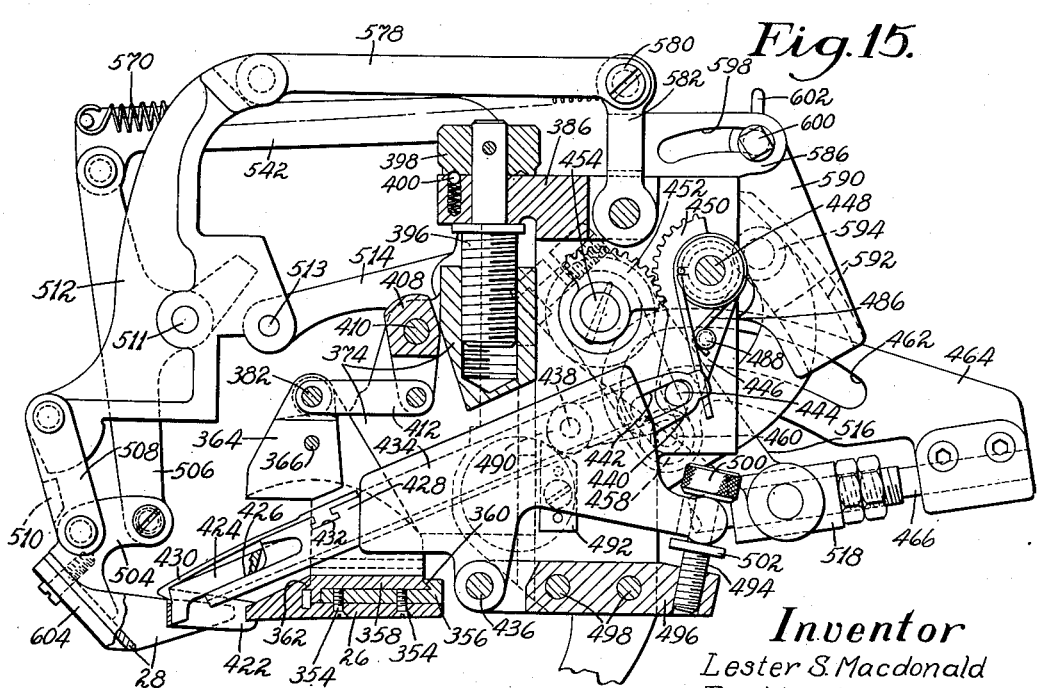
Fig. 15 is a view similar to Fig. 14, but with parts in section on the line XV—XV of Fig. 12 and other parts broken away.

The previously mentioned plate 26, which positions the shoe heightwise as hereinbefore explained, is secured by two screws 354 (Figs. 15 and 17) to a holder 356 which has an upper face convexly curved widthwise of the shoe and engaged by a complementally curved face formed on a member 358. As shown in Fig. 15, an upwardly extending rear end portion of the holder 356 overlaps a downwardly inclined face 360 on the rear end of the member 358, and an upwardly extending portion of the plate 26 similarly overlaps a downwardly inclined face 362 on the front end of the same member, to support the plate and the holder 356. It will be understood that these inclined faces on the member 358 and the faces on the plate 26 and the holder 356 which engage them are curved widthwise of the shoe similarly to the upper face of the holder 356 to permit the plate and the holder to tip about an axis extending lengthwise of the shoe, the purpose of this construction being to permit the shoe to tip as required in such manner as to equalize the downward pressure of the wipers on the overwiped margin of the upper.

Figure 16:
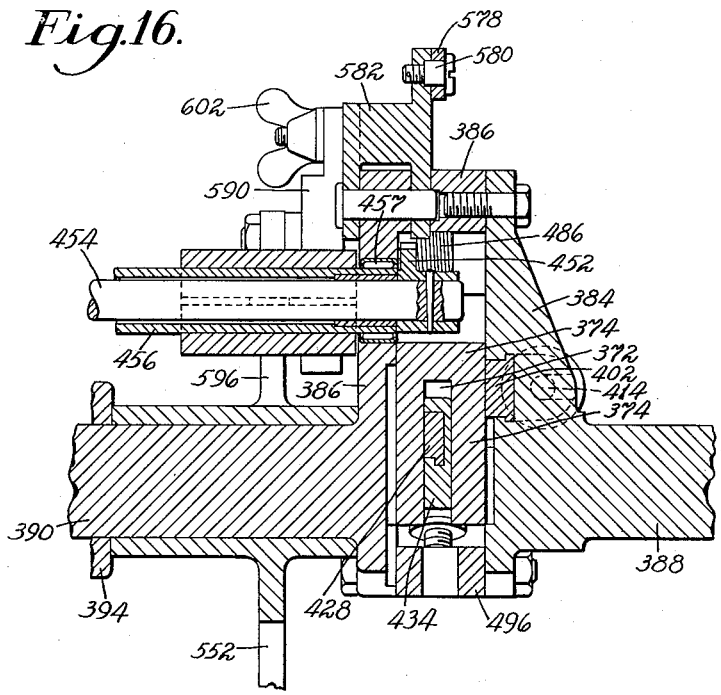
Fig. 16 is a section on an enlarged scale on the line XVI—XVI of Fig. 14.
Figure 17:
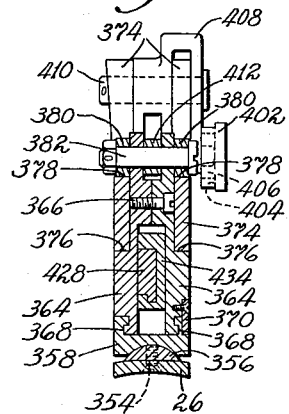
Fig. 17 is mainly an enlarged section on the line XVII—XVII of Fig. 14, with certain parts broken away.

As shown in Fig. 17, the member 358 is supported on two upwardly extending plates 364 which are secured together by a screw 366, the member having slots 368 formed therein to permit it to be slid into place along complementally shaped lower end portions of the plates. The member 358 is held in place on the plates by a key 370 (Fig. 14) which is mounted in a recess formed partly in this member and partly in one of the plates and is secured by a screw 371 to that plate. The two plates 364 extend upwardly into a recess 372 (Fig. 16) formed in a slide 374, which is vertically adjustable as hereinafter described, and are provided with shoulders 376 curved in directions lengthwise of the shoe and engaging complementally curved shoulders on the slide. The slide 374 is also provided above these shoulders with other similarly curved shoulders 378 which are engaged by a pair of rolls 380 mounted to turn on a stud 382 which extends through the plates 364. These plates and the parts supported thereon are therefore guided for adjusting movements about an axis extending withwise of the shoe to position the plate 26 in this respect as may be required in operating on shoes of different styles. The means for thus adjusting them will be presently described.

The above-mentioned vertically adjustable slide 374, by which the plates 364 are supported, is guided for such adjusting movements by guideways formed in two castings 384 and 386, as shown in Fig. 12. These two castings are bolted together and are provided respectively with cylindrical portions 388 and 390 secured to brackets 392 and 394 which are fast on the front of the frame. For adjusting the slide 374 there is provided a screw 396 (Fig. 15) which is threaded in the slide and has a stem mounted to turn in a bearing formed in a portion of the casting 386. Fast on this stem is a knob 398 for effecting the adjustment, and to insure against displacement of the slide from adjusted position there is provided a spring-pressed ball 400 arranged to enter one or another of a plurality of recesses in the knob. It will be understood that such adjustment of the slide determines the position of the shoe heightwise in the lasting operation.

The means for adjusting the plates 364 and the shoe-positioning plate 26 supported thereby about the axis extending widthwise of the shoe includes a slide 402 guided for horizontal movements in the casting 384 and having in its rear end portion a vertical guideway 404 (Fig. 14) for a block 406, this block being pivotally connected to a downwardly extending arm of a lever 408 which is shaped as shown in Fig. 17 and is pivotally mounted on a stud 410 on the slide 374. Another downwardly extending arm of the lever 408 is pivotally connected by a link 412 to the stud 382 on which the rolls 380 are mounted. Adjusting movement of the slide 402 is effected by a screw 414 which is threaded in the casting 384 and has a knob 416 on its rear end for turning it. A laterally extending forked portion 418 of the slide is located between the knob 416 and a flange 420 on the screw to cause the slide to be adjusted in either direction by the turning of the screw. It will be understood that the provision for vertical movement of the block 406 in the guideway 404 permits such swinging of the lever 408 as results from the movements of the slide 402 and also permits the vertical adjusting movements of the slide 374.

Figure 48:
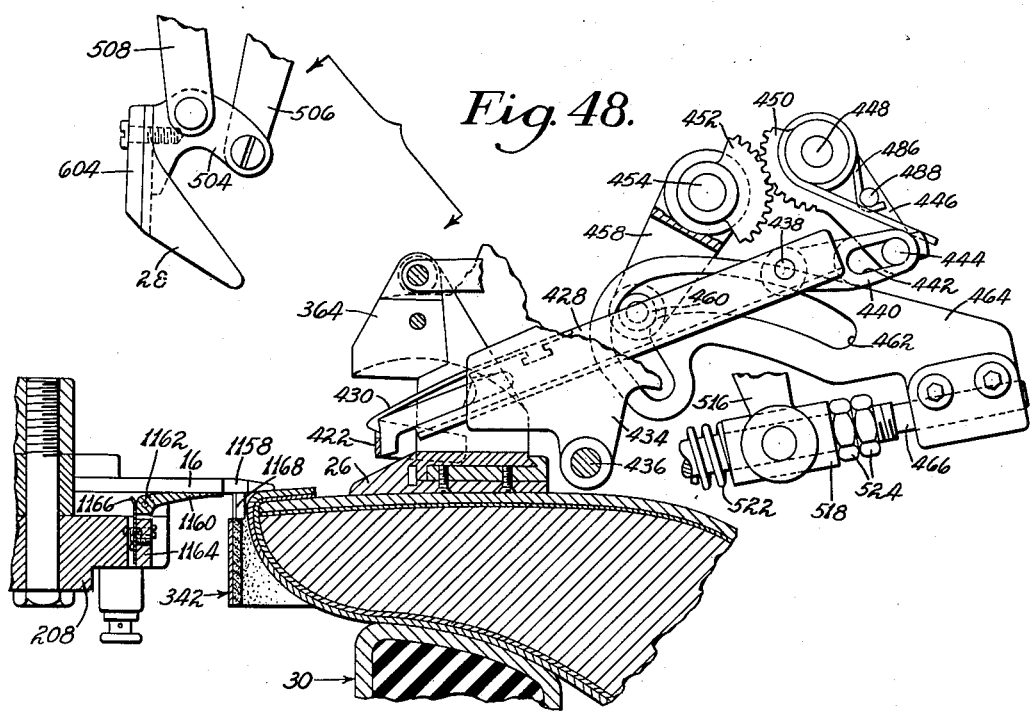

To insure that the margin of the toe end of the insole will be close to the bottom of the last when the wipers begin to wipe the upper inwardly over the insole, the machine is further provided with an edge holddown 422 (Figs. 14 and 15) which is curved in general similarity to the curvature of the edge of the toe end of the insole. The hold down has a shank 424 which extends upwardly along a supporting face 426 formed on the lower end portion of an inclined carrier 428. The upper end of the shank 424 is forked and extends into two slots 429 formed in the carrier in such manner as to permit some upward swinging movement of the holddown. The holddown is held detachably in place on the carrier by a resilient latch 430 the lower end of which is formed as a hook for engagement with the shank 424 and the upper end of which is mounted in a transverse slot 432 formed in the carrier 428. The holddown thus may be readily removed to permit a holddown of different shape to be substituted. The carrier 428 is guided for movements along a path inclined lengthwise and heightwise of the shoe on a member 434 (Figs. 15 and 16) which extends forwardly and rearwardly through the previously mentioned recess 372 in the vertically adjustable slide 374 and extends also into a space between the lower end portions of the previously mentioned plates 364 (Fig. 17). A downwardly extending lug on the member 434 is pivotally mounted on a stud 436 supported by the castings 384 and 386 for a purpose hereinafter explained. Pivotally connected by a pin 438 to the upper end of the carrier 428 is a link 440 having therein a slot 442 into which extends a pin 444 mounted on an arm 446. This arm is mounted to swing about a pin 448 on the castings 384 and 386 and has formed integral with it a gear sector 450. This gear sector is engaged by another gear sector 452 which is fast on one end of a shaft 454 (Figs. 12 and 16). The shaft 454 is mounted to turn in a sleeve 456 which is itself mounted to turn, for a purpose hereinafter described, in a bearing in the bracket 394 and on a roller bearing 457 in the casting 386. Fast on the outer end of the shaft is an arm 458 (Figs. 1, 12 and 48) which is forked and carries a roll 460 lying in a cam slot 462 formed in a plate 464. This plate is secured on the front end of a rearwardly extending rod or link 466 which is supported near its front end by means hereinafter described and is pivotally connected at its rear end to an arm 468 fast on a shaft 470 mounted to turn in bearings on the top of the frame. Fast on this shaft is a pinion 472 engaged by another pinion 474 which, in turn, is engaged by the teeth of a gear sector 476 fast on the upper end of a lever 478. This lever is mounted to swing about a rod 480 on the frame and has on its lower end a roll 482 engaged by a groove cam 484 on the cam shaft 8. By this cam the lever 478 is swung in a counterclockwise direction with reference to Fig. 1 at the time in the cycle of operations when the wipers are just beginning to wipe the marginal portion of the upper inwardly over the insole at the end of the toe, and by this movement of the lever the holddown 422 is moved upwardly along its inclined path away from the insole (Fig. 48). That is, the cam plate 464 is moved bodily in a rearward direction by the link 466 on which it is mounted and by its rearward movement swings the arm 458 in a rearward direction. Through the gear sectors 452, 450 (Fig. 15) the arm 446 is swung in the opposite direction, causing its pin 444 to act through the link 440 to retract the carrier 428 along its inclined path in the member 434. Coiled about the hub of the arm 446 is a spring 486 one end of which is in engagement with a pin 488 on the arm and the other end of which bears against the end of the link 440. This spring, therefore, serves to return the carrier 428 to its initial position when the cam plate 464 is returned to its starting position.

The initial positions of the carrier 428 and the holddown 422 are actually determined by engagement of a boss 490 (Fig. 15) on the link 440 with a stationary cam member 492 fast on the casting 386, the pin 444 being spaced slightly from the front end of the slot 442 at that time. The member 434 is pivotally mounted on the stud 436, as hereinbefore described, for the purpose of adjusting the holddown 422 upwardly or downwardly, as permitted by the slot 442 in the link 440. For this purpose a screw 494 is threaded in a block 496 mounted on two bolts 498 by which the two castings 384 and 386 are secured together, this screw being provided with a knurled head 500 and a flange 502 between which lies the forked end of an arm formed on the member 434. In order to prevent any component of movement of the holddown 422 in a direction lengthwise of the shoe by the adjusting movement of the member 434 about the stud 436, the cam member 492 is so formed that by engagement with the boss 490 it controls the carrier 428 in such manner that the holddown is actually adjusted in a substantially vertical path. The adjustment is preferably such that the holddown extends downward initially somewhat below the plane of the lower face of the plate 26 (Fig. 14) and is accordingly moved upward a short distance against the resistance of the resilient latch 430 by the engagement of the shoe therewith when the shoe is clamped against the plate 26 by the toe rest 30. This insures that the margin of the toe end of the insole will be pressed down on the last as required.

The member 28, which serves as herein before explained to position the last lengthwise by engagement with its toe-end face when the shoe is presented to the machine, serves also to clamp the upper outspread on the wipers 16 as the wipers are moved upwardly to wipe the upper heightwise of the last, the member thus acting as a retarder. It is curved to extend about the end and along the sides of the toe, and therefore serves further to determine approximately the correct position of the toe end of the last laterally. It is secured to a holder 504 (Figs. 14 and 15), this holder being pivotally supported on the lower end of a lever 506 and in a different location lengthwise of the last on the lower end of a double link 508 the two parts of which are connected together by a web 510. The lever 506 is pivotally supported by a pin 511 substantially midway between its upper and lower ends on a carrier 512 to which the upper end of the link 508 also is pivotally connected. The carrier 512 is pivotally supported by a pin 513 on an arm 514 which is fast on the previously mentioned rotatable sleeve 456 (Figs. 12 and 47), and it is controlled with respect to swinging movement about the axis of the pin by means hereinafter described. Through the carrier 512, therefore, the retarder 28 is supported by the arm 514 initially at a height determined by the position of the sleeve 456 with respect to rotation about the shaft 454. Fast on the right-hand end of the sleeve is an arm 516 pivotally connected to a sleeve 518 which is slidingly mounted on the previously mentioned link 466, the arm 516 cooperating with the previously mentioned arm 468 (Fig. 1) to support the link. Between the sleeve 518 and another sleeve 520 (Fig. 1) adjustably mounted on the link 466 as hereinafter described is a compression spring 522. Initially the position of the sleeve 518 on the link 466 is determined by its engagement with one of two nuts 524 which are threaded on the link, and it will be evident that in this manner the height of the retarder is initially determined, its position being preferably such that the toe end of the upper will be clamped between it and the wipers when the wipers in their upward movement arrive, for example, in the position indicated in Fig. 46. As the wipers continue their upward movement they serve to lift the retarder and its carrier 512 bodily against the resistance of the spring 522, the arm 514 being swung upwardly and the arm 516 moving the sleeve 518 against the resistance of the spring away from the nuts 524, as shown in Fig. 47. It will be understood that at this time the link 466 is held against lengthwise movement by the cam 484. The pressure applied by the retarder to the upper, therefore, depends upon the amount of compression of the spring 522, and the compression of the spring may be varied by adjusting the sleeve 520 along the link 466. For this purpose an enlarged portion of the sleeve has fixed therein a pin 526 (Fig. 13) on which is rotatably mounted a pinion 528 in engagement with rack teeth on the link 466. Also rotatable on the pin is a hand wheel 530 provided with a pair of tongues 532, only one of which appears in Fig. 13, arranged to extend into corresponding slots 534 in the pinion for rotating the pinion by the hand wheel. Normally, however, rotation of the hand wheel and the pinion is prevented by a pin 536 which is fast in the sleeve 520 and is arranged to extend into one or another of a plurality of holes 538 in the hand wheel. The hand wheel may be moved outwardly along the pin 526 against the resistance of a spring 540 far enough to disconnect it from the pin 536 without disconnecting it from the pinion 528, after which the sleeve 520 may be adjusted to vary the compression of the spring 522 by rotation of the hand wheel and the pinion. When the desired adjustment has been made the spring 540 is permitted to move the hand wheel reversely along the pin 526, the pin 536 entering one of the holes 538 and therefore holding the sleeve 520 in its adjusted position on the link 466. When the link is moved rearwardly by the cam 484, as hereinbefore described, to withdraw the holddown 422 from the insole as the wipers being to wipe the upper inwardly over the edge of the insole, one of the nuts 524 moves into engagement with the sleeve 518 and then acts to swing the arm 516, thus further lifting the carrier 512 and the retarder to withdraw the retarder from the upper and the wipers, the cam slot 462 in the plate 464 being so formed that the movement of the retarder may be continued after the movement of the holddown has been completed.

Figure 46:
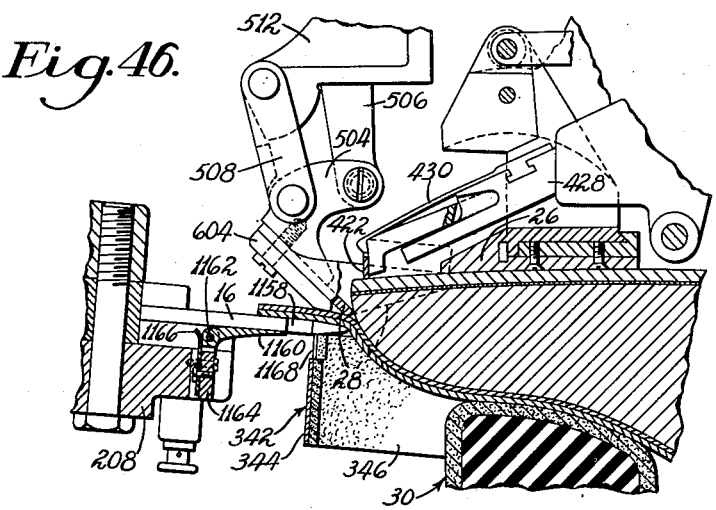
Figs. 46, 47, 48 and 49 are views partly in left-hand side elevation and partly in section, showing the relation of certain parts to the shoe at different times in the lasting operation.
Figure 47:
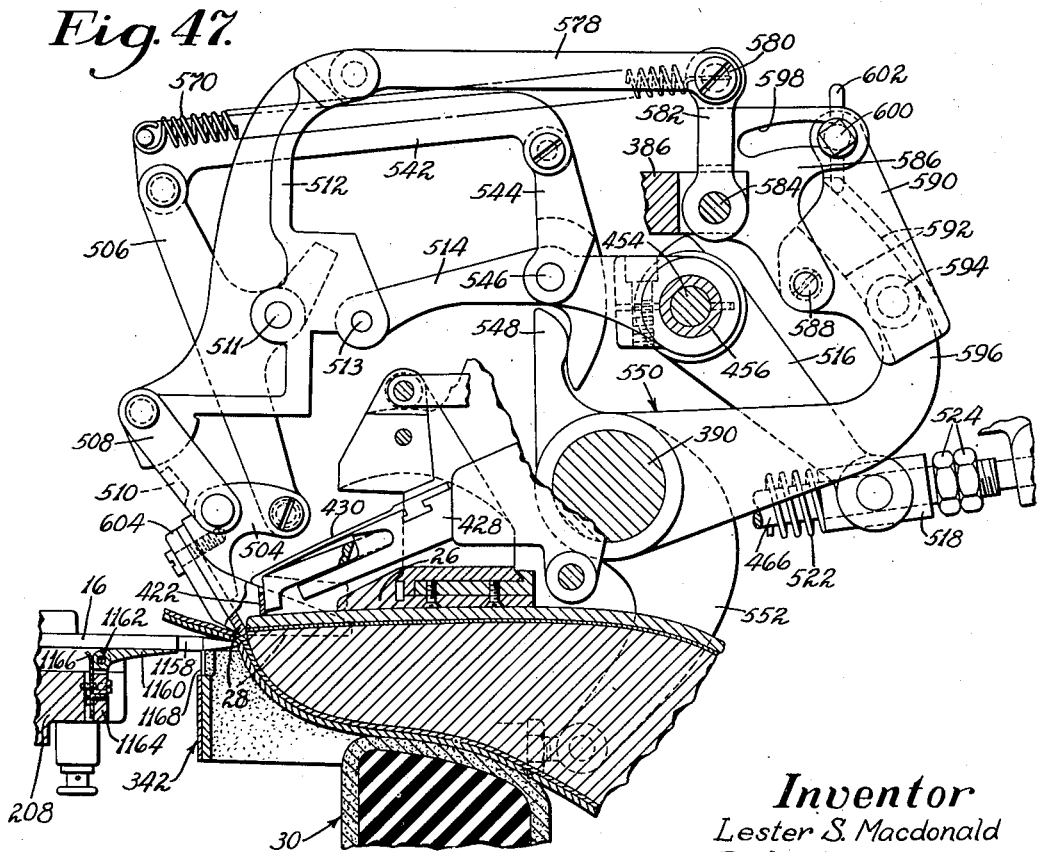

By reference to Fig. 46 it will be seen that the retarder 28 is initially so inclined that the upper is first clamped between it and the wipers only at the end of the toe. This position of the retarder is determined by control of the lever 506. For this purpose there is pivotally connected to the upper end of the lever a rearwardly extending link 542 the rear end of which is pivotally connected to the upper end of a lever 544 pivotally mounted between its upper and lower ends on a pin 546 on the arm 514. The lower end of the lever 544 is engaged on its rear face by one arm 548 of a three-armed lever 550 which is mounted to swing about the cylindrical portion 390 of the casting 386. A downwardly extending arm 552 of the three-armed lever is pivotally connected to the front end of a jointed link 554 (Fig. 1) which consists of three parts 556, 558 and 560 pivotally connected together in a series, the rear part 560 being pivotally connected to the upper end of a lever 562 which is pivotally mounted on a stud 564 on the frame. A spring 566 connected to the lever 562 tends to move the compound link 554 in a forward direction, its movement in that direction being limited by engagement of a flange 568 on its intermediate part 558 with the frame of the machine. In this manner, therefore, the initial position of the three-armed lever 550 is determined, and the engagement of its arm 548 with the lower end portion of the lever 544 determines the initial inclined position of the retarder 28, the lever 544 being held in engagement with the arm 548 by a spring 570 connected at its front end to the link 542 and at its rear end to means hereinafter described. The retarder remains in its inclined position during a portion of its upward movement with the wipers, and accordingly it cooperates with the wipers to tension the toe end of the upper first longitudinally as the upper is being wiped heightwise of the last. When the wipers, however, have moved upwardly, for example, as far as indicated in Fig. 47, a peripheral cam 572 (Fig. 1) on the cam shaft 8 arrives in position to engage a roll 574 on the lower end of the lever 562 and swings the lever in a clockwise direction with reference to Fig. 1. This causes the arm 548 to swing clockwise with reference to Fig. 47 and by its action on the lever 544 to swing the lever 506 counterclockwise about its pivotal connection 511 with the carrier 512. By reason of the relation of the link 508 to the lever 506 this movement of the lever serves to swing or tip the retarder about an axis located substantially where it engages the upper at the end of the toe to a position in which it clamps the upper on the wipers at the sides of the toe as well as at the end of the toe without displacing its upper-engaging edge lengthwise of the shoe, as illustrated in Fig. 47. As the wipers continue to wipe the upper heightwise of the last, therefore, the upper is clamped thereon by the retarder all around the toe, so that tension is applied to the upper at the sides as well as at the end of the toe.

Figure 49:
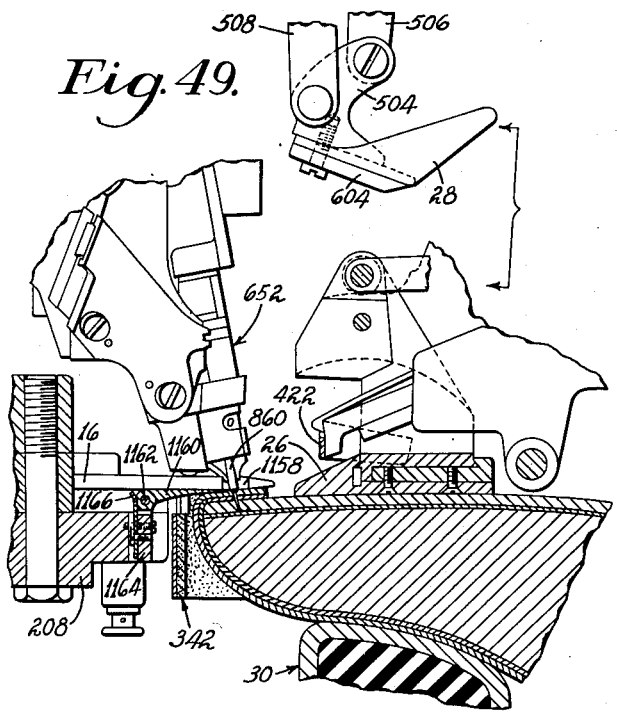

For controlling the carrier 512 with respect to swinging movement about the axis of the pin 513 on the arm 514 the upper end of the carrier is pivotally connected to one end of a link 578 the other end of which is pivotally connected by a stud 580 to an arm 582 pivotally mounted on a stud 584 on the casting 386. It is to this stud that the front end of the previously mentioned spring 570 is connected. Integral with the arm 582 is a plate 586 provided with a stud 588 on which is pivotally mounted a cam plate 590. This cam plate has therein a curved cam slot 592 in which lies a roll 594 mounted on a third arm 596 of the three-armed lever 550. Extending through a hole in the cam plate 590 and through a curved slot 598 in the plate 586 is a bolt 600 on which is threaded a wing nut 602 for clamping the cam plate in different adjusted positions to the plate 586. It will accordingly be evident that the position of the arm 582 with respect to movement about the stud 584 is determined by the roll 594 and the cam slot 592. As the parts are shown in Fig. 47, the cam plate 590 is so adjusted that the cam slot 592 is concentric with the axis of the three-armed lever 550. The position of the arm 582, therefore, is not affected by the movement of the three-armed lever and the retarder 28 remains in the same position lengthwise of the shoe as it is swung or tipped from the position shown in Fig. 46 to the position shown in Fig. 47. In operating, however, on some upper materials it may be preferable to impart to the retarder at this time a bodily movement lengthwise of the shoe in a direction away from the end of the toe with an outward wiping or spreading action on the upper. This will result from adjustment of the cam plate 590 about the stud 588 in a counterclockwise direction with reference to Fig. 47, the amount of outward wiping or spreading movement imparted to the retarder depending upon the position of the cam plate. This adjustment will be made when the parts are positioned as shown in Fig. 15, at which time the adjustment will not appreciably displace the retarder. It will be understood that when the cam plate has been so adjusted, the downward swinging movement of the arm 596 will cause the arm 582 to swing in a clockwise direction with reference to Fig. 47 and thereby to swing the carrier 512 in the same direction about the pin 513 to carry the retarder away from the end of the last. It will also be understood that during any such swinging movement of the carrier the retarder is held down on the upper by the action of the spring 522 on the arm 516. When the retarder is moved upwardly away from the upper and the wipers by the upward swinging movement of the arm 514 about the axis of the shaft 454, as hereinbefore described, this arm and the link 578 are, in effect, substantially parallel links by which the carrier 512 and the parts supported thereon are caused to move not only upwardly but also lengthwise of the shoe in a heelward direction to make room for the movement of the fastening-inserting mechanism into operative position over the toe end of the shoe, as illustrated in Fig. 49.

To insure that the lower edge of the retarder 28, in case the machine is operated without any shoe therein, will not slip downward past the edges of the wipers with possible danger of damage to the machine, there is secured to the retarder a plate 604 which will be engaged by the top faces of the wipers under those conditions to limit downward movement of the retarder relatively to the wipers. In the operation of the machine on a shoe the plate 604 as well as the retarder engages the upper and presses it on the wipers when the parts are positioned as shown in Fig. 46, but the plate is swung out of effective pressure-applying relation to the upper when the retarder is tipped to the position shown in Fig. 47.

Figure 22:
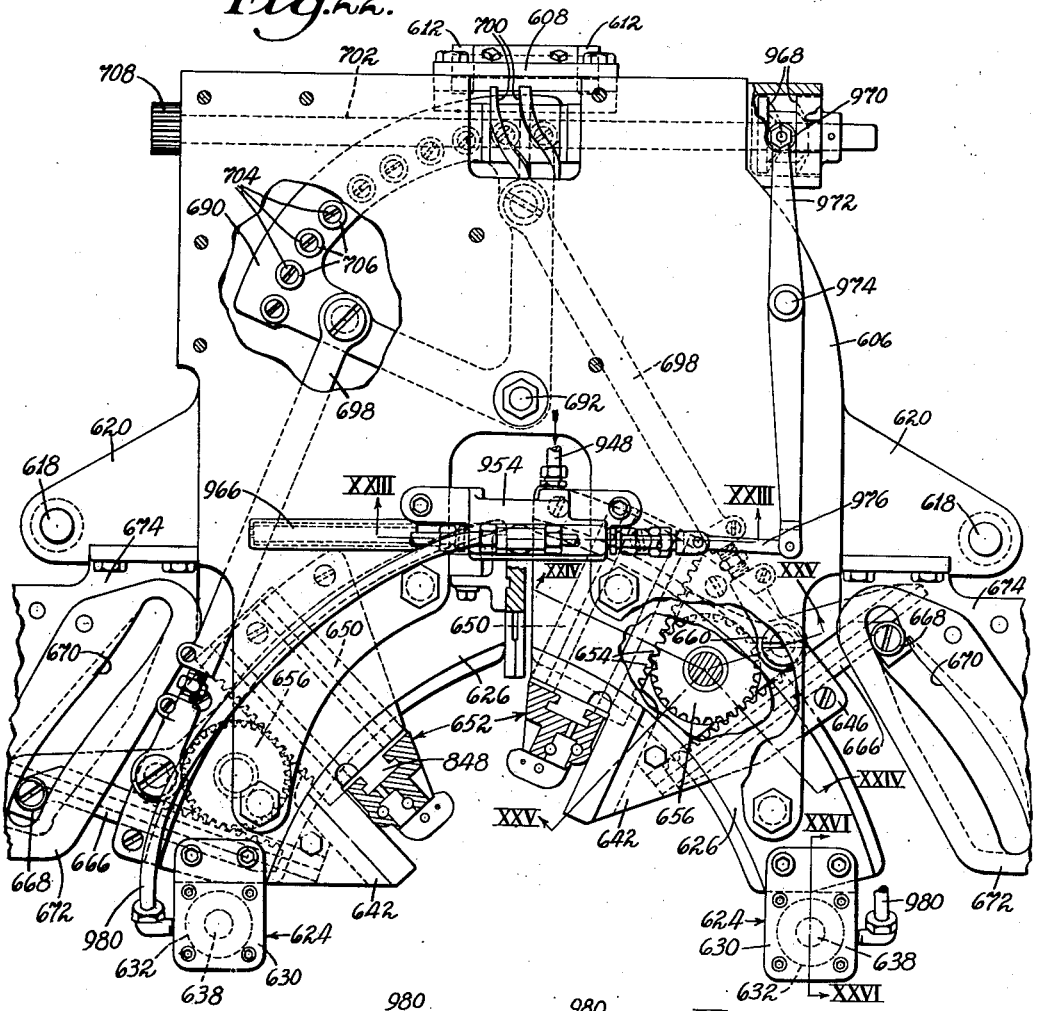
Fig. 22 is a view partly in plan and partly in section of a portion of the fastening-inserting mechanism.
Figure 26:
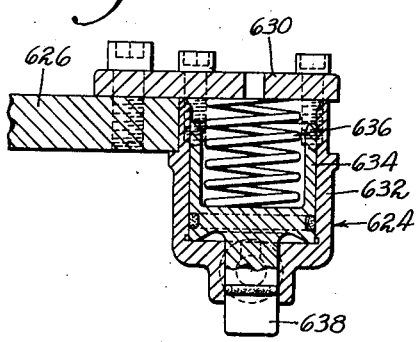
Fig. 26 is a section on the line XXVI—XXVI of Fig. 22.

The fastening-inserting mechanism by which the toe end of the upper is secured in lasted position is mounted on a support 606 (Figs. 1 and 22). Since the machine shown is constructed to drive tacks, this support may be termed a tacker support. Secured thereon is a member 608 having a downwardly extending portion in which is fastened a pin 610 (Fig. 27). Mounted on the opposite ends of this pin are two blocks 612 (see Fig. 22) arranged to serve as carriers for the support and to move in directions lengthwise of the shoe along guideways formed in a member 614 (Fig. 1) fast on the top of the frame. The tacker support 606 is therefore pivotally mounted on the blocks 612 for swinging movements heightwise of the shoe and is movable bodily with the blocks in directions lengthwise of the shoe. Both these movements are imparted to the support by a pair of crank arms 616 fast on the previously mentioned shaft 470, one of these arms being shown in Fig. 1 and the other in Fig. 2. The arms are pivotally connected to the lower ends of studs 618 which extend upwardly through lugs 620 (Fig. 22) on the sides of the support 606 and have diametrically enlarged lower end portions 622 (Fig. 1) on which the support rests. It will thus be seen that when the shaft 470 is rotated in a counterclockwise direction with reference to Fig. 1, as hereinbefore described, to withdraw the edge holddown 422 and the retarder 28 from the shoe, the tacked support 606 is advanced lengthwise of the shoe and is swung downwardly to carry tackers (hereinafter described) into positions to operate on the shoe. To limit this movement of the support 606 there are provided two stop devices 624 (Figs. 22 and 26) fastened to plates 626 which are secured by screws 628 (Fig. 18 to the support 606 for a purpose hereinafter described. Each of the stop devices includes a plate 630 secured to the corresponding plate 626, and fastened on the lower face of the plate 630 is a small cylinder 632. Movably mounted in this cylinder is a piston or plunger 634 held normally at the lower end of the cylinder by a spring 636 and having a stem 638 extending downwardly through a bore in the lower end of the cylinder. To limit the movement of the tacker support 606 the stems 638 engage plates 640 (Fig. 12) which are secured to the previously mentioned brackets 392 and 394 on the frame. The springs 636 are of such strength that they are not compressed by the weight of the support 606 and the parts thereon, and accordingly the position of the support heightwise of the shoe is determined by the engagement of the stems 638 with the plates 640. The studs 618 are slidingly mounted in the holes in the support 606 through which they extend, and after the downward movement of the support has been stopped by engagement of the stems 638 with the plates 640 the arms 616 receive some further movements and thereby move the studs 618 downwardly to space their enlarged portions 622 somewhat below the lower surface of the support for a purpose which will hereinafter be evident.

Figure 24:
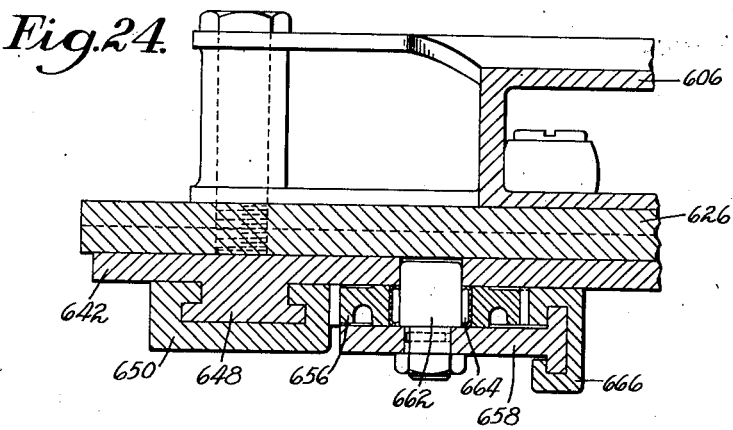
Fig. 24 is a section on the line XXIV—XXIV of Fig. 22.
Figure 25:
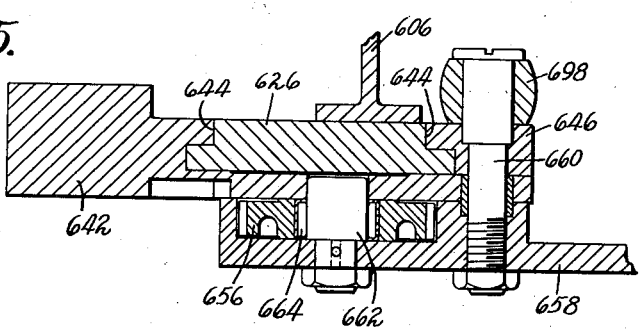
Fig. 25 is a section on the line XXV—XXV of Fig. 22.

The two plates 626 are curved to approximate the curvature of the edge of the toe end of the shoe bottom and each of them serves as a guide for a slide 642 (Fig. 22) which is supported thereon. Each of these slides extends across the corresponding plate 626 below the latter, as shown in Fig. 25, and a portion thereof extends into a groove 644 formed in the plate along the inner edge of the plate. Extending into a similar groove 644 formed along the outer edge of the plate is a gib 646 which is secured to the slide. Each slide 642 has a downwardly extending T-shaped portion 648 (Fig. 24) on which is rectilinearly movable in inward and outward directions with respect to the edge of the shoe bottom another slide 650, and supported on the inner end of this slide is a fastening-inserting device or tacker identified generally by the reference character 652 (Fig. 22) and hereinafter described in detail. Each tacker is therefore carried to different tacking positions along the edge of the shoe bottom by movement of its supporting slide 642 along the curved guide plate 626, and the distance from the edge of the shoe bottom at which each tack t is driven is determined by the position of the slide 650 relatively to the slide 642. For controlling each slide 650 there are formed thereon rack teeth 654 which are engaged by a pinion 656 supported by a plate 658 (Fig. 25), this plate being secured by a bolt 660 to the slide 642. The pinion turns about a stud 662 which is secured to the plate 658 and extends upwardly into a recess in the slide 642, and between the stud and the pinion is a roller bearing 664. The pinion is also engaged by a rack bar 666 which is guided for rectilinear movements on the plate 658 as shown in Fig. 24. Mounted on this rack bar is a roll 668 (Fig. 22) which lies in a cam slot 670 formed in a cam plate 672. As shown in Fig. 20, this cam plate is supported on a bracket 674 which is secured to one of the lugs 620 on the tacker support 606, and it is positioned in proper relation to the bracket by two pins 676 extending upwardly from the bracket into holes in the plate. The bracket has therein a slot 678 which is wider than the cam slot 670, and the roll 668 extends upwardly through this wider slot into the cam slot, as shown in Fig. 21. To hold the cam plate securely in place on the pins 676, there is provided a retaining member 680 formed to overlap both the cam plate and the bracket 674, as shown in Fig. 21, this member being pivotally mounted on a pin 682 on the bracket to permit it to be swung when desired into position to release the cam plate. A pin 684 extending upwardly from the member 680 permits the operator thus to swing it into releasing position. It is held normally in operative position by a spring-pressed plunger 686 which is mounted therein and engages a lug 688 on the bracket 674. It will be understood that the distance from the edge of the shoe bottom at which each tack is driven is determined positively by the cam plate 672, and for shoes that differ substantially as to size or style different cam plates are substituted.

For imparting to the tackers their movements lengthwise of the edge of the shoe bottom a triangular sector 690 is pivotally mounted on the tacker support 606 in a position below the support, the sector having formed thereon an upwardly extending pivot pin 692 (Fig. 27) mounted in a bushing 694 in the support and confined in the bushing by a nut 696. This sector is connected by two links 698 to the respective slides 642, the links being mounted on the upper end portions of the previously mentioned bolts 660 (Fig. 25) carried by the slides. By reference to Fig. 22 it will be seen that by swinging movement of the sector in either direction one of the tackers 652 is moved along the margin of the shoe bottom in a direction away from the extreme end of the toe and the other tacker is moved simultaneously in a direction toward the extreme end of the toe. One of the tackers accordingly drives its first tack approximately at the extreme end of the toe, as more fully hereinafter explained, and drives its other tacks thereafter in locations successively farther from the extreme end of the toe, while at the same time the other tacker drives its first tack in the location farthest from the end of the toe and drives its other tacks thereafter in locations successively nearer the end of the toe. In operating on the next shoe the directions of the movements of the tackers are reversed, the first-mentioned tacker approaching the end of the toe and the other moving away from the end of the toe. For operating the sector 690 thus to move the two tackers simultaneously to their successive tacking positions there is provided a groove cam 700 (Figs. 22 and 27) fast on a shaft 702 which is mounted to turn in bearings in the tacker support 606, the shaft being confined against lengthwise movement. Extending upwardly from the sector 690 are a plurality of studs 704 on which are mounted rolls 706 arranged in a series (Figs. 19 and 22). These rolls may be termed projections on the sector. As the cam is rotated it engages these different rolls successively and thereby swings the sector 690 intermittently to impart to the tackers step-by-step movements to their different tacking positions, the cam being so formed that the tackers are held stationary in such positions long enough for the tacks to be driven before they are moved to the next positions.

For rotating the shaft 702 alternately in opposite directions there is fast on one end thereof a pinion 708 (Figs. 19 and 22) engaged by a gear wheel 710 which is fast on a shaft 712 mounted in bearings in a housing 714 on the top of the tacker support 606. Also fast on the shaft 712 is a pinion 716 in engagement with a gear sector 718 which is fast on a shaft 720 also mounted to turn in bearings in the housing. This gear sector is connected by a link 722 to a disk 724 (Fig. 31) formed integral with a shaft 726 rotatable in bearings in the housing 714. Mounted on this shaft is a clutch 728 comprising a member 730 splined on the shaft to turn therewith and to move lengthwise thereof and a member 732 secured to a worm gear 734 rotatable on ball bearings 736 on the shaft. The two clutch members 730 and 732 have teeth thereon through which the member 730 and the shaft 726 are rotated when the member 730 is moved toward the left with reference to Fig. 31 into engagement with the member 732. The worm gear 734 is engaged by a worm 738 (Figs. 31 and 34) fast on a short shaft 740. This shaft is connected by a universal joint 742 to a telescopic shaft 744 consisting of two telescoping parts 746 and 748 (Fig. 18), the part 748 being connected by a universal joint 750 to a short shaft 752 on which is secured a pulley 754. The shaft 752 is mounted in a bearing formed in a member 756 which is secured to a housing 758 fast on the frame of the machine (Fig. 1). Surrounding the telescopic shaft 744 is a telescopic housing 760 the rear end of which is supported in a spherical bearing 762 on the member 756 and the front end of which is pivotally connected to a yoke 764 (Figs. 18 and 34) provided with a stem 766 mounted to turn in the housing 714. A collar 768 mounted in a recess in the housing and fast on the stem holds the yoke in place while permitting it to turn. It will be understood that the telescopic shaft 744 and the telescopic housing 760 permit the previously described movements of the tacker support 606 while an operating connection is maintained by the shaft between the worm 738 and the pulley 754. This pulley is driven continuously by two V-belts 770 from a pulley 772 fast on a shaft 774 on which is also secured a pulley 776 driven by a V-belt 778 from a pulley 780 on the shaft 782 of the previously mentioned electric motor 22, this shaft having also thereon a pulley 784 which drives the previously mentioned belt 20 (Fig. 1) for operating the clutch 2.

For controlling the clutch 728 (Fig. 31) there is provided a pin 786 slidingly mounted in the housing 714 to move in directions lengthwise of the shaft 726 and connected rigidly by a cross pin 788 to a block 790. Slidingly mounted in lugs 792 on this block is a pin 794 on which is secured a member 796 extending into a groove 798 in the clutch member 730. A spring 800 on the pin 794 holds the member 796 normally in engagement with the left-hand lug 792 as the parts are viewed in Fig. 31. It will thus be seen that the clutch member 730 is moved into clutching engagement with the member 732 by the member 796 in response to movement of the pin 786 toward the left with reference to Fig. 31 and that the spring 800 is yieldable to permit thereafter any further movement of the pin 786 that may take place. To impart the clutch-actuating movement to the pin there is provided an arm 802 having a rounded lower end extending into a recess in the block 790, the arm being fast on a shaft 804 mounted in a cap 806 on the housing 714. Fast on this shaft outside of the cap is an arm 808 (Fig. 32) having therein a slot 810 through which extends the upper end of a latch member 812 having a shoulder 814 normally in engagement with a plate 816 on the arm. The lower end of the latch member 812 is pivotally mounted on a stud 818 supported on one end of a lever 820 which is pivotally mounted between its opposite ends on a pin 822 on the housing 714. A spring 824 connected to the lever 820 and to the latch member 812 holds the latter normally against the plate 816. The other end of the lever 820 is arranged to be depressed by the operator, and it will be evident that by such movement of the lever the arm 808 is swung in a clockwise direction with reference to Fig. 32 to move the clutch member 730 into engagement with the member 732. The lever 820 is thus movable against the resistance of a spring 826 which is coiled around the pin 822 and is anchored at one end to a stud 828 on the pin, the other end of the spring engaging a pin 830 on the lever and tending to swing the lever in a clockwise direction. The movement of the lever in either direction is limited by a stop pin 832 which extends from the housing 714 into a recess 834 in the lever.

Figure 31:
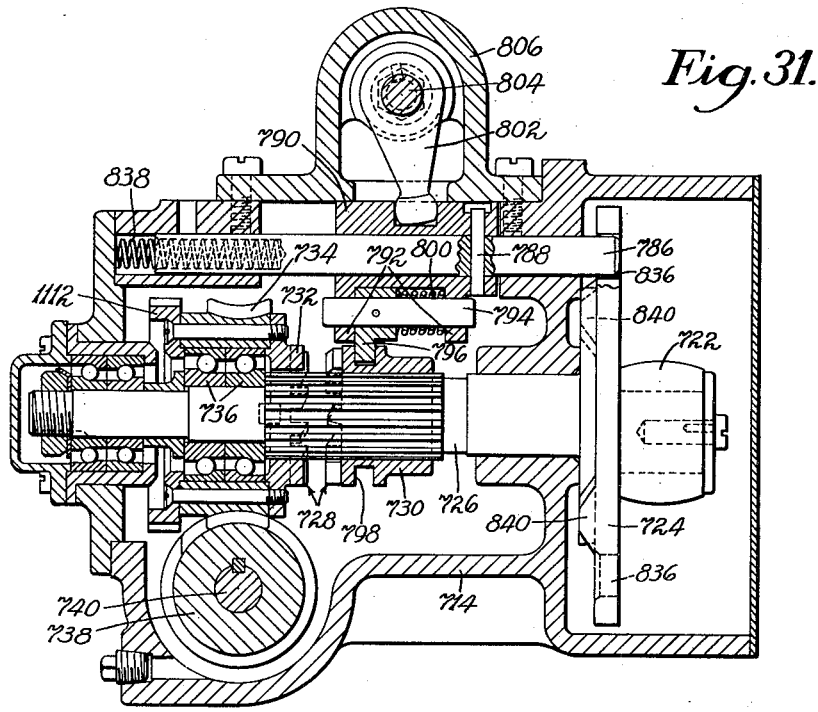
Fig. 31 is a section on the line XXXI—XXXI of Fig. 18 on an enlarged scale.
Figure 32:
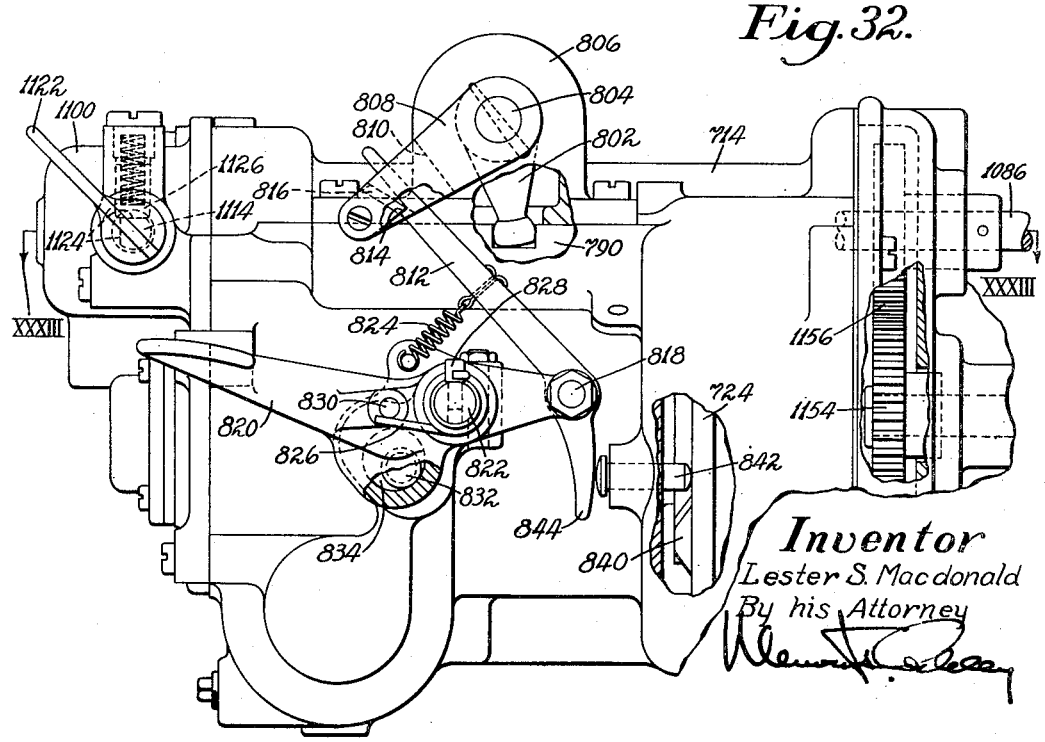
Fig. 32 is a view in front elevation of a portion of the structure shown at the left-hand side of Fig. 18.

Initially one end of the pin 786 extends into one or the other of two holes 836 formed in the disk 724, as shown in Fig. 31, and when it is moved as above described to connect the clutch member 730 to the member 732 it is withdrawn from the hole to permit the rotation of the shaft 726. When the operator releases the lever 820 the pin 786 is pressed by a spring 838 against the face of the disk, and when the next hole 836 arrives in alinement with the pin at the end of a half revolution of the disk the spring 838 moves the pin into that hole and simultaneously disconnects the clutch member 730 from the member 732. It will be understood that a half revolution of the disk is all that is required to move the tackers to their different tacking positions in operating on one shoe. To insure that the disk will not be turned more than a half revolution if the operator should continue to hold the lever 820 depressed, the disk is provided on one face thereof with two cam lugs 840 arranged to engage and operate a pin 842 slidingly mounted in the housing 714. This pin is arranged to engage a tail 844 on the latch member 812 and, when operated by either cam lug, to swing the latch member and thus to disengage it from the plate 816 if the operator is holding the lever 820 depressed. The arm 808 then receives a short reverse movement as the spring 838 moves the pin 786 into engagement with the disk 724, so that the operator must release the lever 820 before the shoulder 814 on the latch member 812 can again engage the plate 816. If the operator has already released the lever 820 before the cam lug operates the pin 842, the latch member merely receives an idle movement as the pin 842 acts thereon. The cam lug, however, is so positioned on the disk 724 as to engage and operate the pin almost immediately after the beginning of the rotation of the disk, as is evident from Fig. 19, the cam lug then passing beyond the pin to permit return of the latch member by the spring 824.

Figure 42:
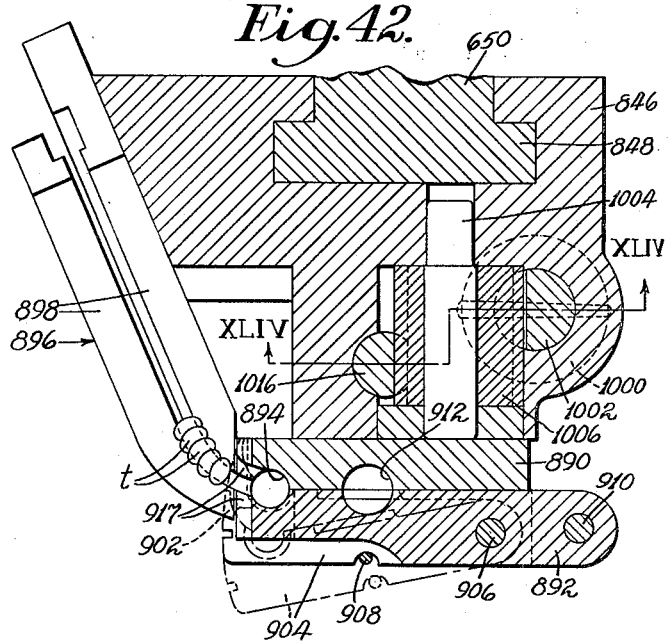
Fig. 42 is a section on an enlarged scale on the line XLII—XLII of Fig. 40.

Each of the tackers 652 includes a casting 846 (Figs. 37, 40 and 41) mounted on the inner end of the slide 650, the casting having therein a T-slot in which lies a correspondingly formed projection 848 (Figs. 22 and 42) formed on the slide. A flange 850 (Figs. 37 and 39) on the casting 846 rests on the upper surface of an upwardly extending portion of the slide 642, and an inwardly extending portion 852 of this slide lies in a guideway 854 (Fig. 40) in the casting. The slide 642 therefore assists in guiding the casting 846 as the latter is moved inwardly or outwardly by the slide 650. Mounted in the casting 846 for downward and upward movements is a hollow driver bar 856 and secured on the lower end of this bar by a clamp member 858 is a tack driver 860 for driving a tack controlled by means hereinafter described. Formed in the driver bar are slots 862 through which extends a pin 864 mounted in the casting 846, and resting on this pin is a block 866 on which is seated the lower end of a spring 868 in the driver bar. The spring is confined under compression in the hollow driver bar by a screw 870 threaded in a head portion 872 of the bar. It will thus be seen that this spring serves to return the driver after the driving of the tack, its return movement being limited by means hereinafter described.

Formed in the casting 846 is a cylinder 874 in which is mounted a piston 876, and extending upwardly from this piston through a bore in the casting is a piston rod 878. This rod also extends upwardly through a hole formed in the head portion 872 of the driver bar 856, and threaded on the upper end portion of this rod is a mainly spherical member 880 in engagement with upwardly and downwardly curved bearing faces 882 (Fig. 39) formed on the head portion 872. The member 880 is locked on the rod by a nut 884 which engages an upwardly extending cylindrical portion 886 of the member. It will thus be seen that the driver bar 856 is moved downwardly to operate the driver by downward movement of the piston 876 and, as shown in Fig. 41, the return movement of the driver bar by the spring 868 is limited by engagement of the piston with the casting 846. In the construction herein shown the piston 876 of each tacker is arranged to be operated by compressed air under control of means hereinafter described.

Secured to the lower end portion of each casting 846 by screws 888 (Fig. 40) are two plates 890 and 892 (Fig. 42) in which is formed a passage 894 in alinemment with the driver 860. Also secured to the lower end portion of the casting is a tack raceway 896 comprising two parts 898 fastened together with a slot between them for the shanks of the tacks, the heads of the tacks resting on the upper surfaces of these parts. The lower end of the raceway engages the plates 890 and 892 near the passage 894 and has therein a transverse slot 900 (Fig. 38) to receive a separator finger 902 (Fig. 42) formed on a separator 904 which is pivotally mounted on a pin 906 in the plate 892. Normally the separator 904 is held by a spring 908 in position to close the lower end of the raceway, as shown in full lines in Fig. 42, this spring being coiled around a pin 910 in the plate 892 with one end anchored to one of the screws 888 and the other end engaging the separator. Also formed in the plates 890 and 892 is a passage 912 which is in alinement with a rod 914 (Fig. 40) secured to the driver bar 856 by the clamp 858. This rod has a lower inclined face 916 arranged to engage the separator 904 and to swing it into position to release the tacks in the raceway 896 when the driver bar is moved downwardly to operate the driver. When the tacks are thus released the driver is in the passage 894, and accordingly the end tack in the raceway moves into a position adjacent to the driver where its head is supported on surfaces 917 (Fig. 42) on the plates 890 and 892. When the driver is thereafter retracted the separator is swung inwardly by its spring 908 to cause its finger 902 to enter the space between the shank of the end tack and that of the next tack and to force the end tack into the passage 894 as soon as the driver moves upwardly beyond this passage, the finger at the same time closing the raceway.

Figure 43:
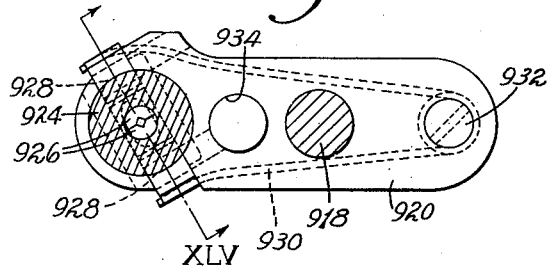
Fig. 43 is an enlarged section on the line XLIII—XLIII of Fig. 40.
Figure 45:
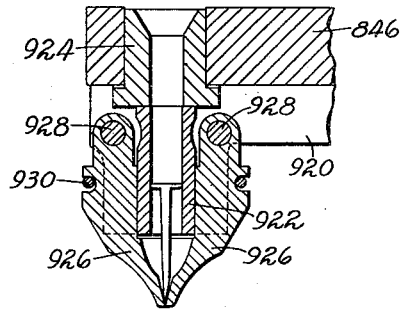
Fig. 45 is a section on the line XLV—XLV of Fig. 43.

Secured to the lower end of the casting 846 by a screw 918 (Figs. 40 and 43) is a block 920 a tubular portion 922 of which (Fig. 45) serves as a pocket to receive the tack. This tubular portion is in alinement with the passage 894 (Fig. 42), and between them is a tack-guiding bushing 924 inserted in the lower end portion of the casting 846. To support the tack for the operation of the driver thereon and also to serve as a guide for the tack as it is driven there are provided two tack fingers 926 the upper ends of which lie in a slot in the block 920 and are pivotally mounted on pins 928 in the block. The tack fingers are normally held in tack-supporting positions by a spring 930 which is coiled about a stud 932 in the block and bears on the outer sides of the fingers. Formed in the block is a hole 934 to receive the lower end of the rod 914.

Figure 23:
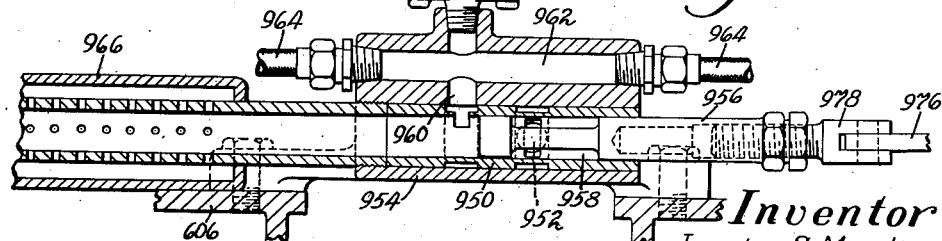
Fig. 23 is a section on the line XXIII—XXIII of Fig. 22, on an enlarged scale.

The compressed air for operating the pistons 876 to drive the tacks may be obtained from a source of factory supply if such a supply is available. The machine herein shown, however, is provided with an air pump 936 (Fig. 1) supported on the rear of the frame and driven by an electric motor 938. The pump delivers air through a pipe 940 into a reservoir 942 provided with a suitable relief valve (not shown), and leading from this reservoir is a pipe 944 connected by a flexible tube 946 with another pipe 948 which is mounted on the movable tacker support 606 and is in communication with a cylinder 950 (Fig. 23) through a port 952 in the cylinder. The cylinder consists of a sleeve inserted in a bore in a casting 954 which is fastened on the top of the tacker support 606. Mounted in the cylinder is a piston valve 956 having therein an annular recess 958 with which the port 952 communicates. Movement of the valve toward the left from the normal position in which it is shown in Fig. 23 serves to establish communication between the port 952 and another port 960 opening into a chamber 962 in the casting 954, this chamber communicating through flexible tubes 964 with the two tackers 652. Return movement of the valve thereafter permits exhaust of the air from the chamber 962 to the atmosphere through a muffler 966. The valve is reciprocated in proper time relation to the movements of the tackers to their different tacking positions by a groove cam 968 on the shaft 702, this cam engaging a roll 970 mounted on the rear end of a lever 972. The lever is pivotally mounted between its opposite ends on a stud 974 on the tacker support 606, and its front end is connected by a link 976 to a member 978 adjustably connected to the valve 956.

Figure 50:
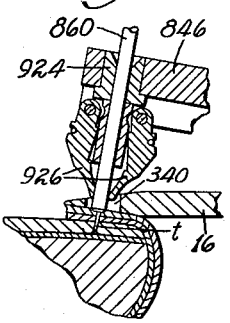
Fig. 50 is a view in vertical section showing a portion of one of the fastening-inserting devices in its relation to the shoe when the driver is at the end of its driving movement.

As hereinbefore explained, prior to the tacking operation the tacker support 606 is moved forwardly lenthwise of the shoe and is swung downwardly to a position determined by the engagement of the stems 638 (Figs. 22 and 26) of the pistons 634 with the plates 640 (Fig. 12) on the frame of the machine. When the tacker support is thus positioned the tack fingers 926 are located slightly above the plane of the top faces of the wipers. When the tacks are driven, however, it is desirable, for better control of the tacks, that the tack fingers be located as close as possible to the margin of the upper. The lower ends of the cylinders 632 in which the pistons 634 are mounted are therefore in communication through pipes 930 with the chamber 962 (Fig. 23). Accordingly, when compressed air is admitted by the valve 956 to the tubes 964 leading to the tackers, it is also admitted to the lower ends of the cylinders 632 and raises the pistons 634 against the resistance of their springs 636. This causes the tacker support 606 to be swung farther downwardly by gravity, thus carrying the tack fingers 926 into the openings 340 in the wipers when they are in alinement with these openings (see Fig. 50). When the valve 956 is thereafter moved into position to release the air from the chamber 962 the springs 636 return the pistons 634 to the lower ends of the cylinders 632, thus swinging the tacker support upwardly to a position in which the tack fingers will clear the wipers when the tackers are moved to the next tacking positions.

Figure 44:
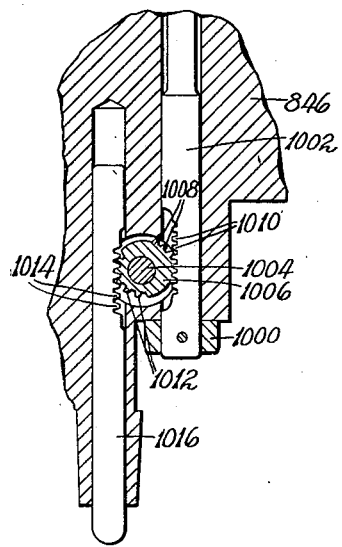
Fig. 44 is a section on the line XLIV—XLIV of Fig. 42.

The compressed air conducted to the tackers by the tubes 964 is not admitted directly into the cylinders 874, but is admitted through passages 982 (Figs. 39 and 41) in the castings 846 into cylinders 984 formed in the castings. Mounted in each of these cylinders is a piston valve 986 having an annular recess 988 in constant communication with the passage 982. Initially, as shown in Fig. 41, this annular recess is out of communication with a port 990 which leads from the cylinder 984 into the cylinder 874 above the piston 876. The port 990 is in communication at this time with another annular recess 992 in the valve, this recess communicating through a port 994 in the valve with a passage 996 formed centrally in the valve and leading to the atmosphere. The valve is held in its initial position by a spring 998 which tends to move it upwardly, its position being determined by a collar 1000 which is fast on the lower end of a stem 1002 on the valve and engages a lower face on the casting 846. It will be understood that in response to downward movement of the valve 986 compressed air is admitted through the port 990 into the cylinder 874 to impart downward movement to the piston 876 and thus to drive the tack. Such downward movement of the valve is effected in response to that downward movement of the tacker support 606 and the tackers which results, as above explained, from the admission of compressed air to the cylinders 632. For this purpose there is rotatably mounted on a pin 1004 (Figs. 42 and 44) in the casting 846 a member 1006 provided with teeth 1008 in engagement with teeth 1010 formed on the valve stem 1002 and with other teeth 1012 in engagement with teeth 1014 formed on a rod 1016 the lower end of which extends downward to a position somewhat below the casting 846, the teeth 1008 being farther from the pin than the teeth 1012. When the tacker support 606 is swung to the position determined by engagement of the stems 638 with the plates 640, the lower ends of the rods 1016 are carried downward substantially as far as the top faces of the wipers without disturbing the valves 986. When the tacker support thereafter receives its further downward movement in response to the admission of compressed air to the cylinders 632, engagement of the rods 1016 with the wipers causes the valves 986 to move downwardly and thus to admit the compressed air above the pistons 876 to operate the tack drivers. It will be evident that since the downward movements of the valves 986 thus depend upon the admission of air to the cylinders 632, the operation of these valves is slightly retarded as compared with the operative movement of the valve 956. When the tacker support is moved upwardly by the springs 636 in response to release of the air from the cylinders 632 after each tacking operation, the valves 986 are returned to their initial positions by the springs 998, exhaust of the air from the cylinders 874 then taking place through the passages 996 in the valves as the driver bars 856 are returned by their springs 868. Exhaust of the air from the cylinders 874 may, however, begin to take place through the annular recesses 988 in the vlaves 986 as soon as the valve 956 in its movement to exhaust position begins to uncover the port 969 (Fig. 23). The positioning of the teeth 1008 on each member 1006 farther from the pin 1004 than the teeth 1012 results in accelerating the downward movements of the valves 986.

In operating on some shoes it may not be desired to drive tacks through all the openings 340 in the wipers. For example, it may not be desired to drive tacks through one or more of the openings in each wiper which are located farthest from the end of the toe. To prevent the driving of such tacks the wipers which are used in operating on those shoes are so formed as to prevent the downward movements of the valves 986 when the tackers are in the positions where they would otherwise drive those tacks. The wipers herein shown, for example, are provided with recesses or slots 1017 (Figs. 6 and 51) so located as to be immediately below the lower ends of the rods 1016 when the tackers are in the positions for driving tacks through the two openings 340 in the different wipers which are farthest from the end of the toe. Accordingly, in the downward movement of the tacker support 606 which takes place in response to the admission of compressed air to the cylinders 632 the lower ends of the rods 1016 enter the slots 1017 and the valves 986 remain in positions to prevent compressed air from entering the cylinders 874 regardless of the movement of the valve 956 into position to admit the air to the tubes 964. It will be understood that such slots or recesses may be provided in any locations in the wipers to receive the rods 1016 and thus to vary as desired the number and arrangement of the tacks which are driven.

To insure that the tacks will not be displaced from each tacker raceway 896 as the tacker is moved to its different tacking positions, a member 1018 (Fig. 38) is secured to the casting 846 to serve as a cover over the heads of the tacks. Further to insure that none of the tacks will be displaced from the upper ends of these inclined raceways, there is pivotally mounted on a pin 1020 in a recess in each member 1018 a tack-retaining member 1022 held normally by a spring 1024 in position to close the upper end of the raceway.

Figure 18:
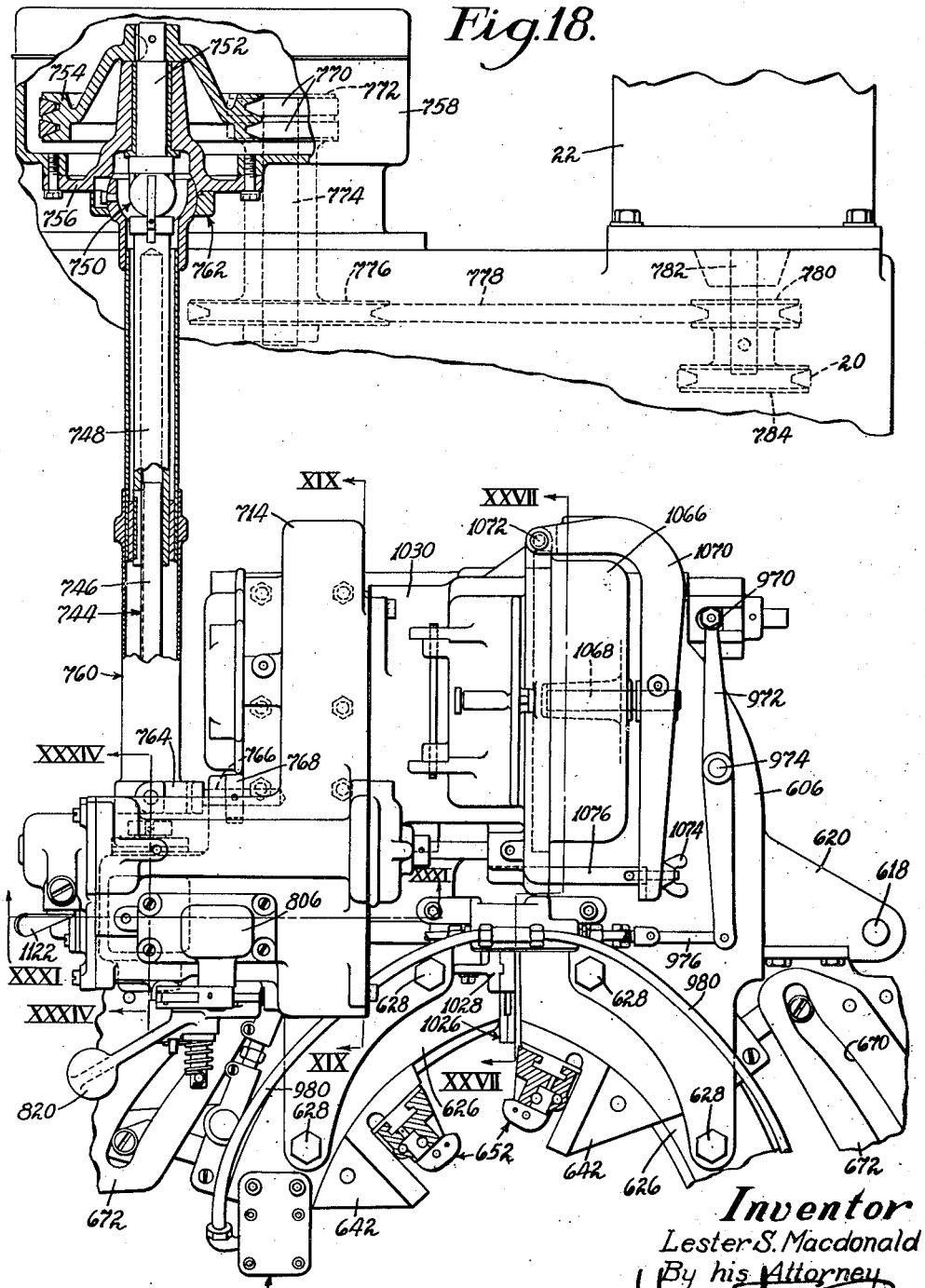
Fig. 18 is a plan view of the fastening-inserting mechanism and of other portions of the machine associated therewith, with parts broken away.

For supplying the two tacker raceways 896 with tacks there is provided a single tack supply raceway 1026 (Fig. 27) the lower portion of which is secured to a bracket 1028 (Figs. 18 and 27) fast on the tacker support 606 and the upper portion of which is secured to a housing 1030 on the tacker support, this housing being secured to the previously mentioned housing 714 (Fig. 18). Mounted over the raceway 1026 is a member 1032 which serves as a cover to prevent displacement of the tacks. Substantially at the end of the tacking operations on each shoe one of the tacker raceways 896 is carried by the movement of the corresponding slide 642 into alinement with the tack supply raceway 1026 to receive a supply of tacks, a finger 1034 (Figs. 27, 30 and 38) fast on the member 1032 engaging an upwardly extending portion 1036 of the tack-retaining member 1022 and swinging this member to open the upper end of the raceway 896. To insure against damage in case any tack should become wedged between the tacker raceway 896 and the raceway 1026, there is provided a yieldingly movable block 1038 (Figs. 27 and 29) which serves as the lower end portion of the raceway 1026 and has therein a groove 1040 to receive the shanks of the tacks. A bracket 1042 secured to the raceway 1026 is provided with a pin 1044 on which the lower end portion of the block 1038 is pivotally mounted for swinging movements lengthwise of the raceway 1026. A spring 1046 tends to swing the block in a forward direction about the pin 1044, its movement in this direction being limited by engagement of a forked lower portion of the block with shoulders 1048 on the bracket 1042. In case, therefore, any misplaced tack should prevent one of the tacker raceways 896 from moving freely into alinement with the raceway 1026, the block 1038 will yield in a rearward direction to permit completion of the movement of the tacker raceway.

To retain the tacks in the tack supply raceway 1026 there is provided on the block 1038 a gate member 1050 which is normally in position to engage the shank of the lowest tack, as shown in Fig. 29. A stem 1052 formed on the gate member is mounted to turn in a bearing in the block, and mounted on this stem is a spring 1054 which at its front end engages a face on the block and at its rear end engages a collar 1056 fast on the stem to hold the gate member pressed rearwardly against the block. Secured to the opposite sides of the block are leaf springs 1058 which bear against the opposite sides of the gate member and hold it normally in a central position as shown in Fig. 29. Mounted on the gate member are two forwardly extending pins 1060 arranged to be engaged respectively by the different tacker raceways 896 as the latter approach their positions of alinement with the supply raceway to swing the gate member into position to release the tacks in this raceway and thus to permit them to move downward upon the tacker raceway. It will be understood that one of the tacker raceways thus receives a supply of tacks after the operation of the tacking mechanism on one shoe and that the other tacker raceway receives tacks after the operation of the tacking mechanism on the next shoe, each raceway carrying enough tacks to operate on at least two shoes. It will further be understood that as either tacker raceway moves out of alinement with the supply raceway the gate member 1050 is returned by one or the other of the springs 1058 to its normal position to prevent loss of tacks from the supply raceway and the tack-retaining member 1022 is returned into position to close the upper end of the tacker raceway.

The tack supply raceway 1026 extends upwardly into a chamber in the housing 1030 through an opening 1062 (Fig. 27) in the housing, portions of this opening around the raceway being closed by a plate 1064. Tacks are supplied to the raceway in a well-known manner by a rotary hopper 1066 which, as shown in Fig. 18, is rotatably mounted on a pin 1068 supported on an arm 1070, this arm being pivotally mounted at 1072 on the housing 1030 and being held stationary by a wing nut 1074 threaded on a pin on the end of a member 1076 fast on the housing. The rotary hopper is provided as usual with vanes 1078 which lift the tacks and spill them over the raceway 1026, the raceway having fast on its upper end a trough 1080 to receive the tacks and to assist in directing them into the groove in the raceway. The hopper is provided on its periphery with gear teeth 1082 covered by a flange on the housing 1030, these teeth being engaged by an idle gear 1084 which engages a gear 1085 fast on one end of a shaft 1086 mounted in bearings in the two housings 1030 and 714. Near its other end (Fig. 33) this shaft has rotatably mounted thereon a gear 1088 having a sleeve portion 1090 extended along the shaft and in engagement at one end with a thrust bearing 1092. Fastened to the shaft by a pin 1094 (Fig. 36) is a sleeve 1096 in engagement at one end with the gear 1088 and at the other end with a thrust bearing 1098 mounted in a cap 1100 on the housing 714. Connected to the sleeve 1096 by a spline 1102 to slide thereon is a sleeve 1104 having on one end thereof clutch teeth 1106 arranged to engage similar teeth 1108 on the side of the gear 1088. The sleeve 1104 and the gear 1088 therefore serve as clutch members by which the gear may be connected to or disconnected from the shaft 1086 to initiate or stop the rotation of the tack hopper 1066. The gear 1088 is connected by an idle gear 1110 (Fig. 34) to a gear 112 (Fig. 31) which is secured to the previously mentioned constantly driven worm gear 734. For moving the sleeve 1104 toward or from the gear 1088 to start or stop the rotation of the tack hopper there is provided a pin 1114 rotatably mounted in the cap 1100 and having an eccentric portion 1116 extending into a shoe 1118 which lies in a peripheral groove 1120 in the sleeve 1104. On the outer end of the pin is a handle 1122 for turning it. The pin has thereon two flat faces 1124 (Fig. 32) arranged to be engaged by a spring-pressed plunger 1126 (see Fig. 36) mounted in a recess in the cap 1100 for holding the sleeve 1104 in its different positions.

Secured to the housing 1030 by a screw 1128 (Figs. 27 and 28) is a member 1130 which extends upwardly along the raceway 1026 through an opening in the plate 1064, and guided by this member for movements lengthwise of the raceway is a slide 1132 also extending upwardly through the plate 1064 with its upper end portion located just above the heads of the tacks in the raceway. A spring 1134 in engagement at its front end with the member 1130 and at its rear end with a block 1136 fast on the slide 1132 tends to move the slide in an upward direction along the raceway, its movement in this direction being limited by engagement of the block 1136 with a limiting face on the member 1130. A lever 1138 pivotally mounted on a pin 1140 on the member 1130 is in engagement at its lower end with a pin 1142 on the slide 1132. By this lever, therefore, the slide may be moved downwardly along the raceway by the operator and then released to permit it to be returned by the spring 1134 one or more times to clear from over the raceway any tack or tacks which may have become displaced in such manner as to prevent the normal movement of the tacks downwardly along the raceway. The slide 1132 is provided with a curved upper face 1144, and over this face is positioned a rotary tack clearer 1146 provided with fingers 1148 movable along the curved face 1144 to clear in a well-known manner from over the raceway any tacks which fail to enter the raceway. The tack clearer is mounted on a shaft 1150 (Fig. 33) rotatable in a bearing in the housing 1030 and having fast thereon a gear 1152 in engagement with an idle gear 1154 which is engaged in turn by a gear 1156 fast on the shaft 1086. The tack clearer 1146 is therefore driven continuously by the shaft 1086 as long as this shaft is rotated.

Figure 51:
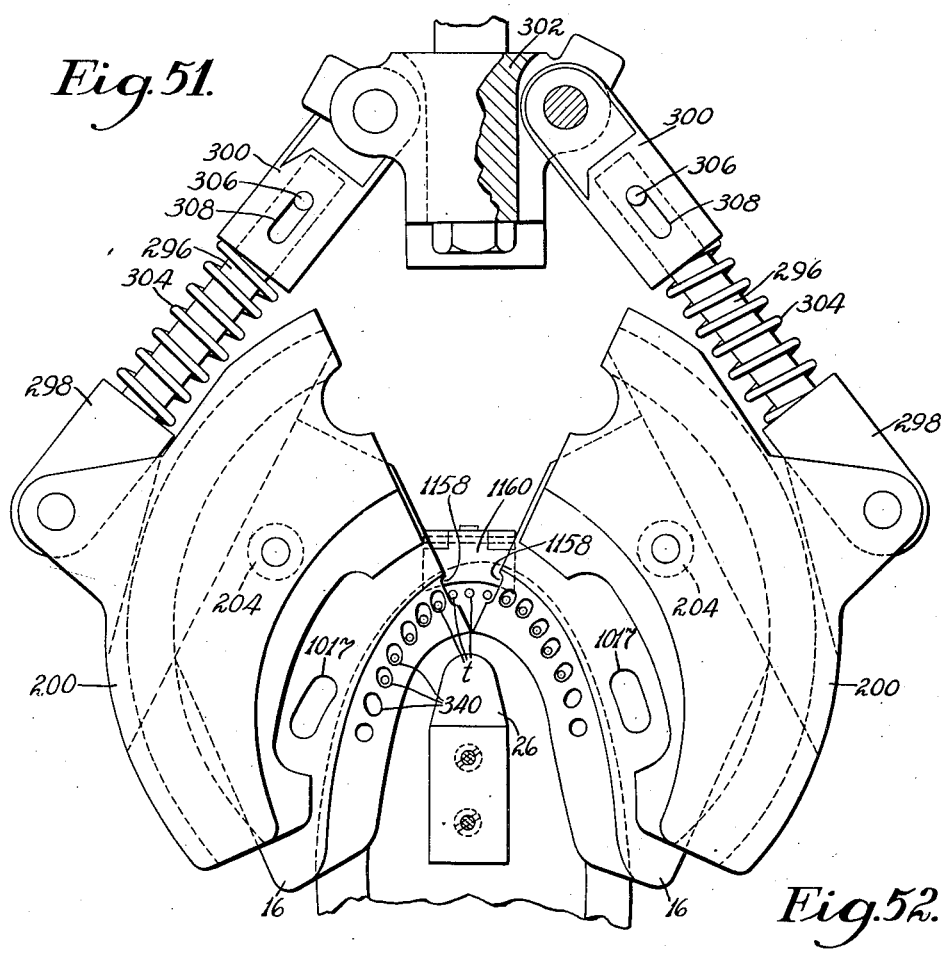
Fig. 51 is a plan view showing the wipers as they appear at the end of their advancing and closing movements over the shoe and also showing the fastenings as having been driven.
Figure 53:
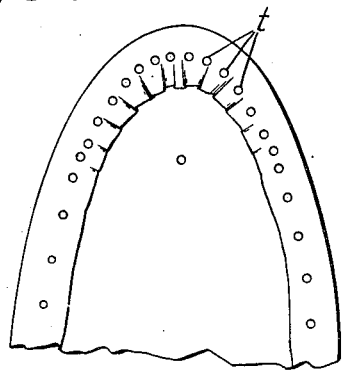
Fig. 53 is a plan view showing the bottom of the forepart of the shoe as it appears after the toe-lasting operation.

When the wipers are in their fully advanced and closed positions there is a V-shaped opening between them at the end of the toe, as common in lasting machines and as shown in Fig. 51, and three of the tacks are driven into the shoe in this V-shaped opening. When the parts of the tacker mechanism are in their starting positions one of the tackers is located at the extreme end of the toe with its raceway 896 in alinement with the tack supply raceway 1026, as hereinbefore explained, this being the position in which that tacker drove its last tack midway between the sides of the above-mentioned V-shaped opening in operating on the preceding shoe. In view of the initial relation between the groove cam 700 (Fig. 22) which advances the tackers to their different tacking positions and the groove cam 968 which controls the valve 956, the cam shaft 702 at the beginning of its movement causes the two tackers to move to their next tacking positions before the valve 956 is operated to admit compressed air to the tubes 964 leading to the tackers and to the pipes 980 leading to the cylinders 632. The tacker at the end of the toe, therefore, drives its first tack in the V-shaped opening between the wipers adjacent to one side of that opening, and near the end of the tacking operation the other tacker drives two tacks in that opening, the last tack being the central tack. In operating on the next shoe the two tackers similarly receive their first positioning movements before driving any tacks, and accordingly the tacker which drove two tacks in the V-shaped opening in operating on the preceding shoe drives a single tack in that opening at one side thereof. To provide sufficient room for the tack fingers 926 when they drive tacks in the V-shaped opening in locations adjacent to the wipers, portions of the wipers at the sides of the opening have recesses 1158 therein (Fig. 51). It will be understood that preparatory to the driving of a tack in the V-shaped opening either tacker is lowered by downward movement of the tacker support 606 the same as when the tacks are driven through the openings 340 in the wipers.

When tacks are driven as above described in the V-shaped opening between the wipers it is desirable that the upper adjacent to the edge of the insole below the opening be pressed down on the insole. The machine is accordingly provided with a plate 1160 (Figs. 49 and 51), positioned in contact with the lower wiping faces of the wipers and arranged to bridge the V-shaped opening between them when the wipers are at the end of their advancing and closing movements. This plate tapers to a comparatively thin edge portion which is moved with the wipers lengthwise only of the shoe over the upper adjacent to the edge of the insole but at the end of the wiping operation terminates short of the locations where the tacks are to be driven. The plate is pivotally mounted on a pin 1162 supported on a member 1164 which is secured to the wiper carrier 208. A leaf spring 1166 secured to this member bears against a portion of the plate 1160 adjacent to the pin 1162 and holds the plate yieldingly against the lower faces of the wipers. To provide clearance for this plate the upper portion of the band 342 opposite the end of the toe has a recess 1168 therein.

The manner of operation of the machine as a whole will now be briefly summarized. The operator presents a shoe to the machine with the bottom of its forepart under the plate 26 and with the toe-end face of the last against the retarder 28 which positions the shoe lengthwise and also, by reason of its curved shape, determines approximately the correct position of the toe end of the shoe laterally. As the shoe is thus presented the edge holddown 422 engages the margin of the toe end of the insole in a location spaced a short distance inwardly from the edge of the insole. The operator then starts the cycle of operations of the machine by depressing the treadle 10, whereupon the toe rest 30 is raised and clamps the shoe against the plate 26, the edge holddown 422 being lifted slightly by the shoe against the resistance of the resilient latch 430. At this time the toe rest is controlled by the comparatively light spring 36 (Fig. 1). As the toe rest is thus moved upwardly the bar 192 (Fig. 2) which moves therewith releases the arm 188, which causes the valves 174 (Fig. 9) of the hydraulic heel-rest-locking mechanisms to be closed by their springs 180 preparatory to rearward movement of the heel rest 66 (Fig. 3) into engagement with the heel end of the shoe. This movement of the heel rest takes place shortly after the beginning of the cycle and is accompanied by downward movements of the cylinders 164 of the hydraulic locking mechanisms, these mechanisms thereafter holding the heel rest firmly against reverse movement.

Early in the cycle of operations the wipers 16 are partially advanced and closed about the toe end of the shoe preparatory to the wiping of the upper heightwise of the last. As the wipers are thus advanced lengthwise of the shoe by the cam-operated lever 218 (Fig. 4), the bell-crank 248 carried by this lever also is swung more or less by the normally stationary cam 258 which controls it to increase the advancing movement of the wipers to an extent depending upon the adjustment of the cam. In this manner the position of the wipers lengthwise of the shoe in the wiping of the upper heightwise of the last is adjustably determined. To cause the wipers thus to act on the upper the wiper carrier 208 is swung upwardly, and when the wipers arrive in the position illustrated, for example, in Fig. 46 they clamp the outspread upper against the retarder 28 which is so inclined at that time that the upper is first clamped at the end only of the toe. As the wipers continue their upper movement they lift the retarder against the resistance of the spring 522, the arms 514 and 516 swinging about the shaft 454. When the wipers arrive in the position illustrated, for example, in Fig. 47, the cam 572 (Fig. 1) swings the lever 562 and the three-armed lever 550 (Fig. 47) to cause the arm 548 of the latter to swing or tip the retarder into position to clamp the upper on the wipers at the sides as well as at the end of the toe. As the parts are herein shown, this tipping movement of the retarder is not accompanied by any bodily movement thereof lengthwise of the shoe, but as hereinbefore explained, the cam plate 590 may be so adjusted as to cause the retarder at this time to receive a bodily movement lengthwise of the shoe in a direction away from the toe end of the last with an outward spreading or wiping action on the upper. In their further upward movement, while still lifting the retarder, the wipers arrive in positions for wiping the marginal portion of the upper inwardly over the insole.

As the wipers are moved upwardly as above described the toe end of the shoe may be shifted in a widthwise direction relatively to the plate 26 by pressure of one or the other of the wipers thereon to position it in this respect more accurately than determined preliminarily by the retarder 28. Such movement of the shoe is accompanied by movement of the toe rest 30 against the resistance of one or the other of the springs 64 (Fig. 10), as hereinbefore explained, the movement of the toe rest being facilitated by reason of the fact that it is pressed upwardly at this time through the comparatively light spring 36. Substantially at the end of the upward movement of the wipers, preparatory to the wiping of the upper inwardly over the insole, the toe rest is subjected to the force of one or the other or both of the heavier springs 38, 40 (Fig. 2) in the same manner as disclosed in the previously mentioned Letters Patent No. 2,224,146, but at a slightly earlier time in the cycle than in that earlier machine. This results in frictional engagement of the block 54 (Fig. 11) with the block 44 to hold the toe rest thereafter against further shifting movement while at the same time the shoe is pressed more firmly against the plate 26.

Figure 52:
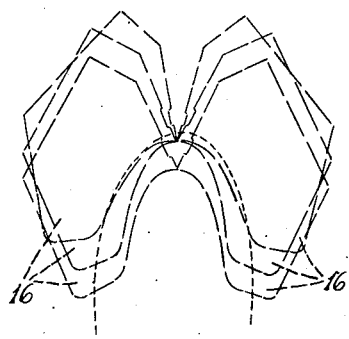
Fig. 52 is a diagrammatic view showing different positions assumed by the wipers in wiping the upper inwardly over the insole.

The wipers having arrived at the limit of their upward movement, they are operated to wipe the margin of the upper inwardly over the insole, being first moved bodily lengthwise of the shoe without any closing movements, as hereinbefore explained. As they thus begin to wipe the upper over the insole at the end of the toe, the cam 484 (Fig. 1) swings the lever 478 and thereby turns the shaft 470, as a result of which the retarder is carried upwardly away from the wipers by the movement of the arm 516 and the edge holddown 422 is retracted from the insole by the action of the cam plate 464 on the arm 458, the retarder and the holddown thus being moved to the positions in which they are shown in Fig. 49. After partially wiping the upper inwardly at the end of the toe the wipers are closed inwardly widthwise of the shoe to wipe the upper fully over the insole at the sides of the toe without further advancing movement lengthwise of the shoe, and thereafter they are further advanced without any additional closing movements to complete the wiping operation, as illustrated in Fig. 52. As hereinbefore explained, the limit of the movement of the wipers lengthwise of the shoe is invariable, as determined by the stationary cam 258 (Fig. 4), and the limits of their closing movements widthwise of the shoe are positively determined by engagement of the nipples 204 (Figs. 6 and 7) with the wiper carrier 208 and of the pins 306 with the members 300. By the final advancing movement of the wipers lengthwise of the shoe the wiping plate 1160 is caused to wipe inwardly over the portion of the upper adjacent to the edge of the insole below the V-shaped opening between the wipers which results from their closing movements. By the movement of the wiper carrier 208 lengthwise of the shoe to cause the wipers first to wipe the upper partially inward at the end of the toe the band 342 is caused to engage the shoe at the opposite sides of the toe in the manner hereinbefore explained and thus to assist in preventing thereafter any lateral displacement of the toe end of the shoe by the closing of the wipers.

The above-described movement of the shaft 470 by the lever 478 to withdraw the retarder and the edge holddown from the shoe also serves, through the arms 616, to advance the tacker support 606 lengthwise of the shoe and to swing it downwardly to carry the tackers 652 into positions for the tacking operation, the downward movement of the support being limited by engagement of the stems 638 (Figs. 22 and 26) of the pistons 634 with the plates 640. The tacker support having arrived in this position and the wipers being fully advanced and closed over the insole, the parts of the clutch 2 are automatically disconnected to cause the cam shaft 8 to come to a stop, thus providing a pause in the cycle of operations to permit the driving of the tacks by the independently controlled tacking mechanism.

To initiate the tacking operation the operator actuates the clutch 728 (Fig. 31) by depression of the lever 820, the pin 786 being simultaneously withdrawn from one of the holes 836 in the disk 724 to release the shaft 726. As hereinbefore explained, the cam 700 (Fig. 22) first acts to advance the tackers one step before the cam 968 moves the valve 956 into position to admit compressed air to the tubes 964 leading to the tackers. By this valve compressed air is at the same time admitted to the cylinders 632 (Fig. 26) under the pistons 634 to raise the pistons and thus to cause a further downward movement of the tacker support 606 and the tackers to position the tack fingers 926 closer to the shoe. In response to this downward movement of the tacker support engagement of the rods 1016 (Fig. 44) with the wipers causes the valves 986 (Fig. 41) to move downwardly and to admit compressed air from the tubes 964 to the cylinders 874, whereupon the pistons 876 are forced downwardly to operate the driver bars 856 and thus to drive the tacks. When, however, either of the rods 1016 is positioned over one of the openings 1017 in the wipers, the corresponding valve 986 is not operated and no tack is driven by that tacker in that location. As hereinbefore fully explained, the tacker which is located initially at the end of the toe drives its first tack in the V-shaped opening between the wipers adjacent to one side of that opening. The valve 956 is next moved by its cam into position to release the air from the tubes 964 and the cylinders 632. The release of the air from the cylinders 632 causes the springs 636 to raise the tacker support far enough for the tack fingers to clear the wipers when the tackers are next advanced, and this upward movement of the tacker support causes the valves 986 to be returned by their springs 993 to interrupt communication between the cylinders 874 and the tubes 964 and to establish communication between the ports 990 and the passages 996 for exhaust of the air from the cylinders 874, thus causing return of the tack drivers. Thereafter the tackers are further advanced step by step to their different tacking positions, the tacker which began its operation at the end of the toe being moved progressively farther from that location and the other tacker at the same time approaching the end of the toe. As the tackers are thus advanced their positions with respect to inward or outward movements are determined by the cams 670 through the slides 666, the gears 656 and the slides 650 to cause the tacks to be driven through the openings 340 in the wipers at the proper distances from the edge of the shoe bottom. The tacker which approaches the end of the toe drives its last two tacks in the V-shaped opening between the wipers, and as it arrives in position for driving its last tack in a central location in that opening its raceway 896 is moved into alinement with the tack supply raceway 1026 (Fig. 27) to receive from the latter a supply of tacks, the gate member 1050 being swung into position to release the tacks in the tack supply raceway by engagement of the raceway 896 with one or the other of the pins 1060 and the tack-retaining member 1022 being moved by the member 1034 into position to open the upper end of the tacker raceway. After the tackers have arrived at the limits of their positioning movements the valve 956 is further operated to cause the driving of the last tack or tacks and is then returned to exhaust position, at which time the parts of the clutch 728 (Fig. 31) are disconnected by the spring 838, the pin 786 entering that hole 836 in the disk 724 which is diametrically opposite the hole in which it was first positioned.

The tacking operation having thus been completed, the operator again actuates the clutch 2 by depression of the treadle 10 to cause the completion of the cycle of operations of the machine. In this part of the cycle the tacker support 606 is swung upwardly and moved rearwardly to its initial position by reverse swinging movements of the arms 616 (Fig. 1) and other parts controlled by the cam shaft 8 are also returned to their initial positions. As the toe rest 30 is moved downwardly the bar 192 (Fig. 2) imparts reverse swinging movement to the arm 188 to open the valves 174 (Fig. 9) of the heel-rest-locking mechanisms and thus to permit the cylinders 164 of these mechanisms to be moved upwardly as the heel rest 66 receives its return movement. The operator holds the shoe as it is released by the toe rest and the heel rest and then removes it from the machine.

It will be understood that during the operations of the tacking mechanism the tack hopper 1066 is normally rotated continuously to maintain a supply of tacks in the tack-supply raceway 1026, although the rotation of the hopper may be stopped at any time, if desired, by moving the arm 1122 (Fig. 32) into position to disconnect the clutch teeth 1106 (Fig. 33) from the teeth 1108.

Novel features of the fastening-inserting means per se herein disclosed are claimed in a divisional application, Serial No. 83,259, filed on March 24, 1949 on which Letters Patent No. 2,524,817 were granted on October 10, 1950.

Having described the invention, what I claim as new and desire to secure by Letters Patent of the United States is:

1. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, carrier means on which said support is mounted for swinging movement heightwise of the shoe, and mechanism for moving said carrier means and support bodily lengthwise of the shoe relatively to said overlaying means and for also causing the support to swing heightwise of the shoe relatively to the carrier means to position the fastening-inserting mechanism relatively to the shoe prior to the insertion of the fastenings.

2. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a carrier means mounted to slide rectilinearly lengthwise of the shoe relatively to the overlaying means, a support for said fastening-inserting mechanism pivotally mounted on said carrier means for swinging movement heightwise of the shoe, and mechanism connected to said support independently of the carrier means for moving the carrier means and support together lengthwise of the shoe and for causing the support to swing heightwise of the shoe relatively to the carrier means to position the fastening-inserting mechanism relatively to the shoe prior to the insertion of the fastenings.

3. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, carrier means mounted to move bodily lengthwise of the shoe relatively to the overlaying means, a support for said fastening-inserting mechanism pivotally mounted on said carrier means for swinging movement heightwise of the shoe, and mechanism mounted for movement about an axis extending widthwise of the shoe and connected to said support independently of the carrier means for moving the support and carrier means together lengthwise of the shoe and for causing the support to swing heightwise of the shoe relatively to the carrier means to position the fastening-inserting mechanism relatively to the shoe prior to the insertion of the fastenings.

4. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, carrier means mounted to move bodily lengthwise of the shoe relatively to the overlaying means, a support for said fastening-inserting mechanism mounted on said carrier means in a location comparatively remote from the shoe for swinging movement heightwise of the shoe, and a pair of crank arms on which said support is further mounted in locations nearer the shoe, said crank arms being movable about an axis extending widthwise of the shoe to move the support and carrier means together lengthwise of the shoe and to cause the support to swing heightwise of the shoe relatively to the carrier means to position the fastening-inserting mechanism relatively to the shoe prior to the insertion of the fastenings.

5. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, and automatic means for causing said support to move in a predetermined path lengthwise and heightwise of the shoe relatively to the overlaying means to carry the mechanism into position for the insertion of the fastenings, the mechanism thus movable including means for driving the fastenings and means for separating individual fastenings and for delivering them to the driving means.

6. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, and means for causing said mechanism to move lengthwise and heightwise of the shoe relatively to the overlaying means into position for the insertion of the fastenings, the mechanism thus movable including means for driving the fastenings, means for separating individual fastenings and for delivering them to said driving means, and a rotary hopper for supplying fastenings thus to be separated and delivered.

7. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, carrier means on which said support is mounted for swinging movement heightwise of the shoe, and mechanism for moving said carrier means and support lengthwise of the shoe relatively to the overlaying means and for also causing the support to swing heightwise of the shoe relatively to the carrier means to position the fastening-inserting mechanism relatively to the shoe prior to the insertion of the fastenings, the fastening-inserting mechanism on said support including means for driving the fastenings and means for separating individual fastenings and for delivering them to the driving means.

8. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move lengthwise and heightwise of the shoe relatively to the overlaying means to position the fastening-inserting mechanism relatively to the shoe prior to the insertion of the fastenings, and power-driven means including a clutch carried by said support and arranged to be actuated to start the operation of the fastening-inserting mechanism.

9. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move lengthwise and heightwise of the shoe relatively to the overlaying means to position the fastening-inserting mechanism relatively to the shoe prior to the insertion of the fastenings, power-driven means including a clutch carried by said support and arranged to be actuated to start the operation of the fastening-inserting mechanism, a power-driven member supported on the frame of the machine, and means for maintaining a driving connection between said member and the clutch in all positions of said support.

10. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move lengthwise and heightwise of the shoe relatively to the overlaying means to position the fastening-inserting mechanism relatively to the shoe prior to the insertion of the fastenings, power-driven means including a clutch carried by said support and arranged to be actuated to start the operation of the fastening-inserting mechanism, a power-driven member supported on the frame of the machine, a telescopic shaft for transmitting power from said member to the clutch, and a universal joint connecting said member to the shaft.

11. In a lasting machine, the combination with overlaying means for laying the margin of an upper around an end of a shoe inwardly over the shoe bottom into lasted position in the course of a cycle of automatic operations of the machine, of means for starting the cycle of operations, automatic means for interrupting the cycle of operations with said overlaying means in pressure-applying relation to the margin of the upper, power-operated mechanism for inserting fastenings around the end of the shoe bottom in the ensuing pause in the cycle to fasten the upper, means for moving said fastening-inserting mechanism relatively to the overlaying means from an initial retracted position into position for the insertion of the fastenings prior to the interruption of the cycle, and means distinct from said first-named starting means for starting the operation of said fastening-inserting mechanism.

12. In a lasting machine, the combination with overlaying means for laying the margin of an upper around an end of a shoe inwardly over the shoe bottom into lasted position in the course of a cycle of automatic operations of the machine, of means for starting the cycle of operations, automatic means for interrupting the cycle of operations with said overlaying means in pressure applying relation to the margin of the upper, power-operated mechanism for inserting fastenings around the end of the shoe bottom in the ensuing pause in the cycle to fasten the upper, a support for said mechanism, means for causing said support to move lengthwise and heightwise of the shoe relatively to said overlaying means to position the fastening-inserting mechanism relatively to the shoe prior to the interruption of the cycle, and means distinct from said first-named starting means for starting the operation of said fastening-inserting mechanism.

13. In a lasting machine, the combination with overlaying means for laying the margin of an upper around an end of a shoe inwardly over the shoe bottom into lasted position in the course of a cycle of automatic operations of the machine, of means for starting the cycle of operations, automatic means for interrupting the cycle of operations with said overlaying means in pressure-applying relation to the margin of the upper, power-operated mechanism for inserting fastenings around the end of the shoe bottom in the ensuing pause in the cycle to fasten the upper, means for moving said fastening-inserting mechanism relatively to the overlaying means from an initial retracted position into position for the insertion of the fastenings prior to the interruption of the cycle, a clutch arranged to be actuated after the interruption of the cycle to start the operation of the fastening-inserting mechanism, and means distinct from said means for starting the cycle for thus actuating said clutch.

14. In a lasting machine, the combination with overlaying means for laying the margin of an upper around an end of a shoe inwardly over the shoe bottom into lasted position in the course of a cycle of automatic operations of the machine, of a clutch arranged to be actuated to start the cycle of operations, automatic means for interrupting the cycle by control of said clutch with said overlaying means in pressure-applying relation to the margin of the upper, power-operated mechanism for inserting fastenings around the end of the shoe bottom in the ensuing pause in the cycle to fasten the upper, a support for said fastening-inserting mechanism, means for causing said support to move relatively to the overlaying means to position the fastening-inserting mechanism relatively to the shoe prior to the interruption of the cycle, and another clutch carried by said support and arranged to be actuated to start the operation of the fastening-inserting mechanism.

15. In a lasting machine, the combination with overlaying means for laying the margin of an upper around an end of a shoe inwardly over the shoe bottom into lasted position in the course of a cycle of automatic operations of the machine, of a clutch arranged to be actuated to start the cycle of operations, automatic means for interrupting the cycle by control of said clutch with said overlaying means in pressure-applying relation to the margin of the upper, power-operated mechanism for inserting fastenings successively in different locations around the end of the shoe bottom in the ensuing pause in the cycle to fasten the upper, means for moving said fastening-inserting mechanism relatively to the overlaying means from an initial retracted position into position for the insertion of the fastenings prior to the interruption of the cycle, and means for starting the operation of the fastening-inserting mechanism after it has thus been positioned.

16. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move lengthwise and heightwise of the shoe relatively to the overlaying means to position the fastening-inserting mechanism relatively to the shoe prior to the insertion of the fastenings, said mechanism including a fastening-inserting device mounted on said support for positioning movements along the edge of the shoe bottom, and power-operated means carried by said support for thus moving said device intermittently to different fastening-inserting positions.

17. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move relatively to the overlaying means to position the fastening-inserting mechanism relatively to the shoe prior to the insertion of the fastenings, said mechanism including a fastening-inserting device mounted on said support for positioning movements along the edge of the shoe bottom, power-operated means carried by said support for thus moving said device intermittently to different fastening-inserting positions, and a clutch also carried by said support and arranged to be actuated to start the intermittent positioning movements of said device.

18. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, and means for causing said support to move relatively to the overlaying means to position the fastening-inserting mechanism relatively to the shoe prior to the insertion of the fastenings, said mechanism including a pair of fastening-inserting devices arranged to insert fastenings respectively along the opposite side portions of the end of the shoe bottom and mounted on said support for positioning movements along the edge of the shoe bottom to different fastening-inserting positions.

19. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move relatively to the overlaying means to position the fastening-inserting mechanism relatively to the shoe prior to the insertion of the fastenings, said mechanism including a pair of fastening-inserting devices arranged to insert fastenings respectively along the opposite side portions of the end of the shoe bottom and mounted on said support for positioning movements along the edge of the shoe bottom to different fastening-inserting positions, and means for imparting such positioning movements intermittently to both said devices simultaneously.

20. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move relatively to the overlaying means to position the fastening-inserting mechanism relatively to the shoe prior to the insertion of the fastenings, said mechanism including a pair of fastening-inserting devices arranged to insert fastenings respectively along the opposite side portions of the end of the shoe bottom and mounted on said support for positioning movements along the edge of the shoe bottom to different fastening-inserting positions, and means for imparting such positioning movements intermittently to said devices, said devices including fluid-pressure means for inserting the fastenings and valve means for admitting operating fluid to said fluid-pressure means in the intervals between their positioning movements.

21. In a lasting machine, the combination with overlaying means for laying the margin of an upper around an end of a shoe inwardly over the shoe bottom into lasted position, of mechanism for inserting fastenings around the end of the shoe bottom to fasten the upper while it is held by said overlaying means, a support for said mechanism, means for causing said support to move relatively to the overlaying means to position the fastening-inserting mechanism relatively to the shoe prior to the insertion of the fastenings, said mechanism including a pair of fastening-inserting devices arranged to insert fastenings respectively along the opposite side portions of the end of the shoe bottom and mounted on said support for positioning movements along the edge of the shoe bottom to different fastening-inserting positions, and means for thus moving one of said devices step by step along the edge of the shoe bottom in a direction away from the extreme end of the shoe and for similarly moving the other device simultaneously in a direction toward said extreme end.

22. In a lasting machine the combination with wipers for wiping the margin of an upper around an end of a shoe inwardly over the shoe bottom into lasted position, of fastening-inserting mechanism having means arranged to be moved relatively to the wipers along the edge of the shoe bottom into positions to insert fastenings in different locations successively to fasten the upper while it is held by the wipers, a support for said mechanism, means for causing said support to move relatively to the wipers to a predetermined position prior to the insertion of the fastenings, and additional means for causing said support after it has thus been positioned to move toward and from the shoe heightwise thereof a plurality of times coordinately with the successive fastening-inserting operations.

23. In a lasting machine, the combination with wipers for wiping the margin of an upper around an end of a shoe inwardly over the shoe bottom into lasted position, of fastening-inserting mechanism having means arranged to be moved relatively to the wipers along the edge of the shoe bottom into positions to insert fastenings in different locations successively to fasten the upper while it is held by the wipers, a support for said mechanism, means for causing said support to move heightwise of the shoe relatively to the wipers to a predetermined position prior to the insertion of the fastenings, stop mechanism for limiting such movement of the support, said stop mechanism comprising means mounted for reciprocatory movements heightwise of the shoe, and means for causing said support after it has thus been positioned to move toward and from the shoe heightwise thereof a plurality of times coordinately with the successive fastening-inserting operations by movements of said reciprocatory means.

24. In a lasting machine, the combination with wipers for wiping the margin of an upper around an end of a shoe inwardly over the shoe bottom into lasted position, said wipers having a plurality of holes extending through them in different locations along the edge of the shoe bottom, of fastening-inserting mechanism having guiding means for the fastenings arranged to be moved along the edge of the shoe bottom into positions for the insertion of the fastenings through said holes in the wipers in different locations successively to fasten the upper, a support for said mechanism, means for causing said support to move relatively to the wipers to a predetermined position prior to the insertion of the fastenings, and additional means for causing said support after it has thus been positioned to move toward and from the shoe heightwise thereof a plurality of times coordinately with the successive fastening-inserting operations to carry said guiding means for the fastenings into and out of the holes in the wipers.

25. In a lasting machine, the combination with wipers for wiping the margin of an upper around an end of a shoe inwardly over the shoe bottom into lasted position, said wipers having a plurality of holes extending through them in different locations along the edge of the shoe bottom, of fastening-inserting mechanism having guiding means for the fastenings arranged to be moved along the edge of the shoe bottom into positions for the insertion of the fastenings through said holes in the wipers in different locations successively to fasten the upper, a support for said mechanism, means for causing said support to move heightwise of the shoe relatively to the wipers to a predetermined position prior to the insertion of fastenings, and stop mechanism for limiting such movement of the support and for thereafter causing it to move toward and from the shoe heightwise thereof a plurality of times coordinately with the successive fastening-inserting operations to carry said guiding means for the fastenings into and out of the holes in the wipers.

26. In a lasting machine, the combination with wipers for wiping the margin of an upper around an end of a shoe inwardly over the shoe bottom into lasted position, said wipers having a plurality of holes extending through them in different locations along the edge of the shoe bottom, of fastening-inserting mechanism having guiding means for the fastenings arranged to be moved along the edge of the shoe bottom into positions for the insertion of the fastenings through said holes in the wipers in different locations successively to fasten the upper, a support for said mechanism, means for causing said support to move heightwise of the shoe relatively to the wipers to a predetermined position prior to the insertion of the fastenings, and stop mechanism for limiting such movement of the support, said stop mechanism comprising reciprocatory means movable heightwise of the shoe for causing the support to move toward and from the shoe heightwise thereof a plurality of times coordinately with the successive fastening-inserting operations to carry said guiding means for the fastenings into and out of the holes in the wipers.

27. In a lasting machine, the combination with wipers for wiping the margin of an upper around an end of a shoe positioned bottom upward inwardly over the shoe bottom into lasted position, said wipers having a plurality of holes extending through them in different locations along the edge of the shoe bottom, of fastening-inserting mechanism having guiding means for the fastenings arranged to be moved along the edge of the shoe bottom into positions for the insertion of the fastenings through said holes in the wipers in different locations successively to fasten the upper, a support for said mechanism, means for causing said support to move downward relatively to the wipers to a predetermined position prior to the insertion of the fastenings, and stop mechanism for limiting such downward movement of the support and for then holding it against the force of gravity, said stop mechanism comprising reciprocatory means for thereafter causing the support to be moved farther downward by gravity and for returning it a plurality of times coordinately with the successive fastening-inserting operations to cause said guiding means for the fastenings to move into and out of the holes in the wipers.

28. In a lasting machine, the combination with wipers for wiping the margin of an upper around an end of a shoe positioned bottom upward inwardly over the shoe bottom into lasted position, said wipers having a plurality of holes extending through them in different locations along the edge of the shoe bottom, of fastening-inserting mechanism having guiding means for the fastenings arranged to be moved along along the edge of the shoe bottom into positions for the insertion of the fastenings through said holes in the wipers in different locations successively to fasten the upper, a support for said mechanism, means for causing said support to move downward relatively to the wipers to a predetermined position prior to the insertion of the fastenings, stop mechanism for limiting such downward movement of the support and for then holding it against the force of gravity, said stop mechanism comprising limiting plungers and springs controlling said plungers, and means for retracting the plungers against the resistance of said springs and for thereafter releasing them a plurality of times coordinately with the successive fastening-inserting operations to cause reciprocatory movements of said support toward and from the shoe to carry the guiding means for the fastenings into and out of the holes in the wipers.

29. In a lasting machine, the combination with wipers for wiping the margin of an upper around an end of a shoe inwardly over the shoe bottom into lasted position, of fastening-inserting mechanism having guiding means for the fastenings arranged to be moved relatively to the wipers along the edge of the shoe bottom into positions for the insertion of the fastenings in different locations successively to fasten the upper while it is held by the wipers, and means for causing said guiding means to move toward and from the shoe heightwise thereof a plurality of times coordinately with the successive fastening-inserting operations.

30. In a lasting machine, the combination with wipers for wiping the margin of an upper around an end of a shoe inwardly over the shoe bottom into lasted position, said wipers having a plurality of holes extending through them in different locations along the edge of the shoe bottom, of fastening-inserting mechanism having guiding means for the fastenings arranged to be moved along the edge of the shoe bottom into positions for the insertion of the fastenings through said holes in the wipers in different locations successively to fasten the upper, mechanism for thus moving said guiding means intermittently to different fastening-inserting positions, and additional mechanism for causing said guiding means to move toward and from the shoe heightwise thereof in the intervals between the intermittent positioning movements of said means.

31. In a lasting machine, the combination with wipers for wiping the margin of an upper around an end of a shoe inwardly over the shoe bottom into lasted position, said wipers having a plurality of holes extending through them in different locations along the edge of the shoe bottom, of fastening-inserting mechanism having guiding means for the fastenings arranged to be moved along the edge of the shoe bottom into positions for the insertion of the fastenings through said holes in the wipers in different locations successively to fasten the upper, mechanism for thus moving said guiding means intermittently to different fastening-inserting positions, a support for said guiding means mounted for movements heightwise of the shoe, and reciprocatory means constructed and arranged to control said support and thereby to cause said guiding means to move toward and from the shoe heightwise thereof after each positioning movement.

32. In a lasting machine, the combination with a pair of wipers for wiping the margin of an upper around an end of a shoe inwardly over the shoe bottom into lasted position, said wipers having a plurality of holes extending through them in different locations along the edge of the shoe bottom, of a pair of fastening-inserting devices associated respectively with the different wipers and mounted for movements along the edge of the shoe bottom into positions for the insertion of the fastenings through said holes in the wipers in different locations successively to fasten the upper, each of said devices including a guide for the fastenings, mechanism for thus moving said devices intermittently to different fastening-inserting positions, and means for carrying said devices toward and from the shoe heightwise thereof in the intervals between their intermittent positioning movements.

33. In a lasting machine, the combination with a pair of wipers for wiping the margin of an upper around an end of a shoe positioned bottom upward inwardly over the shoe bottom into lasted position, said wipers having a plurality of holes extending through them in different locations along the edge of the shoe bottom, of a pair of fastening-inserting devices associated respectively with the different wipers and mounted for movements along the edge of the shoe bottom into positions for the insertion of the fastenings through said holes in the wipers in different locations successively to fasten the upper, each of said devices including a guide for the fastenings, a support for said devices mounted for downward and upward movements, and means for holding said support at a predetermined height against the force of gravity prior to the fastening-inserting operations and for causing it to move downward and upward to carry said devices toward and from the shoe in the intervals between their intermittent positioning movements.

34. In a lasting machine, the combination with a pair of wipers for wiping the margin of an upper around an end of a shoe positioned bottom upward inwardly over the shoe bottom into lasted position, said wipers having a plurality of holes extending through them in different locations along the edge of the shoe bottom, of a pair of fastening-inserting devices associated respectively with the different wipers and mounted for movements along the edge of the shoe bottom into positions for the insertion of the fastenings through said holes in the wipers in different locations successively to fasten the upper, each of said devices including a guide for the fastenings, a support for said devices mounted for downward and upward movements, plungers arranged to hold said support at a predetermined height against the force of gravity prior to the fastening-inserting operations, springs for controlling said plungers, and means for retracting the plungers against the resistance of said springs and for thereafter releasing them in the intervals between the intermittent positioning movements of the fastening-inserting devices to cause said support and devices to move downward and then upward in time relation to the fastening-inserting operations.

35. In a lasting machine, the combination with a pair of wipers for wiping the margin of an upper around an end of a shoe positioned bottom upward inwardly over the shoe bottom into lasted position, said wipers having a plurality of holes extending through them in different locations along the edge of the shoe bottom, of a pair of fluid-operated fastening-inserting devices associated respectively with the different wipers and mounted for movements along the edge of the shoe bottom into positions for the insertion of the fastenings through said holes in the wipers in different locations successively to fasten the upper, each of said devices including a guide for the fastenings, mechanism for thus moving said devices intermittently to different fastening-inserting positions, a support for said devices mounted for downward and upward movements, plungers arranged to hold said support at a predetermined height against the force of gravity prior to the insertion of the fastenings, springs for controlling said plungers, and fluid-pressure means for retracting the plungers against the resistance of said springs to cause said devices to move downward substantially at the time of each fastening-inserting operation and for then releasing the plungers to cause the devices to be moved upward by the springs before they are moved to the next fastening-inserting positions.

36. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings, and means for causing the insertion of the fastenings in response to the movements of the device toward the shoe.

37. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings and a driver for driving the fastenings, and means for rendering said driver effective to drive the fastenings in response to the movements of the device toward the shoe.

38. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a driver, a piston for operating the driver, a cylinder in which the piston is movable and a valve for admitting operating fluid to the cylinder, and means for operating said valve thus to admit the fluid in response to the movements of the device toward the shoe.

39. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings, a member movable with the device along the margin of the shoe bottom but so controlled as to cause the device to move relatively to it as the device is moved toward the shoe, and means controlled by said member for causing the insertion of the fastenings in response to the movements of the device toward the shoe.

40. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings, a member movable with the device along the margin of the shoe bottom but arranged to be engaged by the overlaying means to restrain it and thus to cause the device to move relatively to it as the device is moved toward the shoe, and means controlled by said member for causing the insertion of the fastenings in response to the movements of the device toward the shoe.

41. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings and a driver for driving the fastenings, a member movable with the device along the margin of the shoe bottom but arranged to be engaged by the overlaying means to restrain it and thus to cause the device to move relatively to it as the device is moved toward the shoe, and means controlled by said member for causing the driver to drive the fastenings in response to the movements of the device toward the shoe.

42. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings, a driver for driving the fastenings and fluid-pressure means for operating the driver, a member movable with the device along the margin of the shoe bottom but arranged to be engaged by the overlaying means to restrain it and thus to cause the device to move relatively to it as the device is moved toward the shoe, and means controlled by said member for rendering said fluid-pressure means effective to operate the driver in response to the movements of the device toward the shoe.

43. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a driver, a piston for operating the driver, a cylinder in which the piston is movable and a valve for admitting operating fluid to the cylinder, a member movable with the device along the margin of the shoe bottom but arranged to be engaged by the overlaying means to restrain it and thus to cause the device to move relatively to it as the device is moved toward the shoe, and mechanism connecting said member to the valve for operating the valve thus to admit the fluid in response to the movements of the device toward the shoe.

44. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings, and means for causing the insertion of the fastenings in response to the movements of the device toward the shoe in some only of said positions.

45. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings and a driver for driving the fastenings, and means for rendering said driver effective to drive the fastenings in response to the movements of the device toward the shoe in some only of said positions.

46. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions, means for causing the device to move toward and from the shoe heightwise thereof in each of said positions, the device thus movable including a guide for the fastenings, a member movable with the device along the margin of the shoe bottom but arranged to be engaged by the overlaying means to restrain it and thus to cause the device to move relatively to it as the device is moved toward the shoe, and means controlled by said member for causing the insertion of the fastenings in response to the movements of the device toward the shoe, said overlaying means having a recess therein to receive said member when the device is in one of its fastening-inserting positions to cause the member to move with the device when the latter is moved toward the shoe in that position and thus to prevent the insertion of a fastening in that location.

47. In a lasting machine, the combination with overlaying means for laying the margin of an upper inwardly over the bottom of a shoe, of a device for inserting fastenings successively in different locations along the margin of the shoe bottom to fasten the upper while it is held by the overlaying means, means for moving said device intermittently along the margin of the shoe bottom relatively to the overlaying means to its different fastening-inserting positions means for causing the device to move toward and from the shoe heightwise thereof in each of said positions, the device thus movable including a driver, a piston for operating the driver, a cylinder in which the piston is movable and a valve for admitting operating fluid to the cylinder, a member movable with the device along the margin of the shoe bottom but arranged to be engaged by the overlaying means to restrain it and thus to cause the device to move relatively to it as the device is moved toward the shoe, and mechanism controlled by said member for operating the valve thus to admit the fluid in response to the movements of the device toward the shoe, said overlaying means having a recess therein to receive said member when the device is in one of its fastening-inserting positions and thus to prevent such operation of the valve regardless of the movement of the device toward the shoe.

48. In a lasting machine, a pair of end-embracing wipers for wiping the margin of an upper around an end of a shoe inwardly over the bottom of the shoe, devices associated respectively with said different wipers for inserting fastenings successively in different locations along the margin of the shoe bottom to fasten the upper while it is held by the wipers, each of said devices including a guide for the fastenings, means for moving said devices intermittently in curved paths along the margin of the shoe bottom to their different fastening-inserting positions, means for causing the devices to move simultaneously toward and from the shoe heightwise thereof in said different positions, and additional means for causing the devices to insert the fastenings in response to their movements toward the shoe.

49. In a lasting machine, a pair of end-embracing wipers for wiping the margin of an upper around an end of a shoe inwardly over the bottom of the shoe, devices associated respectively with said different wipers for inserting fastenings successively in different locations along the margin of the shoe bottom to fasten the upper while it is held by the wipers, each of said devices including a guide for the fastenings, means for moving said devices intermittently in curved paths along the margin of the shoe bottom to their different fastening-inserting positions, a support common to both said devices and movable heightwise of the shoe to carry them toward and from the shoe in said different positions, and means for rendering the devices effective to insert the fastenings in response to their movements toward the shoe.

50. In a lasting machine, a pair of end-embracing wipers for wiping the margin of an upper around an end of a shoe inwardly over the bottom of the shoe, devices associated respectively with said different wipers for inserting fastenings successively in different locations along the margin of the shoe bottom to fasten the upper while it is held by the wipers, each of said devices including a guide for the fastenings and a driver for driving the fastenings, means for moving said devices intermittently in curved paths along the margin of the shoe bottom to their different fastening-inserting positions, means for causing the devices to move toward and from the shoe heightwise thereof in said different positions, and means controlled by engagement with the wipers for causing the drivers to drive the fastenings in response to the movements of the devices toward the shoe.

51. In a lasting machine, a pair of end-embracing wipers for wiping the margin of an upper around an end of a shoe inwardly over the bottom of the shoe, devices associated respectively with said different wipers for inserting fastenings successively in different locations along the margin of the shoe bottom to fasten the upper while it is held by the wipers, means for moving said devices intermittently in curved paths along the margin of the shoe bottom to their different fastening-inserting positions, means for causing the devices to move toward and from the shoe heightwise thereof in their different positions, the devices thus movable including guides for the fastenings, drivers for driving the fastenings and fluid-pressure means for operating the drivers, and members movable with the devices along the margin of the shoe bottom and controlled by engagement with the wipers for rendering the fluid-pressure means effective to operate the drivers in response to the movements of the devices toward the shoe.

52. In a lasting machine, a pair of end-embracing wipers for wiping the margin of an upper around an end of a shoe inwardly over the bottom of the shoe, devices associated respectively with said different wipers for inserting fastenings successively in different locations along the margin of the shoe bottom to fasten the upper while it is held by the wipers, means for moving said devices intermittently in curved paths along the margin of the shoe bottom to their different fastening-inserting positions, means for causing the devices to move toward and from the shoe heightwise thereof in their different positions, the devices thus movable including guides for the fastenings, members movable with the devices along the margin of the shoe bottom but arranged to be engaged by the wipers to restrain them and thus to cause the devices to move relatively to them as the devices are moved toward the shoe, and means controlled by said members for rendering the devices effective to insert the fastenings in response to their movements toward the shoe.

53. In a lasting machine, a pair of end-embracing wipers for wiping the margin of an upper around an end of a shoe inwardly over the bottom of the shoe, devices associated respectively with said different wipers for inserting fastenings successively in different locations along the margin of the shoe bottom to fasten the upper while it is held by the wipers, means for moving said devices intermittently in curved paths along the margin of the shoe bottom to their different fastening-inserting positions, means for causing the devices to move toward and from the shoe heightwise thereof in their different positions, the devices thus movable including guides for the fastenings, members movable with the devices along the margin of the shoe bottom but arranged to be engaged by the wipers to restrain them and thus to cause the devices to move relatively to them as the devices are moved toward the shoe, and means controlled by said members for rendering the devices effective to insert the fastenings in response to their movements toward the shoe, the wipers having recesses therein to receive said members when the devices are in certain fastening-inserting positions to prevent the insertion of fastenings in those locations.

54. In a lasting machine, a pair of end-embracing wipers for wiping the margin of an upper around an end of a shoe inwardly over the bottom of the shoe, devices associated respectively with said different wipers for inserting fastenings successively in different locations along the margin of the shoe bottom to fasten the upper while it is held by the wipers, means for moving said devices intermittently in curved paths along the margin of the shoe bottom to their different fastening-inserting positions, means for causing the devices to move toward and from the shoe heightwise thereof in their different positions, the devices thus movable including drivers for driving the fastenings, pistons for operating the drivers, cylinders in which the pistons are movable and valves for admitting operating fluid to the cylinders, and members movable with the devices along the margin of the shoe bottom and arranged to be controlled by engagement with the wipers to cause said valves thus to admit the fluid in response to the movements of the devices toward the shoe, the wipers having recesses therein to receive said members when the devices are in certain fastening-inserting positions and thus to prevent such action of the valves regardless of the movements of the devices toward the shoe.

55. In a lasting machine, toe-embracing wipers mounted for bodily advancing movement lengthwise of a last and for closing movements widthwise of the last to wipe the marginal portion of an upper inwardly over an insole around the toe end of the last, means for thus closing the wipers, means relatively to which the wipers are thus movable for inserting fastenings to fasten the marginal portion of the upper to the insole after the wiping operation, means arranged to act in opposition to said wiper-closing means for positively limiting the closing movements of the wipers to position them in proper relation to the fastening-inserting means, and additional means for insuring closing movements of the wipers to the limits thus positively determined.

56. In a lasting machine, toe-embracing wipers mounted for bodily advancing movement lengthwise of a last and for closing movements widthwise of the last to wipe the marginal portion of an upper inwardly over an insole around the toe end of the last, means relatively to which the wipers are thus movable for inserting fastenings to fasten the marginal portion of the upper to the insole after the wiping operation, members movable with the wipers in their closing movements, means into engagement with which said members are thus movable to limit positively the closing of the wipers and thus to position them in proper relation to the fastening-inserting means, and additional means for insuring closing movements of the wipers to the limits thus determined.

57. In a lasting machine, toe-embracing wipers mounted for bodily advancing movement lengthwise of a last and for closing movements widthwise of the last to wipe the marginal portion of an upper inwardly over an insole around the toe end of the last, means relatively to which the wipers are thus movable for inserting fastenings to fasten the marginal portion of the upper to the insole after the wiping operation, members movable with the wipers in their closing movements, means into engagement with which said members are thus movable to limit positively the closing of the wipers and thus to position them in proper relation to the fastening-inserting means, mechanism including links connected respectively to the different wipers for imparting to them their closing movements, each of said links including a spring and parts relatively movable against the resistance of said spring in the closing of the wipers, and means for positively limiting the relative movement of said parts to insure closing movements of the wipers to the limits thus positively determined.

58. In a lasting machine, the combination with shoe-positioning means, of wipers mounted for bodily advancing movement lengthwise of the shoe and for closing movements widthwise of the shoe to wipe the marginal portion of the upper around an end of the shoe inwardly over the shoe bottom, and automatic wiper-operating means constructed and arranged to advance said wipers lengthwise of the shoe without closing movements over the shoe bottom until they have begun to wipe the upper inwardly at the end of the shoe bottom, then to close them inwardly over the shoe bottom without further advancing movement and thereafter further to advance them without additional closing movements.

59. In a lasting machine, the combination with shoe-positioning means, of wipers mounted for bodily advancing movement lengthwise of the shoe and for closing movements widthwise of the shoe to wipe the marginal portion of the upper around an end of the shoe inwardly over the shoe bottom, wiper-operating mechanisms connected to said wipers for advancing and closing them respectively, and cams for operating said mechanisms, said cams being so formed and arranged as to advance the wipers lengthwise of the shoe without closing movements over the shoe bottom until they have begun to wipe the upper inwardly at the end of the shoe bottom, then to close them inwardly over the shoe bottom without further advancing movement and thereafter further to advance them without additional closing movements.

60. In a lasting machine, the combination with shoe-positioning means, of wipers for wiping the marginal portion of an upper around an end of the shoe inwardly over the shoe bottom, a wiper carrier supporting said wipers and movable to advance them bodily lengthwise of the shoe, means for closing the wipers inwardly widthwise of the shoe, and automatic means for operating said wiper carrier to cause the wipers to wipe the upper partially inward at the end of the shoe prior to their closing movements over the shoe bottom and for further operating it to impart additional wiping movements lengthwise of the shoe to the wipers after their closing movements.

61. In a lasting machine, wiping means for wiping the toe end of an upper heightwise of a last and for thereafter wiping its marginal portion inwardly over an insole on the last, power-operated mechanism for moving said wiping means toward the last into position for wiping the upper heightwise of the last and for thereafter moving it farther in the same direction to wipe the upper inwardly over the insole, said mechanism including a power-operated member and another member connected to the wiping means and carried by said first-named member, said other member being so mounted as to permit it also to be moved relatively to the first-named member in the direction to move the wiping means toward the last, and a device for thus automatically moving said other member an adjustably predetermined distance prior to the wiping of the upper heightwise of the last to determine variably the position of the wiping means in thus operating on the upper.

62. In a lasting machine, wiping means for wiping the toe end of an upper heightwise of a last and for thereafter wiping its marginal portion inwardly over an insole on the last, power-operated mechanism for moving said wiping means toward the last into position for wiping the upper heightwise of the last and for thereafter moving it farther in the same direction to wipe the upper inwardly over the insole, said mechanism including a power-operated member and another member connected to the wiping means and movable bodily by said first-named member, said other member being so mounted as to permit it also to be swung relatively to the first-named member in the direction to move the wiping means toward the last, and a device for thus automatically swinging said other member an adjustably predetermined distance prior to the wiping of the upper heightwise of the last to determine variably the position of the wiping means in thus operating on the upper.

63. In a lasting machine, wiping means for wiping the toe end of an upper heightwise of a last and for thereafter wiping its marginal portion inwardly over an insole on the last, power-operated mechanism for moving said wiping means toward the last into position for wiping the upper heightwise of the last and for thereafter moving it farther in the same direction to wipe the upper inwardly over the insole, said mechanism including a power-operated lever and another lever connected to the wiping means and movable bodily by said first-named lever, said other lever being so mounted as to permit it also to be swung relatively to the first-named lever in the direction to move the wiping means toward the last, and a cam for thus automatically swinging said other lever an adjustably predetermined distance in response to the movement of the first-named lever prior to the wiping of the upper heightwise of the last to determine variably the position of the wiping means in thus operating on the upper.

64. In a lasting machine, toe-embracing wipers for wiping the toe end of an upper heightwise of a last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated member and another member connected to the wipers and carried by said first-named member, said other member being so mounted as to permit it also to be moved relatively to the first-named member in the direction to move the wipers lengthwise of the last, and a device for thus automatically moving said other member an adjustably predetermined distance prior to the wiping of the upper heightwise of the last to determine variably the position of the wipers lengthwise of the last when they thus operate on the upper.

65. In a lasting machine, toe-embracing wipers for wiping the toe end of an upper heightwise of the last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated member and another member connected to the wipers and movable bodily by said first-named member, said other member being so mounted as to permit it also to be swung relatively to the first-named member in the direction to move the wipers lengthwise of the last, and a device for thus automatically swinging said other member an adjustably predetermined distance in response to the movement of the first-named member prior to the wiping of the upper heightwise of the last to determine variably the position of the wipers lengthwise of the last when they thus operate on the upper.

66. In a lasting machine, toe-embracing wipers for wiping the toe end of an upper heightwise of a last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated lever having a movement of invariable extent and another lever connected to the wipers and supported by said first-named lever to be moved bodily thereby, said other lever being so mounted as to permit it also to be swung relatively to the first-named lever in the direction to move the wipers lengthwise of the last, and means for thus automatically swinging said other lever an adjustably predetermined distance prior to the wiping of the upper heightwise of the last to determine variably the position of the wipers lengthwise of the last when they thus operate on the upper.

67. In a lasting machine, toe-embracing wipers for wiping the toe end of an upper heightwise of a last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated lever having a movement of invariable extent and another lever connected to the wipers and supported by said first-named lever to be moved bodily thereby, said other lever being so mounted as to permit it also to be swung relatively to the first-named lever in the direction to operate the wipers, and a normally stationary cam for controlling said other lever, said cam being so formed as to swing said other lever a predetermined distance prior to the wiping of the upper heightwise of the last to determine the position of the wipers lengthwise of the last when they thus operate on the upper and being adjustable to vary such position of the wipers.

68. In a lasting machine, toe-embracing wipers for wiping the toe end of an upper heightwise of a last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated member and another member connected to the wipers and movable bodily by said first-named member, said other member being so mounted as to permit it also to be swung relatively to the first-named member in the direction to move the wipers lengthwise of the last, and a device for automatically controlling said other member with respect to such swinging movement and for thereby determining the limit of the movement of the wipers prior to the wiping of the upper heightwise of the last and the limit of their movement inwardly over the insole.

69. In a lasting machine, toe-embracing wipers for wiping the toe end of an upper heightwise of a last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated member and another member connected to the wipers and carried by said first-named member, said other member being so mounted as to permit it additionally to be moved relatively to the first-named member in the direction to move the wipers lengthwise of the last, and a device for automatically controlling said other member with respect to such additional movement and for thereby determining the limit of the movement of the wipers prior to the wiping of the upper heightwise of the last and the limit of their movement inwardly over the insole.

70. In a lasting machine, toe-embracing wipers for wiping the toe end of an upper heightwise of a last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated member and another member connected to the wipers and movable bodily by said first-named member, said other member being so mounted as to permit it also to be swung relatively to the first-named member in the direction to move the wipers lengthwise of the last, and an adjustable device for automatically controlling said other member with respect to such swinging movement and for thereby determining variably the limit of the movement of the wipers prior to the wiping of the upper heightwise of the last, said device being so constructed as to determine invariably the limit of the movement of the wipers inwardly over the insole.

71. In a lasting machine, toe-embracing wipers for wiping the toe end of an upper heightwise of a last and for thereafter wiping its marginal portion inwardly over an insole on the last, power-operated mechanism for moving said wipers lengthwise of the last into position for wiping the upper heightwise of the last and for thereafter moving them farther lengthwise of the last to wipe the upper inwardly over the insole, said mechanism including a power-operated lever and another lever connected to the wipers and carried by said power-operated lever to be moved bodily thereby, said other lever being so mounted as to permit it also to be swung relatively to the first-named lever in the direction to move the wipers lengthwise of the last, and a normally stationary cam for automatically controlling said other lever with respect to such swinging movement and for thereby determining the limit of the movement of the wipers prior to the wiping of the upper heightwise of the last and the limit of their movement inwardly over the insole, said cam being adjustable to vary said first-named limit of movement but being so formed as to determine invariably said last-named limit of movement.

72. In a lasting machine, a pair of wipers for wiping the marginal portion of an upper around an end of a last inwardly over the bottom of the last, means for moving said wipers bodily lengthwise of the last and for closing them inwardly widthwise of the last in thus operating on the upper, the wipers being constructed and arranged to provide a V-shaped opening between them at the extreme end of the shoe bottom in their closed positions, and an additional wiper arranged yieldingly to engage the wiping faces of said pair of wipers and mounted to move with them lengthwise only of the last in wiping engagement with portions of the upper opposite said V-shaped opening.

73. In a lasting machine, a pair of wipers for wiping the marginal portion of an upper around an end of a last inwardly over the bottom of the last, means for moving said wipers bodily lengthwise of the last and for closing them inwardly widthwise of the last in thus operating on the upper, the wipers being constructed and arranged to provide a V-shaped opening between them at the extreme end of the shoe bottom in their closed positions, an additional wiper arranged to engage the wiping faces of said pair of wipers and mounted to move with them lengthwise of the last in wiping engagement with portions of the upper opposite said V-shaped opening, and spring means for yieldingly holding said additional wiper against the wiping faces of the pair of wipers.

74. In a lasting machine, a pair of wipers for wiping the marginal portion of an upper around an end of a last inwardly over the bottom of the last, a wiper carrier movable to carry said wipers bodily lengthwise of the last in thus operating on the upper, means on said wiper carrier for closing the wipers inwardly widthwise of the last, the wipers being constructed and arranged to provide a V-shaped opening between them at the extreme end of the shoe bottom in their closed positions, an additional wiper supported by the wiper carrier independently of said pair of wipers and movable by the carrier lengthwise of the last in wiping engagement with portions of the upper opposite said V-shaped opening, said additional wiper being pivotally mounted to permit it to swing heightwise of the last, and spring means tending to swing it in one direction and thus to hold it yieldingly against the wiping faces of the pair of wipers.

75. In a lasting machine, a pair of wipers for wiping the marginal portion of an upper around an end of a last inwardly over the bottom of the last, means for moving said wipers bodily lengthwise of the last and for closing them inwardly widthwise of the last in thus operating on the upper, the wipers being constructed and arranged to provide a V-shaped opening between them at the extreme end of the shoe bottom in their closed positions, and an additional wiper mounted to move lengthwise only of the last with said pair of wipers in wiping engagement with portions of the upper at the extreme end of the shoe bottom opposite said V-shaped opening, said additional wiper being constructed and arranged to extend less far inwardly from the edge of the shoe bottom than said pair of wipers at the end of the wiping operation.

76. In a lasting machine, a pair of wipers for wiping the marginal portion of an upper around an end of a last inwardly over the bottom of the last, means for moving said wipers bodily lengthwise of the last and for closing them inwardly widthwise of the last in thus operating on the upper, the wipers being constructed and arranged to provide a V-shaped opening between them at the extreme end of the shoe bottom in their closed positions and having a plurality of holes extending through them in which to drive fastenings to fasten the upper, means for driving such fastenings in said holes in the wipers and also in said V-shaped opening between them, and an additional wiper mounted to move lengthwise of the last with said pair of wipers in wiping engagement with the upper at the extreme end of the shoe bottom opposite said V-shaped opening, said additional wiper being constructed and arranged to extend inwardly from the edge of the shoe bottom at the end of the wiping operation less far than the locations of the fastenings in said V-shaped opening.

77. In a lasting machine, the combination with a pair of toe-embracing wipers for wiping the toe end of an upper heightwise of a last and then inwardly over an insole on the last, of a shoe-bottom rest arranged to engage the bottom of the forepart of the insole, a toe rest for engaging the shoe at the top of the forepart and for clamping it against said bottom rest, said toe rest being so mounted as to permit it to move with the shoe in directions widthwise of the shoe to facilitate lateral displacement of the shoe by pressure of one or the other of the wipers thereon in the wiping of the upper heightwise of the last, means for applying increased force to the toe rest to seat it more firmly against the shoe substantially at the time when the wiping of the upper heightwise of the last is completed, and means responsive to the increased force thus applied for securing the toe rest against any further movement in directions widthwise of the shoe.

78. In a lasting machine, the combination with a pair of toe-embracing wipers for wiping the toe end of an upper heightwise of a last and then inwardly over an insole on the last, of a shoe-bottom rest arranged to engage the bottom of the forepart of the insole, a toe rest for engaging the shoe at the top of the forepart and for clamping it against said bottom rest, said toe rest being so mounted as to permit it to move with the shoe in directions widthwise of the shoe to facilitate lateral displacement of the shoe by pressure of one or the other of the wipers thereon in the wiping of the upper heightwise of the last, a member supporting the toe rest and mounted to move therewith in directions widthwise of the shoe, another member relatively to which said supporting member is thus movable, and means for applying to the toe rest through said members increased force to seat it more firmly against the shoe substantially at the time when the wiping of the upper heightwise of the last is completed, said members having opposed faces arranged to engage each other frictionally and thereby to prevent any further movement of the toe rest in directions widthwise of the shoe after such increased force has been applied thereto.

79. In a lasting machine, the combination with a pair of toe-embracing wipers for wiping the toe end of an upper heightwise of a last and then inwardly over an insole on the last, of a shoe-bottom rest arranged to engage the bottom of the forepart of the insole, a toe rest for engaging the shoe at the top of the forepart and for clamping it against said bottom rest, said toe rest being so mounted as to permit it to move with the shoe in directions widthwise of the shoe to facilitate lateral displacement of the shoe by pressure of one or the other of the wipers thereon in the wiping of the upper heightwise of the last, a member supporting the toe rest and mounted to move therewith in directions widthwise of the shoe, another member relatively to which said supporting member is thus movable, said members having opposed faces arranged to engage each other frictionally, spring means for preventing engagement of said faces with each other in the wiping of the upper heightwise of the last, and means for applying increased force to the toe rest through said members to seat it more firmly against the shoe when the wiping of the upper heightwise of the last is substantially completed and for thereby causing said faces to engage each other to secure the toe rest against any further movement in directions widthwise of the shoe.

80. In a lasting machine, toe-embracing wipers for wiping the marginal portion of an upper around the toe end of a last inwardly over an insole on the last, said wipers being mounted for bodily advancing movement lengthwise of the last and for closing movements widthwise of the last, wiper-operating means constructed and arranged to advance the wipers lengthwise of the last without closing movements over the insole until they have partially wiped the upper over the insole at the end of the toe and thereafter to close them inwardly without advancing movement, and means mounted to move lengthwise of the last with the wipers into pressure-applying relation to the upper at the sides of the toe as the wipers thus partially wipe the upper inwardly at the end of the toe for holding the toe end of the shoe against lateral displacement during the subsequent closing movements of the wipers.

81. In a lasting machine, toe-embracing wipers for wiping the marginal portion of an upper around the toe end of a last inwardly over an insole on the last, said wipers being mounted for bodily advancing movement lengthwise of the last and for closing movements widthwise of the last, wiper-operating means constructed and arranged to advance the wipers lengthwise of the last without closing movements over the insole until they have partially wiped the upper over the insole at the end of the toe and thereafter to close them inwardly without advancing movement, and a resiliently flexible band arranged to extend around the toe end of the shoe and mounted to move lengthwise of the shoe with the wipers into pressure-applying relation to the upper at the sides of the toe as the wipers thus wipe the upper partially inward at the end of the toe for holding the toe end of the shoe against lateral displacement during the subsequent closing movements of the wipers.

82. In a lasting machine, toe-embracing wipers for wiping the marginal portion of an upper around the toe end of a last inwardly over an insole on the last, a wiper carrier supporting said wipers and movable to advance them bodily lengthwise of the last, means for closing the wipers inwardly widthwise of the last, means for operating said wiper carrier to cause the wipers to wipe the upper partially inward at the end of the toe prior to their closing movements and to move them still farther lengthwise of the last after their closing movements, means supported on said wiper carrier and movable thereby into pressure-applying relation to the upper at the sides of the toe as the wipers thus partially wipe the upper inwardly at the end of the toe for holding the toe end of the shoe against lateral displacement during the subsequent closing movements of the wipers, and connections between said holding means and the wiper carrier constructed and arranged to permit the carrier to move relatively to said holding means in thus moving the wipers farther lengthwise of the last after their closing movements.

83. In a lasting machine, toe-embracing wipers for wiping the marginal portion of an upper around the toe end of a last inwardly over an insole on the last, a wiper carrier supporting said wipers and movable to advance them bodily lengthwise of the last, means for closing the wipers inwardly widthwise of the last, means for operating said wiper carrier to cause the wipers to wipe the upper partially inward at the end of the toe prior to their closing movements and to move them still farther lengthwise of the last after their closing movements, a resiliently flexible band arranged to extend around the toe end of the shoe and supported on said wiper carrier to be moved thereby into pressure-applying relation to the upper at the sides of the toe as the wipers thus partially wipe the upper inwardly at the end of the toe for holding the toe end of the shoe against lateral displacement during the subsequent closing movements of the wipers, and connections between said band and the wiper carrier constructed and arranged to permit the carrier to move relatively to the band in thus moving the wipers farther lengthwise of the last after their closing movements.

84. In a lasting machine, toe-embracing wipers for wiping the marginal portion of an upper around the toe end of a last inwardly over an insole on the last, a wiper carrier supporting said wipers and movable to advance them bodily lengthwise of the last in wiping the upper over the insole, means for closing the wipers inwardly widthwise of the last, and shoe-controlling means supported on said wiper carrier independently of the wipers to be moved by the carrier into pressure-applying relation to the upper at the sides of the toe as the wipers begin to wipe the upper inwardly at the end of the toe, said shoe-controlling means being constructed and arranged thereafter to hold the toe end of the shoe against lateral displacement by the closing movements of the wipers.

85. In a lasting machine, toe-embracing wipers for wiping the marginal portion of an upper around the toe end of a last inwardly over an insole on the last, a wiper carrier supporting said wipers and movable to advance them bodily lengthwise of the last in wiping the upper over the insole, means for closing the wipers inwardly widthwise of the last, a resiliently flexible band arranged to extend around the toe end of the shoe and supported by the wiper carrier independently of the wipers to be moved by the carrier into pressure-applying relation to the upper at the sides of the toe as the wipers begin to wipe the upper inwardly at the end of the toe, and means for rendering said band effective to hold the toe end of the shoe thereafter against lateral displacement by the closing movements of the wipers.

86. In a lasting machine, toe-embracing wipers for wiping the marginal portion of an upper around the toe end of a last inwardly over an insole on the last, a wiper carrier supporting said wipers and movable to advance them bodily lengthwise of the last, means for closing the wipers inwardly widthwise of the last, a resiliently flexible band arranged to extend around the toe end of the shoe and supported by the wiper carrier independently of the wipers to be moved by the carrier into pressure-applying relation to the upper at the sides of the toe as the wipers begin to wipe the upper inwardly at the end of the toe, and connections between said band and the wiper carrier constructed and arranged to permit the carrier to move relatively to the band in further operating the wipers after the band has been applied to the shoe and to render the band effective during such further operation of the wipers to hold the toe end of the shoe against lateral displacement.

87. In a lasting machine, toe-embracing wipers for wiping the marginal portion of an upper around the toe end of a last inwardly over an insole on the last, a wiper carrier supporting said wipers and movable to advance them bodily lengthwise of the last, means for closing the wipers inwardly widthwise of the last, a resiliently flexible band arranged to extend around the toe end of the shoe and supported by the wiper carrier independently of the wipers to be moved by the carrier into pressure-applying relation to the upper at the sides of the toe as the wipers begin to wipe the upper inwardly at the end of the toe for holding the toe end of the shoe against lateral displacement by the closing movements of the wipers, blocks to which the ends of said band are secured, and a pair of non-parallel links pivotally connected to each of said blocks in different locations respectively lengthwise of the shoe and pivotally mounted on said carrier to control the band and to permit the carrier to move farther lengthwise of the shoe relatively to the band in operating the wipers after the band has been applied to the shoe.

88. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to engage the toe-end face of the last to position the last lengthwise when the shoe is presented to the machine and being initially so inclined as to clamp the upper on the wipers first at the end only of the toe, and means for tipping the retarder into position to clamp the upper on the wipers also at the sides of the toe in the course of the wiping of the upper heightwise of the last.

89. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, and means for thereafter tipping it into position to clamp the upper on the wipers also at the sides of the toe, said means comprising members supporting the retarder respectively in different locations lengthwise of the last and mounted for swinging movements in such relation to each other as to cause the retarder thus to tip without any substantial displacement lengthwise of the last of its upper-engaging portion at the end of the toe.

90. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, and means for tipping it in the course of the wiping of the upper heightwise of the last into position to clamp the upper on the wipers also at the sides of the toe, said means comprising a lever and a link supporting the retarder respectively in different locations lengthwise of the last and mounted for swinging movements in such relation to each other as to cause the retarder thus to tip about an axis located substantially where it engages the upper at the end of the toe.

91. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, means for thereafter tipping it about an axis located substantially where it engages the upper at the end of the toe into position to clamp the upper on the wipers also at the sides of the toe, and additional means for optionally imparting to the retarder as it is thus tipped outward movement lengthwise of the last in wiping engagement with the upper or for eliminating such outward movement.

92. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, means for thereafter tipping it about an axis located substantially where it engages the upper at the end of the toe into position to clamp the upper on the wipers also at the sides of the toe, and additional means including a member optionally adjustable to impart to the retarder as it is thus tipped a variable amount of outward movement lengthwise of the last in wiping engagement with the upper or to eliminate such outward movement.

93. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, means for thereafter tipping it about an axis located substantially where it engages the upper at the end of the toe into position to clamp the upper on the wipers also at the sides of the toe, and additional means including a normally stationary cam optionally adjustable to impart to the retarder as it is thus tipped an outward movement lengthwise of the last in wiping engagement with the upper or to eliminate such outward movement.

94. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, means for thereafter tipping it about an axis located substantially where it engages the upper at the end of the toe into position to clamp the upper on the wipers also at the sides of the toe, a support on which said tipping means is mounted, and means for moving said support to impart to the retarder outward movement lengthwise of the last in wiping engagement with the upper.

95. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, means for thereafter tipping it about an axis located substantially where it engages the upper at the end of the toe into position to clamp the upper on the wipers also at the sides of the toe, a support on which said tipping means is mounted, an arm mounted for swinging movements heightwise of the last and on which said support is pivotally mounted, and means for swinging said support about its pivotal connection with said arm to impart to the retarder outward movement lengthwise of the last in wiping engagement with the upper.

96. In a lasting machine, the combination with toe-embracing wipers for wiping the toe end of an upper heightwise of a last and for thereafter wiping its marginal portion inwardly over an insole on the last, of a retarder formed to clamp the upper on said wipers around the end and along the sides of the toe to control it as it is wiped heightwise of the last, said retarder being arranged to clamp the upper on the wipers first at the end only of the toe, means for thereafter tipping it about an axis located substantially where it engages the upper at the end of the toe into position to clamp the upper on the wipers also at the sides of the toe, said means comprising a lever and a link supporting the retarder respectively in different locations lengthwise of the last and mounted for swinging movements in such relation to each other as to cause the retarder thus to tip about an axis located substantially where it engages the upper at the end of the toe, a support on which said lever and link are pivotally mounted, and means for swinging said support about an axis extending widthwise of the last to impart to the retarder outward movement lengthwise of the last in wiping engagement with the upper.

97. In a lasting machine, the combination with toe-embracing wipers for wiping the toe end of an upper heightwise of a last and for thereafter wiping its marginal portion inwardly over an insole on the last, of a retarder formed to clamp the upper on said wipers about the toe end of the last to control it as it is wiped heightwise of the last, and means for optionally imparting to said retarder outward movement lengthwise of the last in wiping engagement with the upper or eliminating such outward movement.

98. In a lasting machine, the combination with toe-embracing wipers for wiping the toe end of an upper heightwise of a last and for thereafter wiping its marginal portion inwardly over an insole on the last, of a retarder formed to clamp the upper on said wipers about the toe end of the last to control it as it is wiped heightwise of the last, and mechanism for controlling the retarder with respect to movement lengthwise of the last, said mechanism including a normally stationary cam adjustable into position to impart to said retarder outward movement lengthwise of the last in wiping engagement with the upper or into position to eliminate such outward movement.

99. In a lasting machine, the combination with toe-embracing wipers movable to wipe the toe end of an upper heightwise of a last, of a retarder arranged to clamp the upper on said wipers about the toe end of the last to control it as it is wiped heightwise of the last, said retarder being so supported as to be moved heightwise of the last by the wipers, an arm mounted for swinging movement in response to such movement of the retarder, a rod along which said arm is thus movable, a spring on said rod arranged to be compressed by the movement of the arm and thus to cause the retarder to press the upper yieldingly on the wipers, and means for swinging said arm by the rod after the wiping of the upper heightwise of the last to withdraw the retarder from the wipers.

100. In a lasting machine, the combination with toe-embracing wipers for wiping the toe end of an upper heightwise of a last and for thereafter wiping its marginal portion inwardly over an insole on the last, of a retarder arranged to clamp the upper on said wipers about the toe end of the last to control it as it is wiped heightwise of the last, a holddown arranged to engage the margin of the toe end of the insole to press it on the bottom of the last, mechanism including a rod movable lengthwise to withdraw the retarder from the wipers after the wiping of the upper heightwise of the last, a cam member carried by said rod, and mechanism arranged to be operated by said cam member to withdraw said holddown from operative position.

101. In a lasting machine, the combination with toe-embracing wipers for wiping the toe end of an upper heightwise of a last and for thereafter wiping its marginal portion inwardly over an insole on the last, of a retarder arranged to clamp the upper on said wipers about the toe end of the last to control it as it is wiped heightwise of the last, a holddown arranged to engage the margin of the toe end of the insole to press it on the bottom of the last, means supporting said holddown for movement away from the insole in a path inclined lengthwise and heightwise of the shoe, means including a rod movable lengthwise to withdraw said retarder from the wipers after the wiping of the upper heightwise of the last, a cam member carried by said rod, and mechanism arranged to be operated by said cam member to withdraw the holddown from the insole along its inclined path.

102. In a lasting machine, the combination with toe-embracing wipers for wiping the toe end of an upper inwardly over an insole on a last, of a holddown arranged to engage the margin of the toe end of the insole to hold it on the bottom of the last, a support for said holddown relatively to which it may be moved heightwise of the last by pressure of the bottom of the shoe thereon, and a latch mounted on said support for securing the holddown detachably in place and for releasing it to permit its removal while the latch remains on the support, said latch being resiliently flexible in a direction heightwise of the last and arranged to be flexed by the pressure of the shoe on the holddown.

103. In a lasting machine, the combination with toe-embracing wipers for wiping the toe end of an upper heightwise of a last and for thereafter wiping its marginal portion inwardly over an insole on the last, of a retarder arranged to clamp the upper on said wipers about the toe end of the last to control it as it is wiped heightwise of the last, means for inserting fastenings to fasten the marginal portion of the upper to the insole, mechanism for moving said fastening-inserting means relatively to the wipers into position for the insertion of the fastenings, and additional mechanism arranged to be operated by said first-named mechanism to withdraw the retarder from the wipers to an idle position clear of the fastening-inserting means.

104. In a lasting machine, the combination with toe-embracing wipers for wiping the toe end of an upper heightwise of a last and for thereafter wiping its marginal portion inwardly over an insole on the last, of a retarder arranged to clamp the upper on said wipers about the toe end of the last to control it as it is wiped heightwise of the last, means for inserting fastenings to fasten the marginal portion of the upper to the insole, mechanism for moving said fastening-inserting means relatively to the wipers into position for the insertion of the fastenings, said mechanism including a shaft rotatable about an axis extending widthwise of the shoe, an arm fast on said shaft, and means arranged to be operated by said arm to withdraw the retarder from the wipers to an idle position clear of the fastening-inserting means.

105. In a lasting machine, the combination with toe-embracing wipers for wiping the toe end of an upper heightwise of a last and for thereafter wiping its marginal portion inwardly over an insole on the last, of a retarder arranged to clamp the upper on said wipers about the toe end of the last to control it as it is wiped heightwise of the last, a holddown arranged to engage the margin of the toe end of the insole to press it on the bottom of the last, means for inserting fastenings to fasten the marginal portion of the upper to the insole after it has been wiped inwardly over the insole, mechanism for moving said fastening-inserting means relatively to the wipers into position for the insertion of the fastenings, and additional mechanism arranged to be operated by said first-named mechanism to withdraw said retarder and holddown to idle positions clear of the fastening-inserting means.

106. In a lasting machine, the combination with toe-lasting means, of a heel rest for engaging the heel end of a shoe to prevent its displacement lengthwise in a heelward direction in the toe-lasting operation, means including a spring for moving said heel rest lengthwise of the shoe into engagement therewith and for pressing it yieldingly against the shoe, and hydraulic means for automatically locking the heel rest positively against reverse movement.

107. In a lasting machine, the combination with toe-lasting means, of a heel rest for engaging the heel end of a shoe to prevent its displacement lengthwise in a heelward direction in the toe-lasting operation, spring-operated means for moving said heel rest lengthwise of the shoe into engagement therewith, a cam for controlling said spring-operated means, and hydraulic means for automatically locking the heel rest positively against reverse movement.

108. In a lasting machine, the combination with toe-lasting means, of a heel rest for engaging the heel end of a shoe to prevent its displacement lengthwise in a heelward direction in the toe-lasting operation, mechanism for moving said heel rest lengthwise of the shoe into engagement therewith and for pressing it yieldingly against the shoe, and hydraulic means for automatically locking the heel rest positively against reverse movement, said hydraulic locking means including members relatively movable by said mechanism to transfer liquid from one portion of the locking means to another and a valve arranged to close to prevent return of the liquid and thereby to prevent relative return movement of said members.

109. In a lasting machine, the combination with toe-lasting means, of a heel rest for engaging the heel end of a shoe to prevent its displacement lengthwise in a heelward direction in the toe-lasting operation, mechanism for moving said heel rest lengthwise of the shoe into engagement therewith, and hydraulic means for automatically locking the heel rest positively against reverse movement, said hydraulic locking means including a cylinder and a hollow piston therein relatively movable by said mechanism to transfer liquid from one of them to the other and a valve arranged to close to prevent return of the liquid and thereby to prevent relative return movement of the cylinder and piston.

110. In a lasting machine, the combination with toe-lasting means, of a heel rest for engaging the heel end of a shoe to prevent its displacement lengthwise in a heelward direction in the toe-lasting operation, mechanism for moving said heel rest lengthwise of the shoe into engagement therewith, and hydraulic means for automatically locking the heel rest positively against reverse movement, said hydraulic locking means including members relatively movable by said mechanism to transfer liquid from one portion of the locking means to another and a spring-controlled valve yieldable to permit such transfer of the liquid but arranged to close thereafter to prevent relative return movement of said members.

111. In a lasting machine, the combination with toe-lasting means, of a heel rest for engaging the heel end of a shoe to prevent its displacement lengthwise in a heelward direction in the toe-lasting operation, mechanism for moving said heel rest lengthwise of the shoe into engagement therewith, hydraulic means for automatically locking the heel rest positively against reverse movement, said hydraulic locking means including members relatively movable by said mechanism to transfer liquid from one portion of the locking means to another and a valve arranged to close to prevent return of the liquid and thereby to prevent relative return movement of said members, and means for opening said valve after the toe-lasting operation to permit reverse movement of the heel rest.

112. In a lasting machine, the combination with toe-lasting means, of a heel rest for engaging the heel end of a shoe to prevent its displacement lengthwise in a heelward direction in the toe-lasting operation, mechanism for moving said heel rest lengthwise of the shoe into engagement therewith, hydraulic means for automatically locking the heel rest positively against reverse movement, said hydraulic locking means including members relatively movable by said mechanism to transfer liquid from one portion of the locking means to another and a valve arranged to close to prevent return of the liquid and thereby to prevent relative return movement of said members, a toe rest for engaging the shoe at the top of the forepart, means for moving said toe rest away from the shoe after the toe-lasting operation, and means including a member movable with said toe rest for opening said valve to permit reverse movement of the heel rest.

113. In a lasting machine, the combination with toe-lasting means, of a heel rest for engaging the heel end of a shoe to prevent its displacement lengthwise in a heelward direction in the toe-lasting operation, a pair of rods rectilinearly movable lengthwise of the shoe to move the heel rest into engagement with the shoe, and a pair of hydraulic locking mechanisms associated respectively with said different rods for locking the heel rest positively against reverse movement.

114. In a lasting machine, the combination with toe-lasting means, of a heel rest for engaging the heel end of a shoe to prevent its displacement lengthwise in a heelward direction in the toe-lasting operation, a pair of rods rectilinearly movable lengthwise of the shoe to move the heel rest into engagement with the shoe, and a pair of hydraulic locking mechanisms associated respectively with said different rods for locking the heel rest positively against reverse movement, each of said hydraulic locking mechanisms including members relatively movable by the rod associated therewith to transfer liquid from one portion of the locking mechanism to another and a valve arranged to close to prevent return of the liquid and thereby to prevent relative return movement of said members.

115. In a lasting machine, the combination with toe-lasting means, of a heel rest for engaging the heel end of a shoe to prevent its displacement lengthwise in a heelward direction in the toe-lasting operation, a pair of rods rectilinearly movable lengthwise of the shoe to move the heel rest into engagement with the shoe, and a pair of hydraulic locking mechanisms associated respectively with said different rods for locking the heel rest positively against reverse movement, each of said hydraulic locking mechanisms including a hollow piston, a cylinder movable relatively to said piston by the rod associated therewith to transfer liquid from the piston to the cylinder, and a valve arranged to close to prevent return of the liquid and thereby to prevent return of the cylinder.

LESTER S. MACDONALD.

REFERENCES CITED

The following references are of record in the file of this patent:

UNITED STATES PATENTS

| Number | Name | Date |
|---|---|---|
| 340,860 | Chase | Apr. 27, 1886 |
| 524,447 | Lombard | Aug. 14, 1894 |
| 1,010,394 | Pym | Nov. 28, 1911 |
| 1,138,855 | Ellis | May 11, 1915 |
| 1,222,127 | Perri | Apr. 10, 1917 |
| 1,386,681 | Blake | Aug. 9, 1921 |
| 1,392,590 | Merrick | Oct. 4, 1921 |
| 1,394,806 | Blake | Oct. 25, 1921 |
| 1,980,435 | Pym et al. | Nov. 13, 1934 |
| 2,108,171 | Jorgensen | Feb. 15, 1938 |
| 2,116,819 | Bata | May 10, 1938 |
| 2,152,855 | Ricks et al. | Apr. 4, 1939 |
| 2,303,342 | Eastman | Dec. 1, 1942 |
| 2,371,612 | Ericson | Mar. 20, 1945 |
| 2,490,900 | Eastman et al. | Dec. 13, 1949 |